United States Patent
Telfer et al.

(10) Patent No.: US 9,697,778 B2
(45) Date of Patent: Jul. 4, 2017

(54) REVERSE DRIVING PULSES IN ELECTROPHORETIC DISPLAYS

(71) Applicant: E INK CORPORATION, Billerica, MA (US)

(72) Inventors: Stephen J. Telfer, Arlington, MA (US); Stephen Bull, Windham, NH (US); Alain Bouchard, Boston, MA (US); Craig A. Herb, Medford, MA (US); Kosta Ladavac, Somerville, MA (US); Ana L. Lattes, Newton, MA (US); Jennifer M. Morrison, Watertown, MA (US); Richard J. Paolini, Jr., Framingham, MA (US); Michael Thomas Regan, Cambridge, MA (US); Luke M. Slominski, Newton, MA (US); Lee Yezek, Watertown, MA (US); Kenneth R. Crounse, Somerville, MA (US); J. Ryan Kruse, Waltham, MA (US); Christopher L. Hoogeboom, Burlington, MA (US); Jason D. Feick, Auburndale, MA (US); David Darrell Miller, Wakefield, MA (US)

(73) Assignee: E Ink Corporation, Billerica, MA (US)

( * ) Notice: Subject to any disclaimer, the term of this patent is extended or adjusted under 35 U.S.C. 154(b) by 412 days.

(21) Appl. No.: 14/277,107

(22) Filed: May 14, 2014

(65) Prior Publication Data
US 2014/0340430 A1    Nov. 20, 2014

Related U.S. Application Data

(60) Provisional application No. 61/823,031, filed on May 14, 2013.

(51) Int. Cl.
G09G 3/34    (2006.01)
G02F 1/167   (2006.01)

(52) U.S. Cl.
CPC ............ *G09G 3/344* (2013.01); *G02F 1/167* (2013.01); *G02F 2001/1678* (2013.01); *G09G 2310/06* (2013.01); *G09G 2310/068* (2013.01)

(58) Field of Classification Search
CPC ................................. G09G 3/344; G02F 1/167
See application file for complete search history.

(56) References Cited

U.S. PATENT DOCUMENTS

| 4,285,801 A | 8/1981 | Chiang |
| 4,298,448 A | 11/1981 | Muller |

(Continued)

FOREIGN PATENT DOCUMENTS

| EP | 0781310 | 10/1998 |
| JP | 2011158783 | 8/2011 |

(Continued)

OTHER PUBLICATIONS

Kitamura, T., et al., "Electrical toner movement for electronic paper-like display", Asia Display/IDW '01, p. 1517, Paper HCS1-1 (2001) Dec. 31, 2001.

(Continued)

*Primary Examiner* — William Boddie
*Assistant Examiner* — Andrew Schnirel
(74) *Attorney, Agent, or Firm* — Brian D. Bean

(57) ABSTRACT

An electrophoretic medium comprises a fluid and at least one species of particles disposed, When a first addressing impulse is applied to the medium, the first species of particles move in one direction relative to the electric field, but when a second addressing impulse, larger than the first addressing impulse, is applied to the medium, the first species of particles move in the opposed direction relative to the electric field.

4 Claims, 29 Drawing Sheets

(56) References Cited

U.S. PATENT DOCUMENTS

| | | |
|---|---|---|
| 4,418,346 A | 11/1983 | Batchelder |
| 4,680,103 A | 7/1987 | Beilin |
| 4,891,245 A | 1/1990 | Micale |
| 5,122,611 A | 6/1992 | Tanaka et al. |
| 5,360,689 A | 11/1994 | Hou |
| 5,498,674 A | 3/1996 | Hou |
| 5,725,651 A | 3/1998 | Zambounis |
| 5,783,614 A | 7/1998 | Chen |
| 5,872,552 A | 2/1999 | Gordon, II |
| 5,914,806 A | 6/1999 | Gordon, II |
| 5,930,026 A | 7/1999 | Jacobson |
| 5,961,804 A | 10/1999 | Jacobson |
| 6,017,584 A | 1/2000 | Albert |
| 6,117,368 A | 9/2000 | Hou |
| 6,120,588 A | 9/2000 | Jacobson |
| 6,120,839 A | 9/2000 | Comiskey |
| 6,130,774 A | 10/2000 | Albert |
| 6,144,361 A | 11/2000 | Gordon, II |
| 6,172,798 B1 | 1/2001 | Albert |
| 6,184,856 B1 | 2/2001 | Gordon, II |
| 6,225,971 B1 | 5/2001 | Gordon, II |
| 6,241,921 B1 | 6/2001 | Jacobson |
| 6,262,706 B1 | 7/2001 | Albert |
| 6,262,833 B1 | 7/2001 | Loxley |
| 6,271,823 B1 | 8/2001 | Gordon, II |
| 6,300,932 B1 | 10/2001 | Albert |
| 6,323,989 B1 | 11/2001 | Jacobson |
| 6,377,387 B1 | 4/2002 | Duthaler |
| 6,445,489 B1 | 9/2002 | Jacobson |
| 6,504,524 B1 | 1/2003 | Gates |
| 6,512,354 B2 | 1/2003 | Jacobson |
| 6,515,649 B1 | 2/2003 | Albert |
| 6,531,997 B1 | 3/2003 | Gates |
| 6,538,801 B2 | 3/2003 | Jacobson |
| 6,580,545 B2 | 6/2003 | Morrison |
| 6,652,075 B2 | 11/2003 | Jacobson |
| 6,664,944 B1 | 12/2003 | Albert |
| 6,672,921 B1 | 1/2004 | Liang |
| 6,693,620 B1 | 2/2004 | Herb |
| 6,721,083 B2 | 4/2004 | Jacobson |
| 6,727,873 B2 | 4/2004 | Gordon, II |
| 6,727,881 B1 | 4/2004 | Albert |
| 6,753,999 B2 | 6/2004 | Zehner |
| 6,788,449 B2 | 9/2004 | Liang |
| 6,822,782 B2 | 11/2004 | Honeyman |
| 6,825,970 B2 | 11/2004 | Goenaga |
| 6,864,875 B2 | 3/2005 | Drzaic |
| 6,866,760 B2 | 3/2005 | Paolini, Jr. |
| 6,870,661 B2 | 3/2005 | Pullen et al. |
| 6,900,851 B2 | 5/2005 | Morrison |
| 6,922,276 B2 | 7/2005 | Zhang |
| 6,950,220 B2 | 9/2005 | Abramson |
| 6,982,178 B2 | 1/2006 | LeCain |
| 6,995,550 B2 | 2/2006 | Jacobson |
| 7,002,728 B2 | 2/2006 | Pullen |
| 7,012,600 B2 | 3/2006 | Zehner |
| 7,012,735 B2 | 3/2006 | Honeyman |
| 7,023,420 B2 | 4/2006 | Comiskey |
| 7,034,783 B2 | 4/2006 | Gates |
| 7,038,655 B2 | 5/2006 | Herb |
| 7,075,502 B1 | 7/2006 | Drzaic |
| 7,116,318 B2 | 10/2006 | Amundson |
| 7,116,466 B2 | 10/2006 | Whitesides |
| 7,119,772 B2 | 10/2006 | Amundson |
| 7,167,155 B1 | 1/2007 | Albert |
| 7,170,670 B2 | 1/2007 | Webber |
| 7,180,649 B2 | 2/2007 | Morrison et al. |
| 7,193,625 B2 | 3/2007 | Danner |
| 7,202,847 B2 | 4/2007 | Gates |
| 7,230,750 B2 | 6/2007 | Whitesides |
| 7,230,751 B2 | 6/2007 | Whitesides et al. |
| 7,236,290 B1 | 6/2007 | Zhang et al. |
| 7,236,291 B2 | 6/2007 | Kaga et al. |
| 7,247,379 B2 | 7/2007 | Pullen et al. |
| 7,259,744 B2 | 8/2007 | Arango |
| 7,304,787 B2 | 12/2007 | Whitesides |
| 7,312,784 B2 | 12/2007 | Baucom |
| 7,312,794 B2 | 12/2007 | Zehner |
| 7,312,916 B2 | 12/2007 | Pullen |
| 7,321,459 B2 | 1/2008 | Masuda |
| 7,327,511 B2 | 2/2008 | Whitesides |
| 7,339,715 B2 | 3/2008 | Webber |
| 7,375,875 B2 | 5/2008 | Whitesides |
| 7,411,719 B2 | 8/2008 | Paolini, Jr. |
| 7,411,720 B2 | 8/2008 | Honeyman et al. |
| 7,420,549 B2 | 9/2008 | Jacobson |
| 7,453,445 B2 | 11/2008 | Amundson |
| 7,492,339 B2 | 2/2009 | Amundson |
| 7,528,822 B2 | 5/2009 | Amundson |
| 7,532,388 B2 | 5/2009 | Whitesides et al. |
| 7,535,624 B2 | 5/2009 | Amundson |
| 7,545,358 B2 | 6/2009 | Gates |
| 7,561,324 B2 | 7/2009 | Duthaler |
| 7,583,251 B2 | 9/2009 | Arango |
| 7,602,374 B2 | 10/2009 | Zehner |
| 7,612,760 B2 | 11/2009 | Kawai |
| 7,667,684 B2 | 2/2010 | Jacobson |
| 7,679,599 B2 | 3/2010 | Kawai |
| 7,679,814 B2 | 3/2010 | Paolini, Jr. |
| 7,688,297 B2 | 3/2010 | Zehner |
| 7,729,039 B2 | 6/2010 | LeCain |
| 7,733,311 B2 | 6/2010 | Amundson |
| 7,733,335 B2 | 6/2010 | Zehner |
| 7,746,544 B2 | 6/2010 | Comiskey |
| 7,787,169 B2 | 8/2010 | Abramson |
| 7,791,789 B2 | 9/2010 | Albert |
| 7,839,564 B2 | 11/2010 | Whitesides |
| 7,848,006 B2 | 12/2010 | Wilcox |
| 7,903,319 B2 | 3/2011 | Honeyman |
| 7,910,175 B2 | 3/2011 | Webber |
| 7,952,557 B2 | 5/2011 | Amundson |
| 7,952,790 B2 | 5/2011 | Honeyman |
| 7,956,841 B2 | 6/2011 | Albert |
| 7,999,787 B2 | 8/2011 | Amundson |
| 8,009,348 B2 | 8/2011 | Zehner |
| 8,018,640 B2 | 9/2011 | Whitesides |
| 8,040,594 B2 | 10/2011 | Paolini, Jr. |
| 8,054,526 B2 | 11/2011 | Bouchard |
| 8,068,090 B2 | 11/2011 | Machida |
| 8,077,141 B2 | 12/2011 | Duthaler |
| 8,098,418 B2 | 1/2012 | Paolini, Jr. |
| 8,102,363 B2 | 1/2012 | Hirayama |
| 8,115,729 B2 | 2/2012 | Danner |
| 8,125,501 B2 | 2/2012 | Amundson |
| 8,139,050 B2 | 3/2012 | Jacobson |
| 8,174,490 B2 | 5/2012 | Whitesides |
| 8,199,395 B2 | 6/2012 | Whitesides |
| 8,213,076 B2 | 7/2012 | Albert |
| 8,270,064 B2 | 9/2012 | Feick |
| 8,289,250 B2 | 10/2012 | Zehner |
| 8,300,006 B2 | 10/2012 | Zhou |
| 8,305,341 B2 | 11/2012 | Arango |
| 8,309,630 B2 | 11/2012 | Chun |
| 8,314,784 B2 | 11/2012 | Ohkami |
| 8,319,759 B2 | 11/2012 | Jacobson |
| 8,363,299 B2 | 1/2013 | Paolini, Jr. |
| 8,384,658 B2 | 2/2013 | Albert |
| 8,390,918 B2 | 3/2013 | Wilcox |
| 8,441,714 B2 | 5/2013 | Paolini, Jr. |
| 8,441,716 B2 | 5/2013 | Paolini, Jr. |
| 8,462,423 B2 | 6/2013 | Farrand |
| 8,466,852 B2 | 6/2013 | Drzaic |
| 8,514,481 B2 | 8/2013 | Yeo |
| 8,558,783 B2 | 10/2013 | Wilcox et al. |
| 8,558,785 B2 | 10/2013 | Zehner et al. |
| 8,576,470 B2 | 11/2013 | Paolini, Jr. et al. |
| 8,576,476 B2 | 11/2013 | Telfer et al. |
| 8,582,196 B2 | 11/2013 | Walls et al. |
| 8,593,396 B2 | 11/2013 | Amundson et al. |
| 8,593,718 B2 | 11/2013 | Comiskey |
| 8,593,721 B2 | 11/2013 | Albert et al. |
| 8,717,664 B2 | 5/2014 | Wang |
| 8,727,522 B2 | 5/2014 | Maekawa et al. |
| 8,791,896 B2 | 7/2014 | Kwon |

(56) References Cited

U.S. PATENT DOCUMENTS

| | | |
|---|---|---|
| 8,797,634 B2 | 8/2014 | Paolini, Jr. et al. |
| 8,830,559 B2 | 9/2014 | Honeyman |
| 8,873,129 B2 | 10/2014 | Paolini, Jr. |
| 8,902,153 B2 | 12/2014 | Bouchard et al. |
| 8,928,562 B2 | 1/2015 | Gates et al. |
| 8,969,886 B2 | 3/2015 | Amundson |
| 9,170,467 B2 | 10/2015 | Whitesides |
| 9,230,492 B2 | 1/2016 | Harrington et al. |
| 9,251,736 B2 | 2/2016 | Lin |
| 2003/0102858 A1 | 6/2003 | Jacobson |
| 2003/0132908 A1* | 7/2003 | Herb .................. G02F 1/167 345/107 |
| 2005/0012980 A1 | 1/2005 | Wilcox et al. |
| 2005/0124751 A1 | 6/2005 | Klingenberg et al. |
| 2005/0174341 A1 | 8/2005 | Johnson |
| 2005/0253777 A1 | 11/2005 | Zehner |
| 2007/0091418 A1 | 4/2007 | Danner |
| 2007/0103427 A1 | 5/2007 | Zhou et al. |
| 2008/0024429 A1 | 1/2008 | Zehner |
| 2008/0024482 A1 | 1/2008 | Gates |
| 2008/0043318 A1 | 2/2008 | Whitesides |
| 2008/0048970 A1 | 2/2008 | Drzaic |
| 2008/0136774 A1 | 6/2008 | Harris |
| 2008/0291129 A1 | 11/2008 | Harris |
| 2008/0303778 A1* | 12/2008 | Machida ............. G02B 26/026 345/107 |
| 2009/0004442 A1 | 1/2009 | Danner |
| 2009/0009852 A1 | 1/2009 | Honeyman |
| 2009/0066685 A1* | 3/2009 | Gillies ................. G09G 3/3446 345/212 |
| 2009/0174651 A1 | 7/2009 | Jacobson |
| 2009/0179923 A1 | 7/2009 | Amundson |
| 2009/0195568 A1 | 8/2009 | Sjodin |
| 2009/0206499 A1 | 8/2009 | Whitesides |
| 2009/0225398 A1 | 9/2009 | Duthaler |
| 2009/0322721 A1 | 12/2009 | Zehner |
| 2010/0103502 A1 | 4/2010 | Jacobson |
| 2010/0148385 A1 | 6/2010 | Balko |
| 2010/0156780 A1 | 6/2010 | Jacobson |
| 2010/0220122 A1 | 9/2010 | Zehner |
| 2010/0265561 A1 | 10/2010 | Gates et al. |
| 2011/0007381 A1* | 1/2011 | Paolini, Jr. ............ G02F 1/167 359/296 |
| 2011/0134506 A1 | 6/2011 | Hiji |
| 2011/0193840 A1 | 8/2011 | Amundson |
| 2011/0193841 A1 | 8/2011 | Amundson |
| 2011/0199671 A1 | 8/2011 | Amundson |
| 2011/0234562 A1 | 9/2011 | Hong et al. |
| 2012/0134009 A1* | 5/2012 | Paolini, Jr. ............ G02F 1/167 359/296 |
| 2012/0205599 A1 | 8/2012 | Matsumoto |
| 2012/0293858 A1 | 11/2012 | Telfer |
| 2012/0326957 A1 | 12/2012 | Drzaic |
| 2013/0016420 A1* | 1/2013 | Yeo .................... G02F 1/167 359/296 |
| 2013/0244149 A1 | 9/2013 | Wang |
| 2013/0300727 A1* | 11/2013 | Lin .................... G09G 3/3291 345/212 |
| 2014/0092465 A1* | 4/2014 | Wang .................. G02F 1/167 359/296 |
| 2014/0340430 A1 | 11/2014 | Telfer |
| 2015/0092262 A1 | 4/2015 | Greinert et al. |
| 2015/0123049 A1 | 5/2015 | Farrand |
| 2015/0218384 A1 | 8/2015 | Yezek |
| 2015/0234250 A1* | 8/2015 | Lin .................... G02F 1/167 345/690 |

FOREIGN PATENT DOCUMENTS

| | | |
|---|---|---|
| JP | 5200441 | 2/2013 |
| WO | WO2008065605 A2 | 6/2008 |
| WO | 2012072218 | 6/2012 |
| WO | 2013087376 | 6/2013 |
| WO | 2013149714 | 10/2013 |
| WO | 2013170937 | 11/2013 |

OTHER PUBLICATIONS

Yamaguchi, Y., et al., "Toner display using insulative particles charged triboelectrically", Asia Display/IDW '01, p. 1729, Paper AMD4-4 (2001) Dec. 31, 2001.

J. Heikenfeld, P. Drzaic, J-S Yeo and T. Koch, "A critical review of the present and future prospects for electronic paper", SID, 19(2), 2011, pp. 129-156. Dec. 31, 2011.

Moilanen, David E., Fenn, Emily E., Wong, Daryl, and Fayer, Michael D., Water dynamics in large and small reverse micelles: From two ensembles to collective behavior, J. Chem. Phys., 131, 14704 (2009) Dec. 31, 2009.

Hiemenz, P. C. and Rajagopalan, R., Principles of Colloid and Surface Chemistry, 3rd ed., Marcel Dekker, NY, 1997, pp. 56-57 Dec. 31, 1997.

Huang, Y.; Luedtke, R. R.; Freeman, R. A.; Wu, L.; Mach, R. H., "Synthesis and Structure-Activity Relationships of Naphthamides as Dopamine D3 Receptor Ligands", J. Med. Chem. 2001, 44, 1815-1826 Dec. 31, 2001.

Search Report and Written Opinion for corresponding International Application PCT/US2014/037979 Sep. 18, 2014.

Yamaguchi, Y., et al., "Toner display using insulative particles charged triboelectrically", Asia Display/IDW '01, p. 1729, Paper AMD4-4 (2001) Jan. 1, 2001.

Hye, K.G et al., Preparation of Red Dyes Derived from Quinacridone Pigment . . . , Molecular Crystals and Liquid Crystals, 2012, 563(1), 36 (Abstract only) Aug. 2, 2012.

Wang, J., et al., Alkyl and Dendron Substituted Quinacridones: Synthesis, Structures and Luminescent Properties, J. Phys. Chem. B, 2007, 111, 5082 Apr. 18, 2007.

Panina, N., et al., "Crystal structure prediction of organic pigments: quinacridone as an example", Journal of Applied Crystallography (2007) vol. 40, 105-114 Dec. 31, 2007.

Guo, Qiong, "Surfactants in Nonpolar Oils: 1, 13, 14 Agents of Electric Charging and Nonogel Templates", (May 1, 2012), pp. 1-196. May 1, 2012.

Espinosa, Carlos E. et al., "Particle Charging and Charge Screening in nonpolar Dispersions with nonionic Surfactants", Langmuir, vol. 26, No. 22 (Nov. 16, 2010), pp. 16941-16948. Nov. 16, 2010.

European Patent Office; Partial Supplementary European Search Report; EP Appl. No. 14797072.7; Apr. 13, 2017. Apr. 13, 2017.

\* cited by examiner

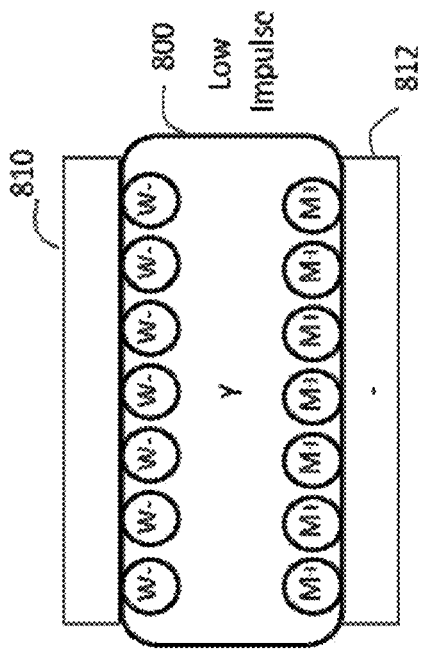
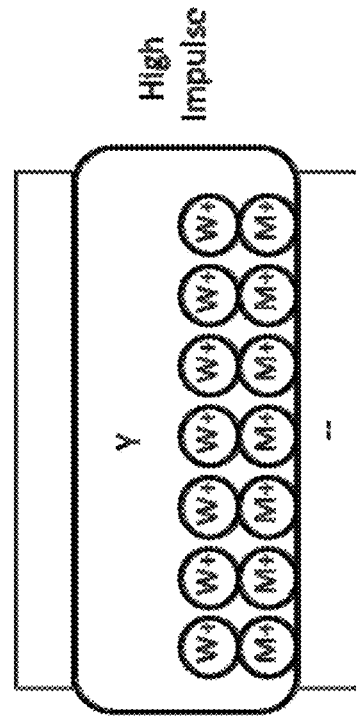
Fig. 8A
Fig. 8B

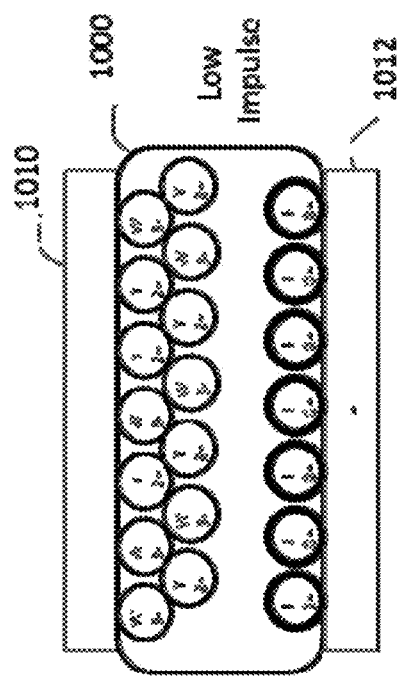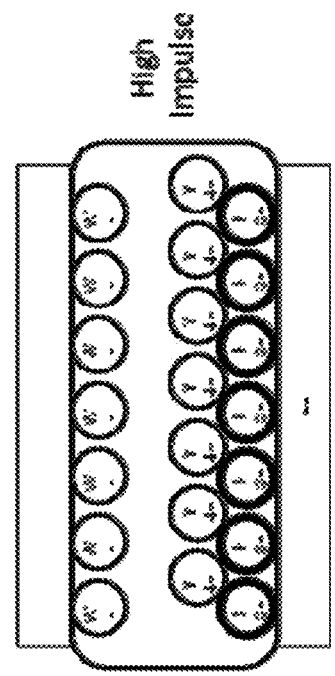
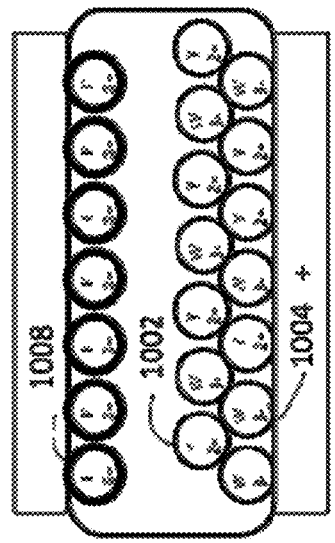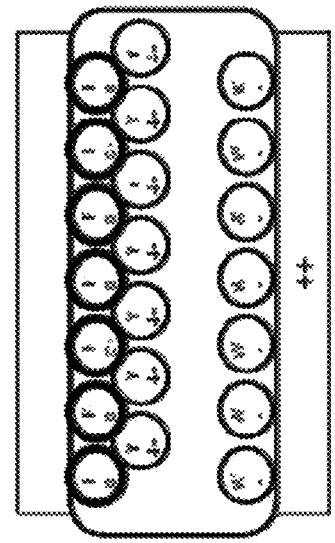
Fig. 10A
Fig. 10B

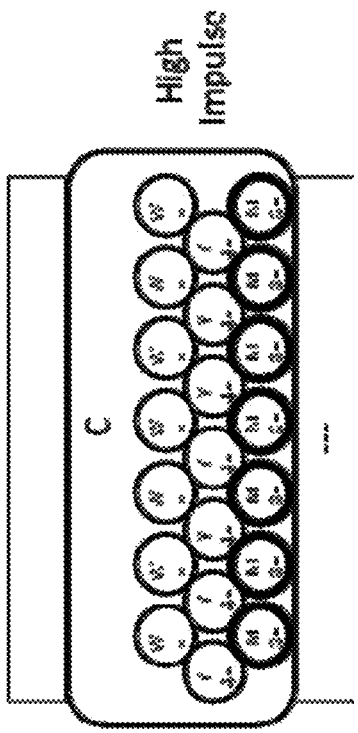
Fig. 11C
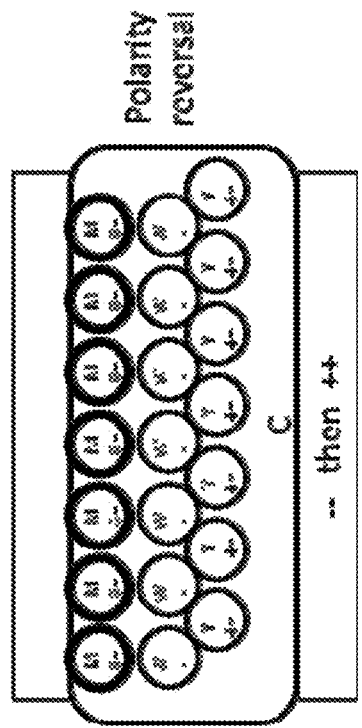
Fig. 11D
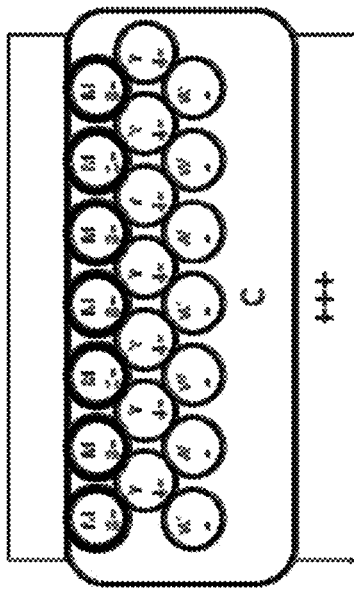
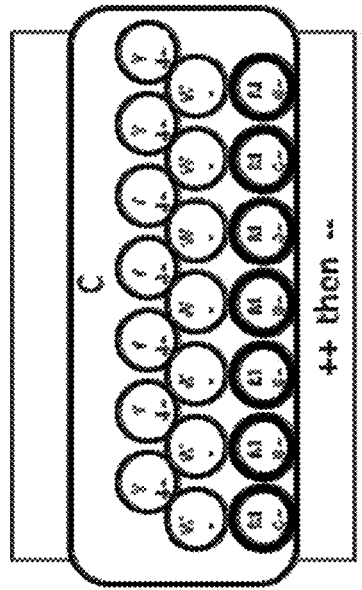

REVERSE DRIVING PULSES IN ELECTROPHORETIC DISPLAYS

This application claims benefit of Application Ser. No. 61/823,031, filed May 14, 2013.

The entire contents of the aforementioned copending application and of all U.S. patents and published and copending applications mentioned below are herein incorporated by reference.

BACKGROUND OF INVENTION

This invention relates to colored electrophoretic displays, and more specifically to electrophoretic displays capable of rendering more than two colors using a single layer of electrophoretic material comprising a plurality of colored particles.

The term color as used herein includes black and white. White particles are often of the light scattering type.

The term gray state is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate gray state would actually be pale blue. Indeed, as already mentioned, the change in optical state may not be a color change at all. The terms black and white may be used hereinafter to refer to the two extreme optical states of a display, and should be understood as normally including extreme optical states which are not strictly black and white, for example the aforementioned white and dark blue states.

The terms bistable and bistability are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called multi-stable rather than bistable, although for convenience the term bistable may be used herein to cover both bistable and multi-stable displays.

The term impulse, when used to refer to driving an electrophoretic display, is used herein to refer to the integral of the applied voltage with respect to time during the period in which the display is driven.

A particle that absorbs, scatters, or reflects light, either in a broad band or at selected wavelengths, is referred to herein as a colored or pigment particle. Various materials other than pigments (in the strict sense of that term as meaning insoluble colored materials) that absorb or reflect light, such as dyes or photonic crystals, etc., may also be used in the electrophoretic media and displays of the present invention.

Particle-based electrophoretic displays have been the subject of intense research and development for a number of years. In such displays, a plurality of charged particles (sometimes referred to as pigment particles) move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., Electrical toner movement for electronic paper-like display, IDW Japan, 2001, Paper HCS1-1, and Yamaguchi, Y., et al., Toner display using insulative particles charged triboelectrically, IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see for example U.S. Pat. Nos. 7,002,728 and 7,679,814;

(b) Capsules, binders and encapsulation processes; see for example U.S. Pat. Nos. 6,922,276 and 7,411,719;

(c) Films and sub-assemblies containing electro-optic materials; see for example U.S. Pat. Nos. 6,982,178 and 7,839,564;

(d) Backplanes, adhesive layers and other auxiliary layers and methods used in displays; see for example U.S. Pat. Nos. 7,116,318 and 7,535,624;

(e) Color formation and color adjustment; see for example U.S. Pat. Nos. 6,017,584; 6,664,944; 6,864,875; 7,075,502; 7,167,155; 7,667,684; 7,791,789; 7,956,841; 8,040,594; 8,054,526; 8,098,418; 8,213,076; and 8,363,299; and U.S. Patent Applications Publication Nos. 2004/0263947; 2007/0109219; 2007/0223079; 2008/0023332; 2008/0043318; 2008/0048970; 2009/0004442; 2009/0225398; 2010/0103502; 2010/0156780; 2011/0164307; 2011/0195629; 2011/0310461; 2012/0008188; 2012/0019898; 2012/0075687; 2012/0081779; 2012/0134009; 2012/0182597; 2012/0212462; 2012/0157269; and 2012/0326957;

(f) Methods for driving displays; see for example U.S. Pat. Nos. 5,930,026; 6,445,489; 6,504,524; 6,512,354; 6,531,997; 6,753,999; 6,825,970; 6,900,851; 6,995,550; 7,012,600; 7,023,420; 7,034,783; 7,116,466;

7,119,772; 7,193,625; 7,202,847; 7,259,744; 7,304,787; 7,312,794; 7,327,511; 7,453,445; 7,492,339; 7,528,822; 7,545,358; 7,583,251; 7,602,374; 7,612,760; 7,679,599; 7,688,297; 7,729,039; 7,733,311; 7,733,335; 7,787,169; 7,952,557; 7,956,841; 7,999,787; 8,077,141; 8,125,501; 8,139,050; 8,174,490; 8,289,250; 8,300,006; and 8,314,784; and U.S. Patent Applications Publication Nos. 2003/0102858; 2005/0122284; 2005/0179642; 2005/0253777; 2007/0091418; 2007/0103427; 2008/0024429; 2008/0024482; 2008/0136774; 2008/0150888; 2008/0291129; 2009/0174651; 2009/0179923; 2009/0195568; 2009/0322721; 2010/0045592; 2010/0220121; 2010/0220122; 2010/0265561; 2011/0187684; 2011/0193840; 2011/0193841; 2011/0199671; and 2011/0285754 (these patents and applications may hereinafter be referred to as the MEDEOD (MEthods for Driving Electro-optic Displays) applications);

(g) Applications of displays; see for example U.S. Pat. Nos. 7,312,784 and 8,009,348; and (h) Non-electrophoretic displays, as described in U.S. Pat. Nos. 6,241,921; 6,950,220; 7,420,549 and 8,319,759; and U.S. Patent Application Publication No. 2012/0293858.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, U.S. Pat. No. 6,866,760. Accordingly, for purposes of the present application, such polymer-dispersed electrophoretic media are regarded as sub-species of encapsulated electrophoretic media.

A related type of electrophoretic display is a so-called microcell electrophoretic display. In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called shutter mode in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode can be used in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word printing is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

The aforementioned U.S. Pat. No. 6,982,178 describes a method of assembling a solid electro-optic display (including an encapsulated electrophoretic display) which is well adapted for mass production. Essentially, this patent describes a so-called front plane laminate (FPL) which comprises, in order, a light-transmissive electrically-conductive layer; a layer of a solid electro-optic medium in electrical contact with the electrically-conductive layer; an adhesive layer; and a release sheet. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The term light-transmissive is used in this patent and herein to mean that the layer thus designated transmits sufficient light to enable an observer, looking through that layer, to observe the change in display states of the electro-optic medium, which will normally be viewed through the electrically-conductive layer and adjacent substrate (if present); in cases where the electro-optic medium displays a change in reflectivity at non-visible wavelengths, the term light-transmissive should of course be interpreted to refer to transmission of the relevant non-visible wavelengths. The substrate will typically be a polymeric film, and will normally have a thickness in the range of about 1 to about 25 mil (25 to 634 μm), preferably about 2 to about 10 mil (51 to 254 μm). The electrically-conductive layer is conveniently a thin metal or metal oxide layer of, for example, aluminum or ITO, or may be a conductive polymer. Poly(ethylene terephthalate) (PET) films coated with aluminum or ITO are available commercially, for example as aluminized Mylar (Mylar is a Registered Trade Mark) from E.I. du Pont de Nemours & Company, Wilmington Del., and such commercial materials may be used with good results in the front plane laminate.

Assembly of an electro-optic display using such a front plane laminate may be effected by removing the release sheet from the front plane laminate and contacting the adhesive layer with the backplane under conditions effective to cause the adhesive layer to adhere to the backplane, thereby securing the adhesive layer, layer of electro-optic medium and electrically-conductive layer to the backplane. This process is well-adapted to mass production since the front plane laminate may be mass produced, typically using roll-to-roll coating techniques, and then cut into pieces of any size needed for use with specific backplanes.

U.S. Pat. No. 7,561,324 describes a so-called double release sheet which is essentially a simplified version of the front plane laminate of the aforementioned U.S. Pat. No. 6,982,178. One form of the double release sheet comprises a layer of a solid electro-optic medium sandwiched between two adhesive layers, one or both of the adhesive layers being covered by a release sheet. Another form of the double release sheet comprises a layer of a solid electro-optic medium sandwiched between two release sheets. Both forms of the double release film are intended for use in a process generally similar to the process for assembling an electro-optic display from a front plane laminate already described, but involving two separate laminations; typically, in a first lamination the double release sheet is laminated to a front electrode to form a front sub-assembly, and then in a second lamination the front sub-assembly is laminated to a backplane to form the final display, although the order of these two laminations could be reversed if desired.

U.S. Pat. No. 7,839,564 describes a so-called inverted front plane laminate, which is a variant of the front plane laminate described in the aforementioned U.S. Pat. No. 6,982,178. This inverted front plane laminate comprises, in order, at least one of a light-transmissive protective layer and a light-transmissive electrically-conductive layer; an adhesive layer; a layer of a solid electro-optic medium; and a release sheet. This inverted front plane laminate is used to form an electro-optic display having a layer of lamination adhesive between the electro-optic layer and the front electrode or front substrate; a second, typically thin layer of adhesive may or may not be present between the electro-optic layer and a backplane. Such electro-optic displays can combine good resolution with good low temperature performance.

As indicated above most simple prior art electrophoretic media essentially display only two colors. Such electrophoretic media either use a single type of electrophoretic particle having a first color in a colored fluid having a second, different color (in which case, the first color is displayed when the particles lie adjacent the viewing surface of the display and the second color is displayed when the particles are spaced from the viewing surface), or first and second types of electrophoretic particles having differing first and second colors in an uncolored fluid (in which case, the first color is displayed when the first type of particles lie adjacent the viewing surface of the display and the second color is displayed when the second type of particles lie adjacent the viewing surface). Typically the two colors are black and white. If a full color display is desired, a color filter array may be deposited over the viewing surface of the monochrome (black and white) display. Displays with color filter arrays rely on area sharing and color blending to create color stimuli. The available display area is shared between three or four primary colors such as red/green/blue (RGB) or red/green/blue/white (RGBW), and the filters can be arranged in one-dimensional (stripe) or two-dimensional (2×2) repeat patterns. Other choices of primary colors or more than three primaries are also known in the art. The three (in the case of RGB displays) or four (in the case of RGBW displays) sub-pixels are chosen small enough so that at the intended viewing distance they visually blend together to a single pixel with a uniform color stimulus ('color blending'). The inherent disadvantage of area sharing is that the colorants are always present, and colors can only be modulated by switching the corresponding pixels of the underlying monochrome display to white or black (switching the corresponding primary colors on or off). For example, in an ideal RGBW display, each of the red, green, blue and white primaries occupy one fourth of the display area (one sub-pixel out of four), with the white sub-pixel being as bright as the underlying monochrome display white, and each of the colored sub-pixels being no lighter than one third of the monochrome display white. The brightness of the white color shown by the display as a whole cannot be more than one half of the brightness of the white sub-pixel (white areas of the display are produced by displaying the one white sub-pixel out of each four, plus each colored sub-pixel in its colored form being equivalent to one third of a white sub-pixel, so the three colored sub-pixels combined contribute no more than the one white sub-pixel). The brightness and saturation of colors is lowered by area-sharing with color pixels switched to black. Area sharing is especially problematic when mixing yellow because it is lighter than any other color of equal brightness, and saturated yellow is almost as bright as white. Switching the blue pixels (one fourth of the display area) to black makes the yellow too dark.

Multilayer, stacked electrophoretic displays are known in the art; J. Heikenfeld, P. Drzaic, J-S Yeo and T. Koch, Journal of the SID, 19(2), 2011, pp. 129-156. In such displays, ambient light passes through images in each of the three subtractive primary colors, in precise analogy with conventional color printing. U.S. Pat. No. 6,727,873 describes a stacked electrophoretic display in which three layers of switchable cells are placed over a reflective background. Similar displays are known in which colored particles are moved laterally (see International Application No. WO 2008/065605) or, using a combination of vertical and lateral motion, sequestered into micropits. In both cases, each layer is provided with electrodes that serve to concentrate or disperse the colored particles on a pixel-by-pixel basis, so that each of the three layers requires a layer of thin-film transistors (TFT's) (two of the three layers of TFT's must be substantially transparent) and a light-transmissive counter-electrode. Such a complex arrangement of electrodes is costly to manufacture, and in the present state of the art it is difficult to provide an adequately transparent plane of pixel electrodes, especially as the white state of the display must be viewed through several layers of electrodes. Multi-layer displays also suffer from parallax problems as the thickness of the display stack approaches or exceeds the pixel size.

U.S. Applications Publication Nos. 2012/0008188 and 2012/0134009 describe multicolor electrophoretic displays having a single back plane comprising independently addressable pixel electrodes and a common, light-transmissive front electrode. Between the back plane and the front electrode is disposed a plurality of electrophoretic layers. Displays described in these applications are capable of rendering any of the primary colors (red, green, blue, cyan, magenta, yellow, white and black) at any pixel location. However, there are disadvantages to the use of multiple electrophoretic layers located between a single set of addressing electrodes. The electric field experienced by the particles in a particular layer is lower than would be the case for a single electrophoretic layer addressed with the same voltage. In addition, optical losses in an electrophoretic layer closest to the viewing surface (for example, caused by light scattering or unwanted absorption) may affect the appearance of images formed in underlying electrophoretic layers.

Attempts have been made to provide full-color electrophoretic displays using a single electrophoretic layer. See, for example, U.S. Patent Application Publication No. 2011/0134506. However, in the current state of the art such displays typically involve compromises such as slow switching speeds (as long as several seconds) or high addressing voltages.

The present invention seeks to provide a color display using only a single electrophoretic layer but capable of displaying more than two, and preferably all colors at every location of the active area of the display, and a method of driving such an electrophoretic display.

SUMMARY OF INVENTION

Accordingly, this invention provides an electrophoretic medium comprising a fluid and at least a first species of particles disposed in the fluid, the first species of particles being such that when a first addressing impulse is applied to the medium, the first species of particles move in one direction relative to the electric field, but when a second addressing impulse, larger than the first addressing impulse but having the same polarity, is applied to the medium, the first species of particles move in the opposed direction relative to the electric field.

The first and second addressing impulses may differ from each other in field strength, duration or both. Furthermore, although the first addressing impulse comprises applying a first electric field is applied to the medium for a first period and that the second addressing impulse comprises applying a second electric field is applied to the medium for a second period, it is not intended to imply that the first and second electric fields must be constant over the first and second periods respectively, nor is it to be understood that the first and second electric field necessarily differ in magnitude from each other or that the first and second periods differ in duration. It is only required that the second addressing impulse (i.e., the integral with respect to time of the voltage used to create the second electric field, taken over the second period) be greater than the first addressing impulse.

This invention also provides a method of driving an electrophoretic medium comprising a fluid and at least a first species of particles disposed in the fluid, the method comprising:
 (a) applying a first addressing impulse to the medium, thereby causing the first species of particles to move in one direction relative to the electric field; and
 (b) applying a second addressing impulse, larger than the first addressing impulse but having the same polarity, to the medium, thereby causing the first species of particles to move in the opposed direction relative to the electric field.

This invention also provides an electrophoretic display capable of rendering multiple different colors, the display comprising an electrophoretic medium comprising a fluid and a plurality of particles disposed in the fluid, the display further comprising first and second electrodes disposed on opposed sides of the electrophoretic medium, wherein upon application of a first addressing impulse to the electrophoretic medium the particles move towards the first electrode, but upon application of a second addressing impulse, larger than but of the same polarity as the first addressing impulse, the particles move towards the second electrode.

In one form of such an electrophoretic display, upon application of the first addressing impulse the particles move towards the more positive electrode but upon application of the second addressing impulse the particles move towards the more negative electrode. In such an electrophoretic display, the particles will normally have a negative charge when no electric field is being applied to the particles. Such a display may further comprise a second type of particles which have a color different from the first type of particles and which move towards the more negative electrode upon application of either the first or second addressing impulse.

The aforementioned media and displays of the present invention may hereinafter for convenience be referred to as the charge-switching particles or CSP media and displays of the invention.

In another aspect, this invention provides an electrophoretic medium comprising a fluid and first, second and third species of particles disposed in the fluid. The first species of particles bear charges of one polarity, while the second and third species of particles bear charges of the opposite polarity. The characteristics of the first, second and third species of particles are such that the particle-particle interactions are less between the particles of the first species and the particles of the second species than between the particles of the first species and the particles of the third species. When a first addressing impulse is applied to the electrophoretic medium, the first and third species of particles move in one direction relative to the electric field and the second species of particles move in the opposed direction relative to the electric field. When a second addressing impulse, larger than the first addressing impulse but of the same polarity is applied to the electrophoretic medium, the first species of particles move in said one direction relative to the electric field, while the second and third species of particles move in said opposed direction relative to the electric field.

In such electrophoretic medium, one way of controlling the interactions among the first, second and third species of particles is by controlling the type, amount and thickness of polymeric coatings on the particles. For example, to control the particle characteristics such that the particle-particle interactions are less between the particles of the first species and the particles of the second species than between the particles of the first species and the particles of the third species, the second species of particles may bear a polymeric surface treatment, and the third species of particles may either bearing no polymeric surface treatment or bearing a polymeric surface treatment having a lower mass coverage per unit area of the particle surface than the second species of particles. More generally, the Hamaker constant (which is a measure of the strength of the Van der Waals interaction between two particles, the pair potential being proportional to the Hamaker constant and inversely proportional to the sixth power of the distance between the two particles) and/or the interparticle spacing need(s) to be adjusted by judicious choice of the polymeric coating(s) on the three species of particles.

In another aspect, this invention provides an electrophoretic display capable of rendering multiple different colors, the display comprising an electrophoretic medium and first and second electrodes disposed on opposed sides of the electrophoretic medium. The electrophoretic medium comprises a fluid and a plurality of a first species of particles having a negative charge, a plurality a second species of particles having a positive charge, and a plurality of a third species of particles having a positive charge. The particle pair interactions, both Coulombic and attractive non-Coulombic, are less between the first species of particles and the second species of particles than between the first species of particles and the third species of particles. With a first addressing impulse the particles of the first and third species move towards the more positive electrode and the particles of the second species move towards the more negative electrode. However, with a second addressing impulse larger than the first addressing impulse, the particles of the first species move towards the more positive electrode or remain in the vicinity of the more positive electrode and the particles of the third species move towards the more negative electrode, while the particles of the second species remain in the vicinity of the more negative electrode.

For reasons which will appear below, these electrophoretic media and displays of the present invention may hereinafter for convenience be referred to as the spot color or SC media and displays of the invention.

In another aspect, this invention provides an electrophoretic medium comprising a fluid and first, second and third species of particles disposed in the fluid. The fluid is dyed a first color. The first species of particles are light-scattering, and bear charges of one polarity, while the second and third species of particles are non-light scattering, are of second and third colors respectively different from the first color and from each other, and bear charges of the opposite polarity. The characteristics of the first, second and third species of particles are such that the particle-particle interactions are less between the particles of the first species and the particles of the second species than between the particles of the first species and the particles of the third species. When a first addressing impulse is applied to the electrophoretic medium, the first and third species of particles move in one direction relative to the electric field and the second species of particles move in the opposed direction relative to the electric field. When a second addressing impulse, larger than the first addressing impulse but of the same polarity is applied to the electrophoretic medium, the first species of particles move in said one direction relative to the electric field, while the second and third species of particles move in said opposed direction relative to the electric field. When a third addressing impulse, larger than the second addressing impulse but of the same polarity is applied to the electrophoretic medium, the first species of particles move in said opposed direction relative to the electric field, while the second and third species of particles continue to move in said opposed direction relative to the electric field.

This invention also provides an electrophoretic display capable of rendering multiple different colors, the display comprising an electrophoretic medium and first and second electrodes disposed on opposed sides of the electrophoretic medium. The electrophoretic medium comprises a fluid dyed a first color; a plurality of a first species of light-scattering particles having a negative charge; a plurality of a second species of non-light scattering particles having a second color and a positive charge; and a plurality of a third species of non-light-scattering particles having a third color and a positive charge. The particle pair interactions (which may be adjusted in ways described above in relation to the SC media and displays of the present invention), both Coulombic and attractive non-Coulombic, are less between the first species of particles and the second species of particles than between the first species of particles and the third species of particles. When a first addressing impulse is applied to the display, the first and third species of particles move towards the more positive electrode and the pigment particles of the second type move towards the more negative electrode. When a second addressing impulse, larger than the first addressing impulse, is applied to the display, the first species of particles move towards the more positive electrode or remain in the vicinity of the more positive electrode and the third species of particles move towards the more negative electrode, while the second species of particles remain in the vicinity of the more negative electrode. When a third addressing impulse, larger than the second addressing impulse, is applied to the display, the first species of particles move towards the more negative electrode.

For reasons which will appear below, these electrophoretic media and displays of the present invention may hereinafter for convenience be referred to as the full color or FC media and displays of the invention.

Finally, the present invention provides an electrophoretic medium comprising a fluid and at least one type of charged particle disposed in the fluid and capable of moving through the fluid when an electric field is applied to the medium, the medium further comprising a charge-control adjuvant capable of imparting a more positive charge to the charged particles, wherein the charge-control adjuvant is a metal salt of a carboxylic acid, wherein the metal is chosen from the group consisting of lithium, magnesium, calcium, strontium, rubidium, barium, zinc, copper, tin, titanium, manganese, iron, vanadium, and aluminum.

This invention extends to a front plane laminate, double release sheet, inverted front plane laminate or electrophoretic display comprising an electrophoretic medium of the present invention. The displays of the present invention may be used in any application in which prior art electro-optic displays have been used. Thus, for example, the present displays may be used in electronic book readers, portable computers, tablet computers, cellular telephones, smart cards, signs, watches, shelf labels and flash drives.

BRIEF DESCRIPTION OF DRAWINGS

FIGS. 8A and 8B are schematic cross-sections through an encapsulated CSP electrophoretic display of the present invention showing the various optical states of the display under first and second addressing impulses.

FIGS. 10A and 10B are schematic cross-sections through an encapsulated SC electrophoretic display of the present invention showing the various optical states of the display under first and second addressing impulses.

FIGS. 11A-11D are schematic cross-sections through an encapsulated FC electrophoretic display of the present invention showing the various optical states of the display under first, second, third and opposite polarity addressing impulses.

DETAILED DESCRIPTION

Figure 1:
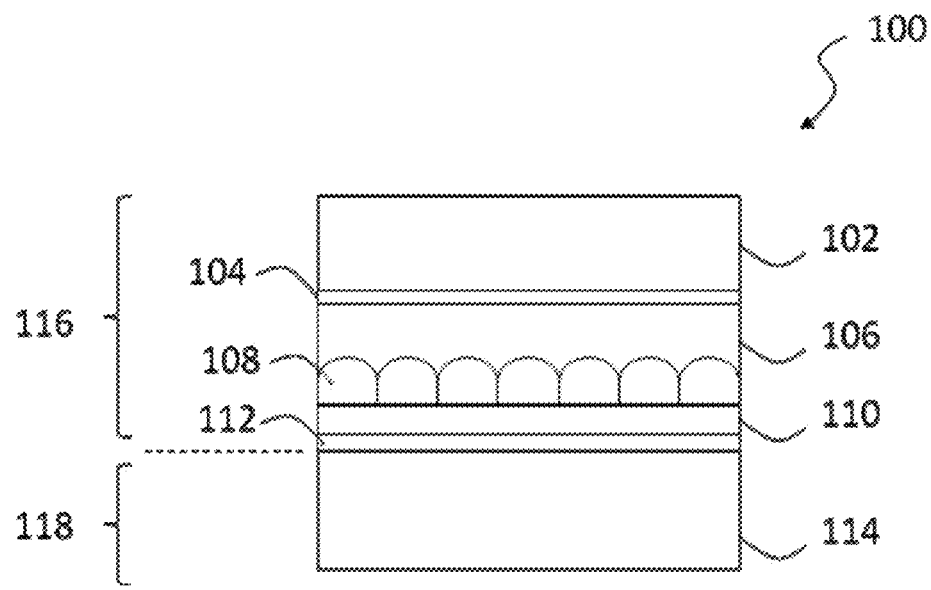
FIG. 1 of the accompanying drawings is a schematic cross-section through an electrophoretic display of the present invention.

As indicated above, the present invention provides various types of color electrophoretic media and displays. However, all these types of electrophoretic media and displays rely upon a colored particle being moved in one direction along an electric field when the medium or display is driven with a low addressing impulse and in the opposed direction along the electric field when the medium or display is driven with a higher addressing impulse. This reversal of the direction of movement of the colored particle upon increasing the addressing impulse may either be due to an actual reversal of the polarity of the charge on the colored particle (as in the CSP media and displays of the present invention) or due to the colored particle forming part of an aggregate with a second particle at low addressing impulse but becoming free from the aggregate at high addressing impulse (as in the SC and FC media and displays of the present invention).

It should be noted that, when using three subtractive primary colored materials (i.e., cyan, magenta, and yellow) to render mixed colors, regardless of whether the three colored materials are present in the same or different, stacked layers of an electrophoretic display, light must be selectively transmitted through at least two colored materials before being reflected back to the viewer, either by a white reflector (if all three materials are light-transmissive), or by the third back-scattering material. The third colored material may be light-transmissive or reflective, as described in more detail below. Thus, when three such subtractive primary colored materials are used in a medium or display of the present invention, it is necessary for at least two of the colored materials to be light-transmissive and not substantially back-scattering. Thus, for example, a magenta pigment intended to absorb green light must transmit blue and red light to underlying colored materials prior to the light being scattered back to the viewer in order to render colors such as red or blue.

In regions where (for example) green light is not to be absorbed, it is necessary that the green-absorbing, magenta colored material be removed from the optical path extending from the viewing surface of the display to the location at which light is scattered back to the viewer. This colored material removal may be achieved by concentrating the colored material in only a portion of the area of each pixel (thus, reducing its covering power) when it is not intended to be seen, and spreading the colored material over the whole pixel area when it is intended for the maximum amount of light to be absorbed. Hereinafter, spatially concentrating a colored material so as to reduce its areal covering power is referred to as shuttering the material. In the media and displays of the present invention, unwanted pigment particles are removed from the optical path not by shuttering, but by being concealed behind light-scattering particles, as seen from the viewing surface of the display.

Displays of the present invention can, in this way, reproduce the appearance of high quality color printing. Such high quality printing is typically effected using at least three colorants in a subtractive primary color system, typically cyan/magenta/yellow (CMY) and optionally black. It is often not appreciated that a so-called three-color CMY printing system is in reality a four-color system, the fourth color being the white background provided by the substrate (paper or similar) surface to which colorants are applied, and which performs the function of reflecting the light filtered by the subtractive colorants back to the viewer. Since there is no comparable background color in an essentially opaque electrophoretic medium unless it is being used in shutter mode, a non-shutter-mode electrophoretic medium should be capable of modulating four colors (white and three primary colors, the three primary colors typically being cyan, magenta and yellow, or red, green and blue). Optionally a black material may also be included, but it is possible to render black by a combination of cyan, magenta and yellow colors.

Before describing in detail preferred electrophoretic media and displays of the present invention, some general guidance will be given regarding materials for use in such media and displays, and preferred processes for their preparation.

The materials and processes used in preparing the media and displays of the present invention are generally similar to those used in similar prior art media and displays. As described for example in commonly-assigned U.S. Pat. No. 6,822,782, a typical electrophoretic medium comprises a fluid, a plurality of electrophoretic particles disposed in the fluid and capable of moving through the fluid (i.e., translating, and not simply rotating) upon application of an electric field to the fluid. The fluid also typically contains at least one charge control agent (CCA), a charging adjuvant, and a polymeric rheology modifier. These various components will now be described separately.

A: Fluid

The fluid contains the charged electrophoretic particles, which move through the fluid under the influence of an electric field. A preferred suspending fluid has a low dielectric constant (about 2), high volume resistivity (about $10^{15}$ Ohm·cm), low viscosity (less than 5 mPas), low toxicity and environmental impact, low water solubility (less than 10 parts per million (ppm), if traditional aqueous methods of encapsulation are to be used; note however that this requirement may be relaxed for non-encapsulated or certain microcell displays), a high boiling point (greater than about 90° C.), and a low refractive index (less than 1.5). The last requirement arises from the use of scattering (typically white) pigments of high refractive index, whose scattering efficiency depends upon a mismatch in refractive index between the particles and the fluid.

Organic solvents such as saturated linear or branched hydrocarbons, silicone oils, halogenated organic solvents, and low molecular weight halogen-containing polymers are some useful fluids. The fluid may comprise a single component or may be a blend of more than one component in order to tune its chemical and physical properties. Reactants or solvents for the microencapsulation process (if used), such as oil soluble monomers, can also be contained in the fluid.

Useful organic fluids include, but are not limited to, saturated or unsaturated hydrocarbons (such as, but are not limited to, dodecane, tetradecane, the aliphatic hydrocarbons in the Isopar (Registered Trade Mark) series (Exxon, Houston, Tex.), Norpar (Registered Trade Mark) (a series of normal paraffinic liquids), Shell-Sol (Registered Trade Mark) (Shell, Houston, Tex.), and Sol-Trol (Registered Trade Mark) (Shell), naphtha, and other petroleum solvents; silicone oils (such as, but are not limited to, octamethyl cyclosiloxane and higher molecular weight cyclic siloxanes, poly(methyl phenyl siloxane), hexamethyldisiloxane, and polydimethylsiloxane; vinyl ethers, such as cyclohexyl vinyl ether and Decave (Registered Trade Mark of International Flavors & Fragrances, Inc., New York, N.Y.); aromatic hydrocarbons, such as toluene; and halogenated materials including, but not limited to, tetrafluorodibromoethylene, tetrachloroethylene, trifluorochloroethylene, 1,2,4-trichlorobenzene and carbon tetrachloride and perfluoro- or partially-fluorinated hydrocarbons.

It is advantageous in some electrophoretic media of the present invention for the fluid to contain an optically absorbing dye. This dye must be soluble or dispersible in the fluid, but will generally be insoluble in the other components of the microcapsule. There is much flexibility in the choice of dye material. The dye can be a pure compound, or blends of dyes may be used to achieve a particular color, including black. The dyes can be fluorescent, which would produce a display in which the fluorescence properties depend on the position of the particles. The dyes can be photoactive, changing to another color or becoming colorless upon irradiation with either visible or ultraviolet light, providing another means for obtaining an optical response. Dyes could also be polymerizable by, for example, thermal, photochemical or chemical diffusion processes, forming a solid absorbing polymer inside the bounding shell.

Many dyes can be used in electrophoretic media. Important dye properties include light fastness, solubility or dispersibility in the fluid, color, and cost. The dyes are generally chosen from the classes of azo, azomethine, fluoran, anthraquinone, and triphenylmethane dyes and may be chemically modified so as to increase their solubility in the fluid and reduce their adsorption to the particle surfaces.

B: Electrophoretic Particles

The electrophoretic particles used in the media and displays of the present invention are preferably white, black, yellow, magenta, cyan, red, green, or blue in color, although other (spot) colors may also be used. There is much flexibility in the choice of such particles. For purposes of this invention, an electrophoretic particle is any particle that is insoluble in the fluid and charged or capable of acquiring a charge (i.e., has or is capable of acquiring electrophoretic mobility). In some cases, this mobility may be zero or close to zero (i.e., the particles will not move). The particles may be, for example, non-derivatized pigments or dyed (laked) pigments, or any other component that is charged or capable of acquiring a charge. Typical considerations for the electrophoretic particle are its optical properties, electrical properties, and surface chemistry. The particles may be organic or inorganic compounds, and they may either absorb light or scatter light, i.e., the particles for use in the invention may include scattering pigments, absorbing pigments and luminescent particles. The particles may be retroreflective or they may be electroluminescent, such as zinc sulfide particles, or they may be photoluminescent.

The electrophoretic particle may have any shape, i.e., spherical, plate-like or acicular. A scattering particle typically has high refractive index, high scattering coefficient, and low absorption coefficient and may be composed of an inorganic material such as rutile (titania), anatase (titania), barium sulfate, zirconium oxide, kaolin, or zinc oxide. Other particles are absorptive, such as carbon black or colored organic or inorganic pigments such as are used in paints and inks. A reflective material can also be employed, such as a metallic particle. Useful particle diameters may range from 10 nm up to about 10 μm, although for light-scattering particles it is preferred that the particle diameter not be smaller than about 200 nm.

Useful raw pigments for use in the electrophoretic particles include, but are not limited to, $PbCrO_4$, Cyan blue GT 55-3295 (American Cyanamid Company, Wayne, N.J.), Cibacron Black BG (Ciba Company, Inc., Newport, Del.), Cibacron Turquoise Blue G (Ciba), Cibalon Black BGL (Ciba), Orasol Black BRG (Ciba), Orasol Black RBL (Ciba), Acetamine Black, CBS (E. I. du Pont de Nemours and Company, Inc., Wilmington, Del., hereinafter abbreviated du Pont), Crocein Scarlet N Ex (du Pont) (27290), Fiber Black VF (du Pont) (30235), Luxol Fast Black L (du Pont) (Solv. Black 17), Nirosine Base No. 424 (du Pont) (50415 B), Oil Black BG (du Pont) (Solv. Black 16), Rotalin Black RM (du Pont), Sevron Brilliant Red 3 B (du Pont); Basic Black DSC (Dye Specialties, Inc.), Hectolene Black (Dye Specialties, Inc.), Azosol Brilliant Blue B (GAF, Dyestuff and Chemical Division, Wayne, N.J.) (Solv. Blue 9), Azosol Brilliant Green BA (GAF) (Solv. Green 2), Azosol Fast Brilliant Red B (GAF), Azosol Fast Orange RA Conc. (GAF) (Solv. Orange 20), Azosol Fast Yellow GRA Conc. (GAF) (13900 A), Basic Black KMPA (GAF), Benzofix Black CW-CF (GAF) (35435), Cellitazol BNFV Ex Soluble CF (GAF) (Disp. Black 9), Celliton Fast Blue AF Ex Conc (GAF) (Disp. Blue 9), Cyper Black IA (GAF) (Basic Black 3), Diamine Black CAP Ex Conc (GAF) (30235), Diamond Black EAN Hi Con. CF (GAF) (15710), Diamond Black PBBA Ex (GAF) (16505); Direct Deep Black EA Ex CF (GAF) (30235), Hansa Yellow G (GAF) (11680); Indanthrene Black BBK Powd. (GAF) (59850), Indocarbon CLGS Conc. CF (GAF) (53295), Katigen Deep Black NND Hi Conc. CF (GAF) (15711), Rapidogen Black 3 G (GAF)

(Azoic Black 4); Sulphone Cyanine Black BA-CF (GAF) (26370), Zambezi Black VD Ex Conc. (GAF) (30015); Rubanox Red CP-1495 (The Sherwin-Williams Company, Cleveland, Ohio) (15630); Raven 11 (Columbian Carbon Company, Atlanta, Ga.), (carbon black aggregates with a particle size of about 25 μm), Statex B-12 (Columbian Carbon Co.) (a furnace black of 33 μm average particle size), Greens 223 and 425 (The Shepherd Color Company, Cincinnati, Ohio 45246); Blacks 1, 1G and 430 (Shepherd); Yellow 14 (Shepherd); Krolor Yellow KO-788-D (Dominion Colour Corporation, North York, Ontario; KROLOR is a Registered Trade Mark); Red Synthetic 930 and 944 (Alabama Pigments Co., Green Pond, Ala. 35074), Krolor Oranges KO-786-D and KO-906-D (Dominion Colour Corporation); Green GX (Bayer); Green 56 (Bayer); Light Blue ZR (Bayer); Fast Black 100 (Bayer); Bayferrox 130M (Bayer BAYFERROX is a Registered Trade Mark); Black 444 (Shepherd); Light Blue 100 (Bayer); Light Blue 46 (Bayer); Yellow 6000 (First Color Co., Ltd., 1236-1, Jungwang-dong, Siheung-city, Kyonggi-do, Korea 429-450), Blues 214 and 385 (Shepherd); Violet 92 (Shepherd); and chrome green.

The electrophoretic particles may also include laked, or dyed, pigments. Laked pigments are particles that have a dye precipitated on them or which are stained. Lakes are metal salts of readily soluble anionic dyes. These are dyes of azo, triphenylmethane or anthraquinone structure containing one or more sulphonic or carboxylic acid groupings. They are usually precipitated by a calcium, barium or aluminum salt onto a substrate. Typical examples are peacock blue lake (Cl Pigment Blue 24) and Persian orange (lake of Cl Acid Orange 7), Black M Toner (GAF) (a mixture of carbon black and black dye precipitated on a lake).

It is preferred that pigments in the three subtractive primary colors (yellow, magenta and cyan) have high extinction coefficients and sufficiently small particle size as to be substantially non scattering of incident light.

Particularly preferred raw pigment particles of the present invention are the black spinels described in U.S. Pat. No. 8,270,064; titania, preferably with a silica, alumina or zirconia coating; red: Pigment Red 112, Pigment Red 179, Pigment Red 188 and Pigment Red 254; green: Pigment Green 7; Blue: Pigment Violet 23; yellow: Pigment Yellow 74, Pigment Yellow 120, Pigment Yellow 138, Pigment Yellow 139, Pigment Yellow 151, Pigment Yellow 155, and Pigment Yellow 180; magenta: Pigment Violet 19, Pigment Red 52:2 and Pigment Red 122; cyan: Pigment Blue 15:2, Pigment Blue 15:3, Pigment Blue 15:4 and Pigment Blue 15:6.

Additional pigment properties which may be relevant are particle size distribution and light-fastness. Composite particle (i.e., polymeric particles that incorporate smaller pigment particles or dyes) may be used in the present invention. Pigments may be surface-functionalized as described below or may be used without functionalization.

It has long been known that the physical properties and surface characteristics of electrophoretic particles can be modified by adsorbing various materials on to the surfaces of the particles, or chemically bonding various materials to these surfaces; see U.S. Pat. No. 6,822,782, especially column 4, line 27 to column 5, line 32. This same U.S. patent demonstrates that there is an optimum amount of polymer which should be deposited (too large a proportion of polymer in the modified particle causes an undesirable reduction in the electrophoretic mobility of the particle) and that the structure of the polymer used to form the coating on the particle is important.

C: Charge Control Agents

The electrophoretic media of the present invention will typically contain a charge control agent (CCA), and may contain a charge director. These electrophoretic media components typically comprise low molecular weight surfactants, polymeric agents, or blends of one or more components and serve to stabilize or otherwise modify the sign and/or magnitude of the charge on the electrophoretic particles. The CCA is typically a molecule comprising ionic or other polar groupings, hereinafter referred to as head groups. At least one of the positive or negative ionic head groups is preferably attached to a non-polar chain (typically a hydrocarbon chain) that is hereinafter referred to as a tail group. It is thought that the CCA forms reverse micelles in the internal phase and that it is a small population of charged reverse micelles that leads to electrical conductivity in the very non-polar fluids typically used as electrophoretic fluids.

Reverse micelles comprise a highly polar core (that typically contains water) that may vary in size from 1 nm to tens of nanometers (and may have spherical, cylindrical, or other geometry) surrounded by the non-polar tail groups of the CCA molecule. Reverse micelles have been extensively studied, especially in ternary mixtures such as oil/water/surfactant mixtures. An example is the iso-octane/water/AOT mixture described, for example, in Fayer et al., J. Chem. Phys., 131, 14704 (2009). In electrophoretic media, three phases may typically be distinguished: a solid particle having a surface, a highly polar phase that is distributed in the form of extremely small droplets (reverse micelles), and a continuous phase that comprises the fluid. Both the charged particles and the charged reverse micelles may move through the fluid upon application of an electric field, and thus there are two parallel pathways for electrical conduction through the fluid (which typically has a vanishingly small electrical conductivity itself).

The polar core of the CCA is thought to affect the charge on surfaces by adsorption onto the surfaces. In an electrophoretic display, such adsorption may be onto the surfaces of the electrophoretic particles or the interior walls of a microcapsule (or other solid phase, such as the walls of a microcell) to form structures similar to reverse micelles, these structures hereinafter being referred to as hemi-micelles. When one ion of an ion pair is attached more strongly to the surface than the other (for example, by covalent bonding), ion exchange between hemi-micelles and unbound reverse micelles can lead to charge separation in which the more strongly bound ion remains associated with the particle and the less strongly bound ion becomes incorporated into the core of a free reverse micelle.

It is also possible that the ionic materials forming the head group of the CCA may induce ion-pair formation at the particle (or other) surface. Thus the CCA may perform two basic functions: charge-generation at the surface and charge-separation from the surface. The charge-generation may result from an acid-base or an ion-exchange reaction between some moiety present in the CCA molecule or otherwise incorporated into the reverse micelle core or fluid, and the particle surface. Thus, useful CCA materials are those which are capable of participating in such a reaction, or any other charging reaction as known in the art.

Non-limiting classes of charge control agents which are useful in the media of the present invention include organic sulfates or sulfonates, metal soaps, block or comb copolymers, organic amides, organic zwitterions, and organic phosphates and phosphonates. Useful organic sulfates and sulfonates include, but are not limited to, sodium bis(2-ethylhexyl)sulfosuccinate, calcium dodecylbenzenesulfonate, calcium petroleum sulfonate, neutral or basic barium dinonylnaphthalene sulfonate, neutral or basic calcium dinonylnaphthalene sulfonate, dodecylbenzenesulfonic acid sodium salt, and ammonium lauryl sulfate. Useful metal soaps include, but are not limited to, basic or neutral barium petronate, calcium petronate, cobalt, calcium, copper, manganese, magnesium, nickel, zinc, aluminum and iron salts of carboxylic acids such as naphthenic, octanoic, oleic, palmitic, stearic, and myristic acids and the like. Useful block or comb copolymers include, but are not limited to, AB diblock copolymers of (A) polymers of 2-(N,N-dimethylamino)ethyl methacrylate quaternized with methyl p-toluenesulfonate and (B) poly(2-ethylhexyl methacrylate), and comb graft copolymers with oil soluble tails of poly(12-hydroxystearic acid) and having a molecular weight of about 1800, pendant on an oil-soluble anchor group of poly(methyl methacrylate-methacrylic acid). Useful organic amides/amines include, but are not limited to, polyisobutylene succinimides such as OLOA 371 or 1200 (available from Chevron Oronite Company LLC, Houston, Tex.), or Solsperse 17000 (available from Lubrizol, Wickliffe, Ohio: Solsperse is a Registered Trade Mark), and N-vinylpyrrolidone polymers. Useful organic zwitterions include, but are not limited to, lecithin. Useful organic phosphates and phosphonates include, but are not limited to, the sodium salts of phosphated mono- and di-glycerides with saturated and unsaturated acid substituents. Useful tail groups for CCA include polymers of olefins such as poly(isobutylene) of molecular weight in the range of 200-10,000. The head groups may be sulfonic, phosphoric or carboxylic acids or amides, or alternatively amino groups such as primary, secondary, tertiary or quaternary ammonium groups.

Charge adjuvants used in the media of the present invention may bias the charge on electrophoretic particle surfaces, as described in more detail below. Such charge adjuvants may be Bronsted or Lewis acids or bases.

Particle dispersion stabilizers may be added to prevent particle flocculation or attachment to the capsule or other walls or surfaces. For the typical high resistivity liquids used as fluids in electrophoretic displays, non-aqueous surfactants may be used. These include, but are not limited to, glycol ethers, acetylenic glycols, alkanolamides, sorbitol derivatives, alkyl amines, quaternary amines, imidazolines, dialkyl oxides, and sulfosuccinates.

D: Polymeric Additives

As described in U.S. Pat. No. 7,170,670, the bistability of electrophoretic media can be improved by including in the fluid a polymer having a number average molecular weight in excess of about 20,000, this polymer being essentially non-absorbing on the electrophoretic particles; poly(isobutylene) is a preferred polymer for this purpose.

Also, as described in for example, U.S. Pat. No. 6,693,620, a particle with immobilized charge on its surface sets up an electrical double layer of opposite charge in a surrounding fluid. Ionic head groups of the CCA may be ion-paired with charged groups on the electrophoretic particle surface, forming a layer of immobilized or partially immobilized charged species. Outside this layer is a diffuse layer comprising charged (reverse) micelles comprising CCA molecules in the fluid. In conventional DC electrophoresis an applied electric field exerts a force on the fixed surface charges and an opposite force on the mobile counter-charges, such that slippage occurs within the diffuse layer and the particle moves relative to the fluid. The electric potential at the slip plane is known as the zeta potential.

The electrophoretic motion of charged particles in a fluid is covered in most textbooks on colloid science. See, for example, Hiemenz, P. C. and Rajagopalan, R., Principles of Colloid and Surface Chemistry, 3rd ed., Marcel Dekker, NY, 1997. In systems of interest for electrophoretic displays, the dielectric constant is usually low (in the range of 2-10), and the number of ions small. In this regime the following equation holds:

$$\zeta = \frac{q}{4\Pi \varepsilon_0 \varepsilon_r a} \tag{1}$$

where $\zeta$ is the zeta potential; q is the net charge on the particle; $\varepsilon_0$ is the vacuum permittivity constant; $\varepsilon_r$ is the dielectric constant; and a is the particle radius. Note that a particle having a zeta potential of ~50 mV and a radius of ~150 nm therefore has a net charge of only about 10 electronic charge units in a medium of dielectric constant 2.

This concludes the general discussion of the components of electrophoretic media and displays. Preferred electrophoretic media and displays of the present invention will now be described with reference to the accompanying drawings.

FIG. 1 of the accompanying drawings is a schematic cross-section through an electrophoretic display (generally designated 100) of the present invention comprising an encapsulated electrophoretic medium; such a display, and methods for its manufacture are described in U.S. Pat. No. 6,982,178. The display 100 comprises a light-transmissive substrate 102, typically a transparent plastic film, such as a sheet of poly(ethylene terephthalate) (PET) about 25 to 200 µm in thickness. Although not shown in FIG. 1, the substrate 102 (the upper surface of which, as illustrated in FIG. 1, forms the viewing surface of the display) may comprise one or more additional layers, for example a protective layer to absorb ultra-violet radiation, barrier layers to prevent ingress of oxygen or moisture into the display, and anti-reflection coatings to improve the optical properties of the display.

The substrate 102 carries a thin, light-transmissive, electrically-conductive layer 104 that acts as the front electrode of the display. Layer 104 may comprise a continuous coating of electrically-conductive material with minimal intrinsic absorption of electromagnetic radiation in the visible spectral range such as indium tin oxide (ITO), poly(3,4-ethylenedioxythiophene)poly(styrenesulfonate) (PEDOT:PSS), graphene and the like, or may be a discontinuous layer of a material such as silver (in the form of, for example, nanowires or printed grids) or carbon (for example in nanotube form) that absorb or reflect visible light but are present at such a surface coverage that the layer as a whole is effectively transparent.

A layer (generically designated 108) of an electrophoretic medium is in electrical contact with the conductive layer 104 through an optional polymeric layer or layers 106, as described in more detail below. The electrophoretic medium 108 is shown as an encapsulated electrophoretic medium comprising a plurality of microcapsules. The microcapsules may be retained within a polymeric binder. Upon application of an electrical field across the layer 108, negatively-charged particles therein move towards the positive electrode and positively-charged particles move towards the negative electrode, so that the layer 108 appears, to an observer viewing the display through the substrate 102, to change color.

Although the display 100 is illustrated as having an encapsulated electrophoretic layer 108, this is not an essential feature of the present invention. Layer 108 may be encapsulated or comprise sealed or unsealed micro-cells or micro-cups, or may be non-encapsulated. When the layer is non-encapsulated, the electrophoretic internal phase (the electrophoretic particles and fluid) may be located between two planar electrodes, at least one of which is light-transmissive. The spacing between the electrodes may be controlled by the use of spacers, which may have the form of ribs or beads. Alternatively, the spacing may be controlled by the use of microcapsules containing the internal phase; the internal phase may be located within and outside the capsules. It is not necessary that the internal phase inside and outside the microcapsules be identical, although in certain circumstances this may be preferred. For example, if capsules containing the same internal phase as that outside the capsules are used as spacers it may be that the presence of the spacers is less easily discernible by a viewer of the display (since the internal and external internal phases would switch to at least substantially the same color).

As described in U.S. Pat. Nos. 6,982,178 and 7,012,735, the display 100 further comprises a layer 110 of lamination adhesive covering the electrophoretic layer 108. The lamination adhesive makes possible the construction of an electro-optic display by combining two subassemblies, namely a backplane 118 that comprises an array of pixel electrodes 112 and an appropriate arrangement of conductors to connect the pixel electrodes to drive circuitry, and a front plane 116 that comprises the substrate 102 bearing the transparent electrode 104, the electrophoretic layer 108, the lamination adhesive 110 and optional additional components such as polymeric layer or layers 106. To form the final display, the front plane 116 is laminated to the backplane 118 by means of lamination adhesive 110. The lamination adhesive may be cured thermally or by actinic radiation (for example, by UV curing) or may be uncured.

Since the lamination adhesive 110 is in the electrical path from the backplane electrodes 112 to the front electrode 104, its electrical properties must be carefully tailored. As described in U.S. Pat. No. 7,012,735 the lamination adhesive may comprise, in addition to a polymeric material, an ionic dopant that may be an additive selected from a salt, a polyelectrolyte, a polymer electrolyte, a solid electrolyte, a conductive metal powder, a ferrofluid, a non-reactive solvent, a conductive organic compound, and combinations thereof. The volume resistivities of encapsulated electrophoretic media of the present invention are typically around $10^{10}$ Ohm·cm, and the resistivities of other electro-optic media are usually of the same order of magnitude. Accordingly, the volume resistivity of the lamination adhesive is normally around $10^8$ to $10^{12}$ Ohm·cm at the operating temperature of the display, which is typically around 20° C.

Polymeric layer 106 may be a lamination adhesive layer with similar properties to those of lamination adhesive layer 110 (see for example U.S. Pat. No. 7,839,564), except that, since polymeric layer 106 is adjacent to the non-pixelated, light-transmissive common electrode 104, its electrical conductivity may be higher than that of lamination adhesive layer 110, which is adjacent to the pixelated back plane electrodes 112 and cannot be so conductive as to lead to significant currents flowing from one backplane electrode to its neighbors when they are held at different potentials during switching of the display. When polymeric layer 106 is a lamination adhesive it may be used to affix electrophoretic layer 108 to front electrode 104 during manufacture of the front plane as described in detail in the aforementioned U.S. Pat. No. 6,982,178.

Figure 2:
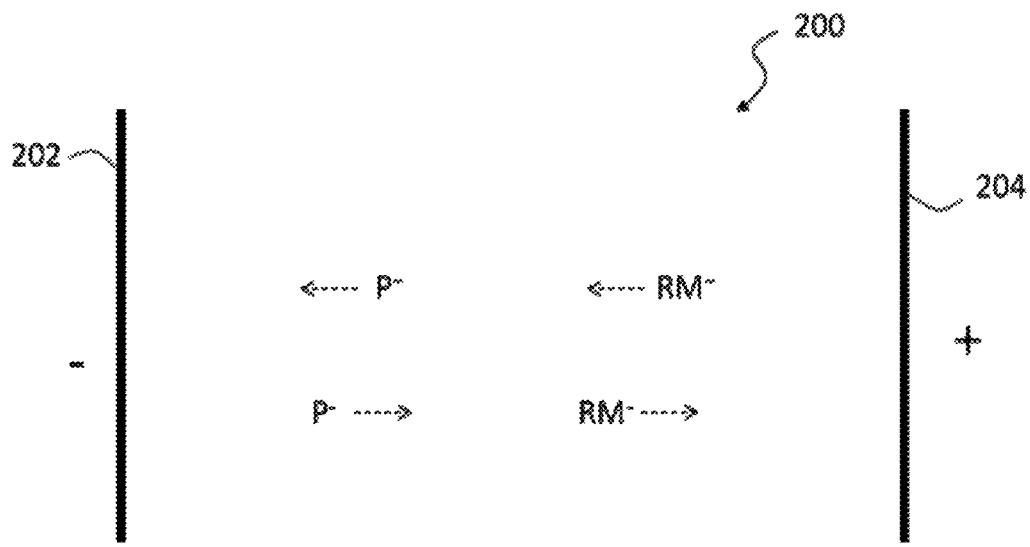
FIG. 2 is a highly schematic cross-section through an electrophoretic display having two non-blocked electrodes and shows the displacement of charged species within the electrophoretic fluid during switching.

FIG. 2 illustrates schematically the flux of charged materials that may occur within an electrophoretic medium of the present invention contained in a cell (generally designated 200) in response to an electric field applied by means of electrodes 202 and 204. Mobile charged species in the electrophoretic fluid are shown generically as charged particles P+ and P− and charged (reverse) micelles RM+ and RM−. Upon the application of an electric field, the charged species move, and as they do so, screen the field in the interior of the cell. If the electrodes are blocked (i.e., the electrodes do not allow the passage of an electrochemical current) the charged species pile up at the electrode interfaces until the field at the mid-point between the electrodes drops to zero. This polarization process can be thought of as a charging of interfacial capacitors by conduction through the electrophoretic internal phase (although, as will be appreciated by those of skill in the art, the situation is more complex than this basic picture would suggest, since dissociation of neutral reverse micelles to charged micelles can lead to charge generation within the internal phase).

Figure 3A:
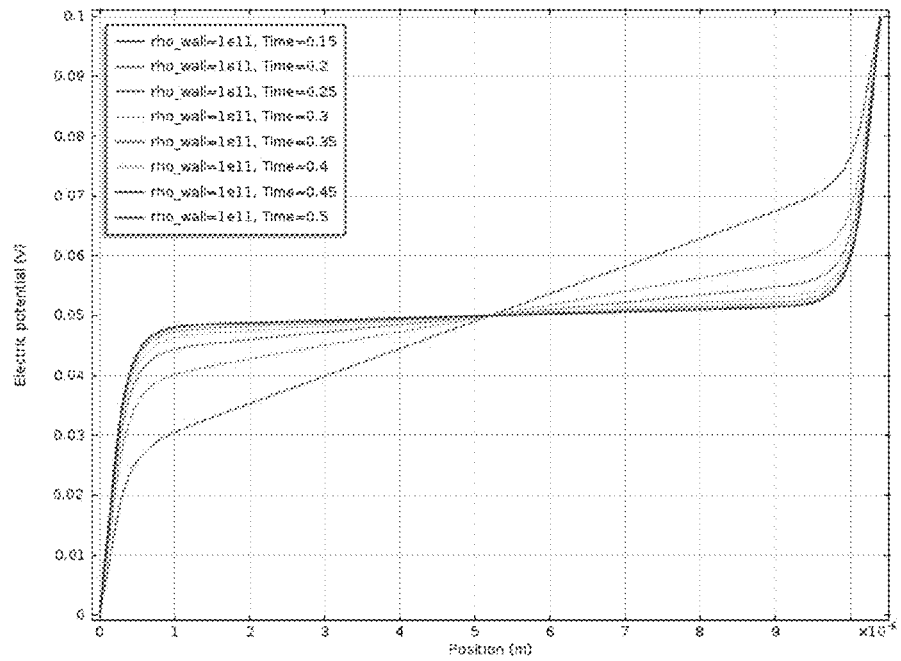
FIGS. 3A and 3B are graphs illustrating the electrical potential within an electrophoretic medium as a function of distance in the direction of an applied electric field.
Figure 3B:
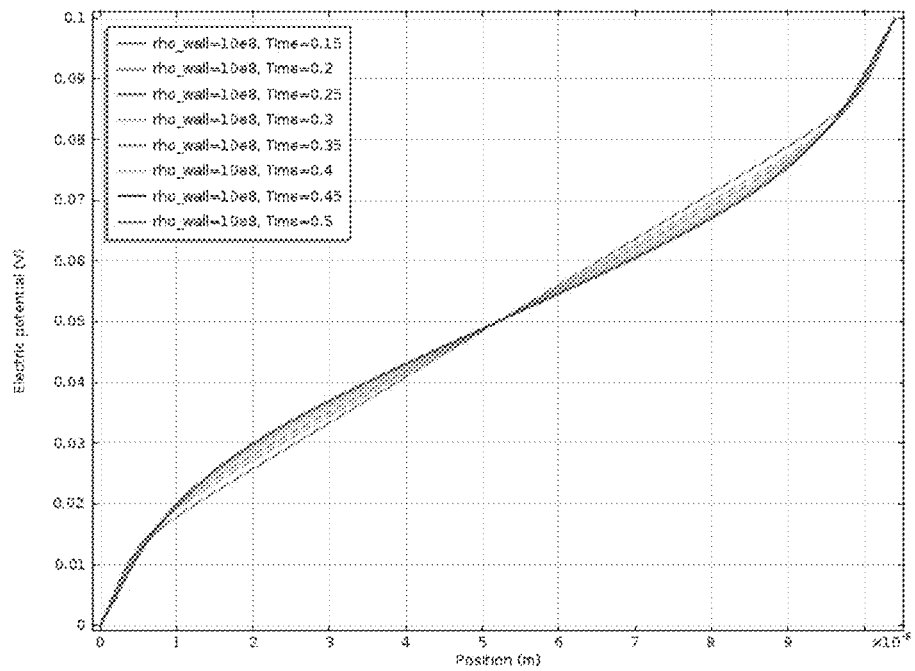

The movement of charged species in an arrangement such as that illustrated in FIG. 2 with blocked electrodes can be modeled using the Poisson-Nernst-Planck system of partial differential equations. Using the Butler-Volmer-Frumkin equation, the effect of electrochemical reactions at the electrodes can be incorporated into such a model. FIGS. 3A and 3B show the results of such modeling, and illustrate the electrical potential within an electrophoretic internal phase separating two electrodes as a function of the distance from a first electrode. FIG. 3A shows the evolution of this potential with time in the case where the electrodes are blocked; a large potential drop develops at the electrode interfaces, while the potential gradient at the center of the cell becomes zero. Therefore, after the polarization of the cell, the net flow of electrophoretic particles (and reverse micelles) ceases as drift and thermal diffusion balance each other. Note that the internal phase would experience an electric field equal and opposite to the initially applied field if, after complete polarization, the electrodes were both connected to ground (or brought to a common potential). This would result in erasure of any image on the medium (the so-called kick-back problem).

FIG. 3B illustrates the case in which electrochemical reactions (charge injection) can occur at the electrode interfaces. In this case, after an initial polarization, the electric field in the vicinity of the electrodes becomes high enough that electrons are transferred in both direction between molecules in the internal phase and the electrodes. Materials are oxidized at the anode and reduced at the cathode. Provided that there is a sufficient supply of redox-active materials adjacent the electrodes, a steady-state current flows in the cell 200 (and the potential gradient at the center of the cell is non-zero).

Figure 4:
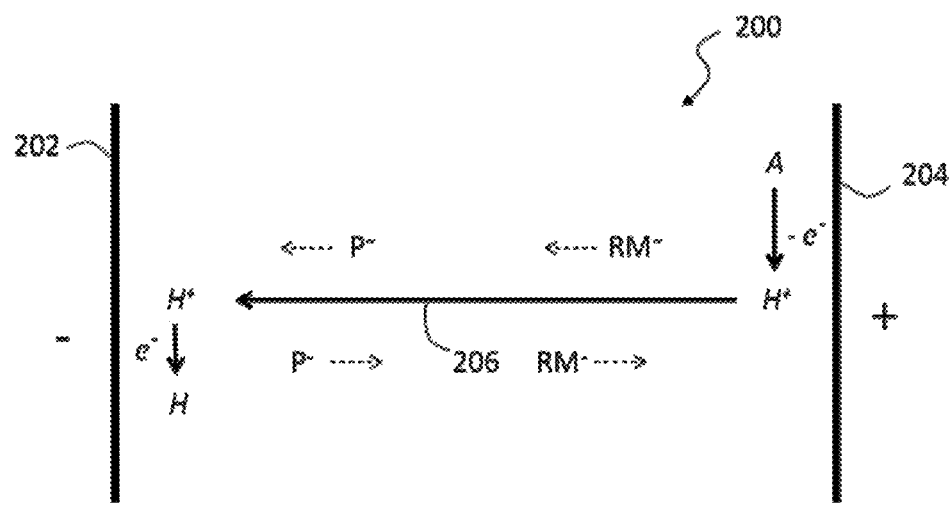
FIG. 4 is a highly schematic cross-section, similar to that of FIG. 2, through an electrophoretic display having two non-blocked electrodes and shows the displacement of charged species during switching with an additional flow of electrochemically-generated ions.

FIG. 4 is a schematic cross-section similar to that of FIG. 2 but illustrates the case (just discussed with reference to FIG. 3B) where electrochemical reactions occur at the electrode interfaces. In FIG. 4 there is shown a unipolar electrochemical current; i.e., ions are generated at one electrode and consumed at the other. Thus, at the anode 204, species A loses an electron with the production of a proton, which travels through the internal phase as shown by arrow 206 to the cathode 202, where it is reduced to a neutral hydrogen species, shown in FIG. 4 as H, which may be hydrogen gas.

It is believed (although the invention is in no way limited by this belief) that one of the electrochemical reactions occurring in electrophoretic media of the present invention is water electrolysis. In pure water an oxidation of water takes place at the anode, with the production of protons, thus:

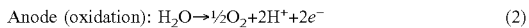

Anode (oxidation): $H_2O \rightarrow \frac{1}{2}O_2 + 2H^+ + 2e^-$ (2)

At the cathode, protons are reduced with the production of hydrogen (or other hydrogen radical products):

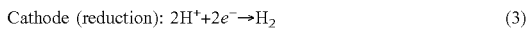

Cathode (reduction): $2H^+ + 2e^- \rightarrow H_2$ (3)

The net effect of these electrochemical reactions is to transfer protons from the anode to the cathode, with the consumption of water, as illustrated by the bold arrow 206 in FIG. 4. Note that the unipolar (one-directional) transfer of protons is in the opposite direction to the travel of the negatively-charged reverse micelles and pigments.

As mentioned above, the present invention provides an electrophoretic medium comprising a fluid and at least a first species of particles disposed in the fluid, the first species of particles being such that when a first electric field is applied to the medium for a first period, thereby applying a first addressing impulse to the medium, the first species of particles move in one direction relative to the electric field, but when a second electric field, having the same polarity as the first electric field, is applied to the medium for a second period, thereby applying a second addressing impulse larger than the first addressing impulse to the medium, the first species of particles move in the opposed direction relative to the electric field. For the purpose of providing a better understanding of the present invention, the following hypothesis as to how the pigment particles might move in a first direction with a first addressing impulse (i.e., behaving as though the particles bore a negative charge) and in a second direction with a second, higher addressing impulse (i.e., behaving as though the particles bore a positive charge) is provided, but the invention is in no way limited by this hypothesis.

Figure 5A:
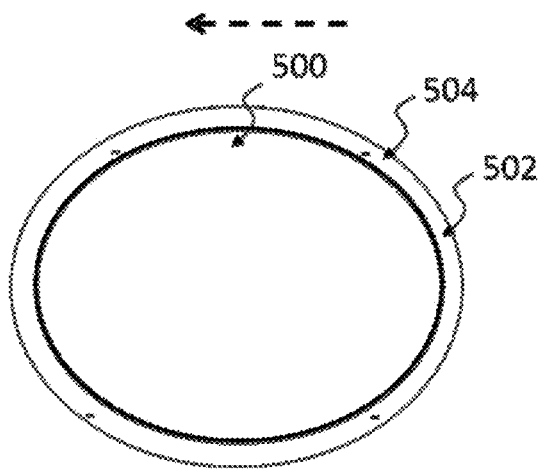
FIGS. 5A and 5B are schematic cross-sections, not to scale, through a negatively charge electrophoretic particle and surrounding fluid, and illustrate a hypothesis concerning the mode of transport of charge in the vicinity of the particle.
Figure 5B:
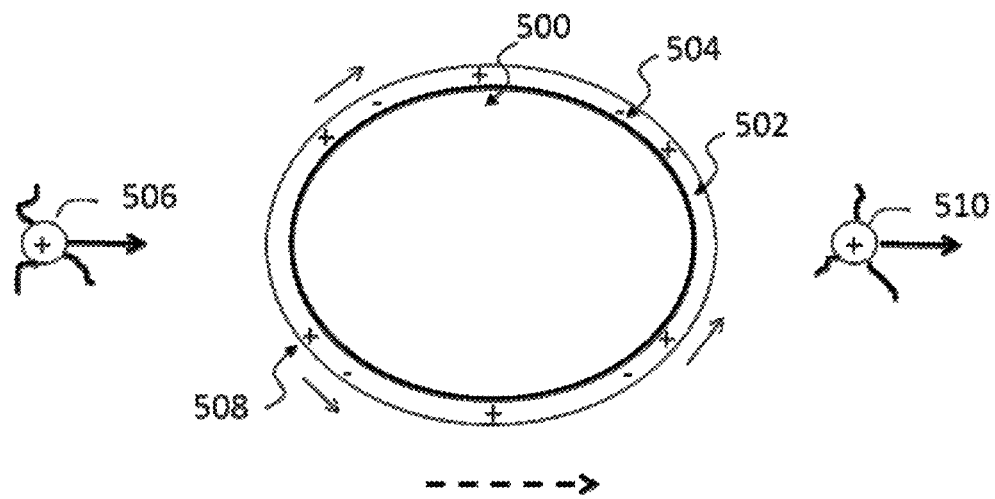

FIG. 5A shows a negatively-charged particle 500, having a net charge of four electronic charge units, that would, in the absence of an electrochemical current, move in the direction of the dashed arrow in FIG. 5A. Adsorbed on the particle 500 is a layer of hemi-micellar material 502 of high dielectric constant. (FIGS. 5A and 5B are not drawn to scale, and that the shapes of the particle and adsorbed layer are shown in idealized form as concentric ellipses. In fact the adsorbed layer is likely to be polarized, and may in fact not be a continuous layer nor of constant thickness.

The material of layer 502 is likely to have a similar composition to the core material in reverse micelles and contain water. Four surface-bound (or surface-adsorbed) negative charges 504 are illustrated, incorporated into the layer 502 of high dielectric constant. The counter-ions to these four charges form a non-attached, micellar diffuse layer (not shown) that can move in a direction opposite to that of the particle in an electric field, because these charges lie beyond the hydrodynamic slip envelope surrounding the particle. This is the normal condition for electrophoretic motion in a suspending liquid of low dielectric constant containing reverse micellar charged species.

As shown in FIG. 5B, the situation is thought to be different when a current, carried mostly by reverse micelles, flows through the internal phase. Such a current may result from electrochemical reactions at the electrodes or from displacement of charges from layers adjoining the internal phase. It is thought that the current is predominantly carried by charge-carriers of one sign; this may arise from particular electrochemical reactions (as mentioned above) or from differing mobilities of charge carriers of opposite polarities.

In FIG. 5B it is assumed that the charge carriers are predominantly positively-charged, as would be the case for electrolysis of water at neutral or acidic pH.

As previously mentioned, conduction within the highly non-polar fluid is likely to be mediated by charged reverse micelles or charged electrophoretic particles. Therefore, any electrochemically-generated protons (or other ions) are likely to be transported through the fluid in micelle cores or adsorbed on electrophoretic particles. In FIG. 5B a positively-charged reverse micelle 506 is shown approaching the particle 500, and traveling in the opposite direction from that in which the particle 500 would have traveled during polarization of the internal phase. A reverse micelle approaching a much larger particle may travel past the particle without interaction, or may be incorporated into the electric double layer around the oppositely charged particle. The electric double layer includes both the diffuse layer of charge with enhanced counter-ion concentration and the hemi-micellar surface-adsorbed coating on the particle; in the latter case, the reverse micelle charge would become associated with the particle within the slip envelope that, as noted above, defines the zeta potential of the particle. Therefore, while an electrochemical current of positively-charged ions is flowing, it is hypothesized that negatively-charged particles may become biased towards a more positive charge as a result of a type of ionic exchange at the particle surface driven by the transport of ions (such as ion 508 in FIG. 5B) through the fluid in micelle cores. It is further hypothesized that a reverse micelle might bud off from the particle as shown by reverse micelle 510 in FIG. 5B. The net charge on the particle would therefore be a function of the magnitude of the electrochemical current and the residence time of a positive charge close to the particle surface. This residence time is likely to be affected by the particle size, its surface chemistry, and the chemical nature of the micelles in the fluid and the hemi-micelles adsorbed onto the particle surface.

Figure 6:
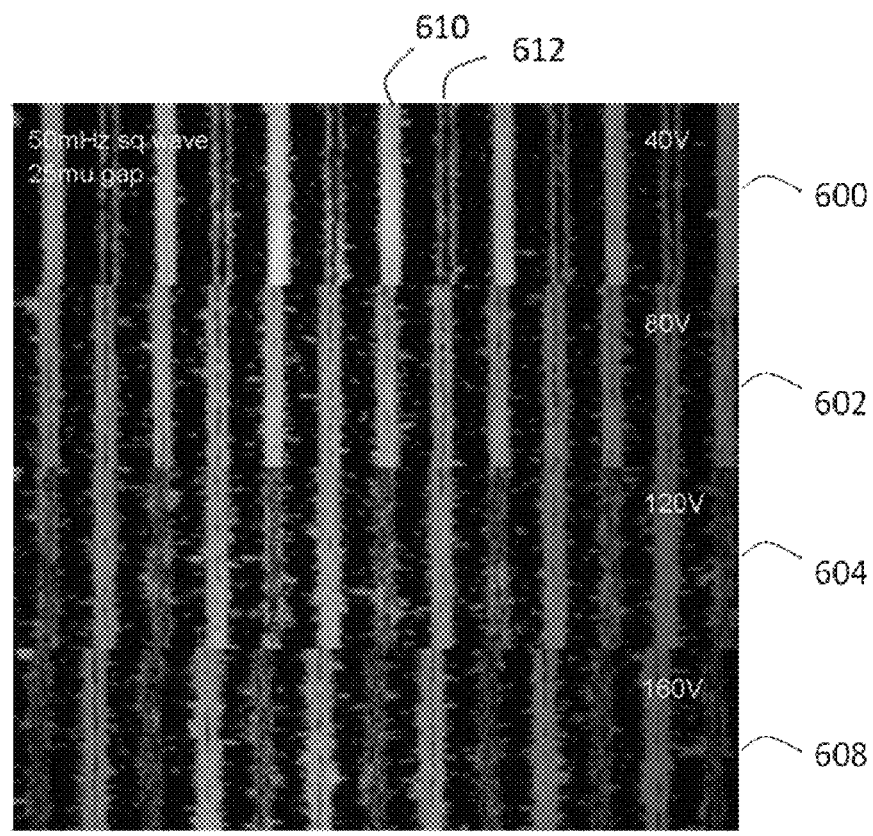
FIG. 6 shows micrographs of illustrating the movement of a negatively-charged white pigment in certain experiments described below.

FIG. 6 is a micrograph illustrating the result of one experiment intended to confirm the hypothesis set out above by tracing particle motions. FIG. 6 shows interdigitated electrodes disposed on a glass surface, separated by a 25 μm gap. A cell is constructed with the interdigitated electrodes as one boundary and a flat piece of glass as the second boundary. Between the two boundaries is placed an internal phase comprising a fluid (Isopar V), a CCA (Solsperse 17000) and a plurality of white (light-scattering) polymer-coated titania particles bearing a negative charge and having a zeta potential of approximately −40 mV; the polymer-coated titania was prepared substantially as described in Example 28 of U.S. Pat. No. 6,822,782. When one electrode is grounded and its neighbor is at +40V, the white particles collect at the more positive electrode. As the voltage is increased (and the current flow correspondingly increased) the white particles move towards the less positive electrode until, at +160V, the majority of the white particles collect in the vicinity of the less positive electrode. Because of the thickness of the experimental cell used, voltages used in this experiment are much higher than would be required in a commercial electrophoretic display, which uses a much thinner layer of electrophoretic medium.

Figure 7:
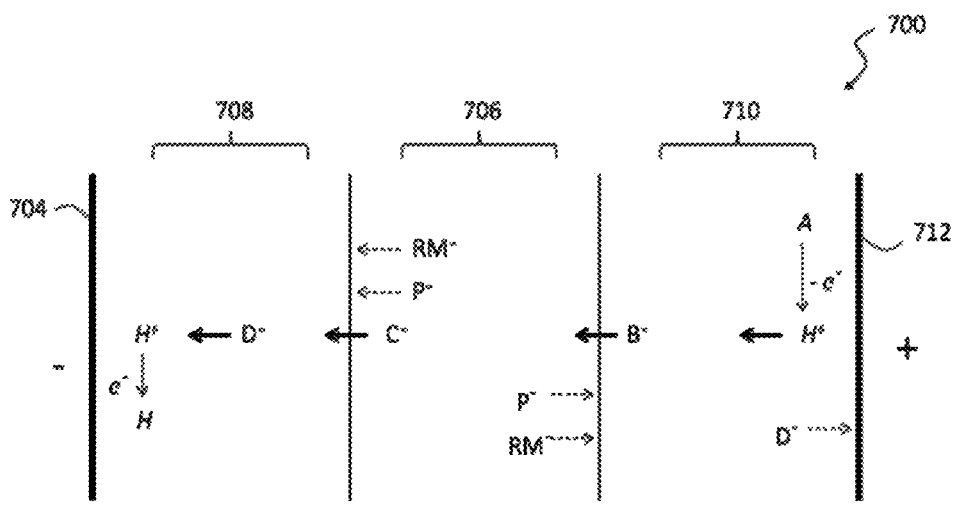
FIG. 7 is a highly schematic cross-section, similar to those of FIGS. 2 and 4, through an electrophoretic display and shows the displacement of charged species during switching with an additional flow of electrochemically-generated ions.

FIG. 7, which is schematic cross-section, similar to that of FIG. 4, through an electrophoretic display (generally designated 700) embodying the above principles. An electrophoretic medium layer 706 is sandwiched between polymeric lamination adhesive layers 708 and 710; only a single lamination adhesive layer need be used if an (encapsulated) internal phase fluid is coated directly onto one of electrodes 704 and 712. The electrochemical current flowing through the device is illustrated by the bold arrows. As noted above, the lamination adhesives may be doped with mobile ionic species, and it is not necessary that the (unipolar) current flowing between the anode 712 and the cathode 704 be carried by a common ion. Thus, cationic species B+ is shown as crossing the boundary between the lamination adhesive layer 710 and the electrophoretic layer 706, where B+ may be a proton or another positive ion. Likewise, ion C+ is shown crossing the boundary between the electrophoretic layer 706 and the lamination adhesive layer 708. Again, C+ could be a proton or another cation. At the cathode 704 itself, a proton is shown being reduced but this is not an essential feature of the present invention.

As noted above, in the present invention that the current flowing in the device is not necessarily electrochemical in origin; a displacement current comprising flow of ions B+ and C+ can suffice to induce the reversed direction motion of the negatively charged particles, provided that such a displacement current is unipolar. The above argument, in which it is assumed that the electrochemical or displacement current is unipolar in positively-charged ions, and can therefore lead to direction-reversal of negatively-charged particles, applies to a unipolar electrochemical current in negatively-charged ions, in which case it would be positive-charged particles which would reverse direction. In practice, however, it has been found easier to engineer direction-reversal of negatively-charged particles.

Furthermore, the unipolar nature of the current is not a requirement of the present invention, although it is easier to understand the observed phenomena (for example, the behavior documented in FIG. 6) if a unipolar current is assumed.

Various embodiments of electrophoretic media and displays of the present invention, and their use to form colored images, will now be described in more detail. In these embodiments the following general switching mechanisms are utilized:

(A) Conventional electrophoretic motion, in which particles with associated charge (either surface-bound or adsorbed) move in an electric field;
(B) Conventional racing particles, wherein particles of higher zeta potential move faster than particles of lower zeta potential (as described, for example, in U.S. Pat. No. 8,441,714 and earlier patents cited therein)
(C) Coulombic aggregation between particles of opposite sign, such that the aggregate moves in an electric field according to its net charge in the absence of an electrochemical (or displacement) current, but wherein the aggregate is separated by modulation of charge on at least one of the particles by the electrochemical (or displacement) current;
(D) Reversal of the direction of motion of at least one species of particles as a result of electrochemical (or displacement) current.

The waveforms used to drive displays of the present invention may modulate the electrical impulse provided to the display using any one or more of at least four different methods:

(i) Pulse width modulation, in which the duration of a pulse of a particular voltage is changed;
(ii) Duty cycle modulation, in which a sequence of pulses is provided whose duty cycle is changed according to the impulse desired;
(iii) Voltage modulation, in which the voltage supplied is changed according to the impulse required; and
(iv) A DC voltage offset applied to an AC waveform (which itself has net zero impulse)

Which of these methods is used depends upon the intended application and the exact form of display used. As noted above, herein the term impulse is used to denote the integral of the applied voltage with respect to time during the period in which a medium or display is addressed. Also as noted above, a certain electrochemical or displacement current is required for the change in direction of a (typically negatively-charged) species of particle or the disaggregation of Coulombic aggregates, and thus when a high impulse is to applied to a medium of display, the addressing voltage must be sufficient to provide such a current. Lower impulses may be provided by lower addressing voltages, or by reduction in the addressing time at the same higher voltage. As noted above, there is a polarization phase during which electrochemical currents are not at their maximum value, and during this polarization phase the particles move according to their native charge (i.e., the charge they bear before any addressing voltage is applied to the medium or display. Thus, low-impulse addressing at high voltage is ideally for a duration such as to polarize the electrophoretic medium but not lead to high steady-state current flow.

FIGS. 8A and 8B are schematic cross-sections showing various possible states of single microcapsule 800 (a sealed or unsealed microcell, or other similar enclosure may alternatively be used), containing a fluid 806 dyed with a yellow dye (uncharged yellow particles may be substituted for the yellow dye. Disposed in the fluid 806 are positively-charged light-transmissive magenta particles 802 and negatively-charged white particles 804. On the upper side of microcapsule 800, as illustrated in FIGS. 8A and 8B, is a substantially transparent front electrode 810, the upper surface of which (as illustrated) forms the viewing surface of the display, while on the opposed side of the microcapsule 800 is a rear or pixel electrode 812. In FIGS. 8A and 8B, and in similar later Figures, it will be assumed that the front electrode 810 remains at ground potential (although this is not an essential feature of the present invention, and variation of the potential of this electrode may be desirable in some instances, for example to provide higher electric fields), and that the electric field across microcapsule 800 is controlled by changing the voltage of the rear electrode 812.

FIG. 8A illustrates the two possible states of the microcapsule 800 when driven with a low impulse. Under such a low impulse, the particles 802 and 804 undergo conventional electrophoretic motion. As shown on the left hand side of FIG. 8A, when the rear electrode 812 is at a positive voltage, the white particles 804 move towards the rear electrode 812, while the magenta particles 802 lie adjacent the front electrode 810, so that the microcapsule 800 displays a red color caused by the combination of the magenta particles and the yellow dye viewed against the white background provided by the white particles. As shown on the right hand side of FIG. 8A, when the rear electrode 812 is at a negative voltage, the white particles 804 move adjacent the front electrode 810, and the microcapsule 800 displays a white color (both the yellow fluid 806 and the magenta particles 802 are masked by the white particles 804).

FIG. 8B illustrates the two possible states of the microcapsule 800 when driven with a high impulse. Under such a high impulse, the magenta particles 802 continue to undergo conventional electrophoretic motion. However, the white particles 804 undergo charge reversal and behave as if they were positively charged. Accordingly, as shown on the left hand side of FIG. 8B, when the rear electrode 812 is at a positive voltage, the magenta particles 802 lie adjacent the front electrode 810, but the white particles 804 also move towards the front electrode and are disposed deposited directly below the magenta particles, so that the microcapsule 800 displays a magenta color (light passing from the viewing surface through the magenta particles 802 is reflected from the white particles 804 back through the magenta particles 802 and out through the viewing surface; the white particles 804 mask the yellow fluid 806). As shown on the right hand side of FIG. 8B, when the rear electrode 812 is at a negative voltage, the white particles 804 move towards the rear electrode 812 and are disposed above the magenta particles 802, so the microcapsule displays a yellow color (light passing from the viewing surface is filtered by the yellow fluid 806 and reflected from the white particles 804 back through the yellow fluid 806 and out through the viewing surface; the white particles 804 mask the magenta particles 802). Thus, at low addressing impulses the complementary color pair white/red is produced, while at high addressing impulses the color pair yellow/magenta is produced.

Obviously, other combinations of colored particles and dyes can be substituted for the white and magenta particles, and yellow dye, used in FIGS. 8A and 8B. Especially preferred embodiments of the present invention are those in which one dye or particle has one of the additive primary colors, and another is of the complementary subtractive primary color. Thus, for example, the dye might be cyan and the two particles white and red. The four states afforded by this combination are white and black (at low impulse driving) and red and cyan (at high impulse driving). Similarly, green/magenta and blue/yellow combinations of dye and particle may be used, together with a white particle.

Figure 9:
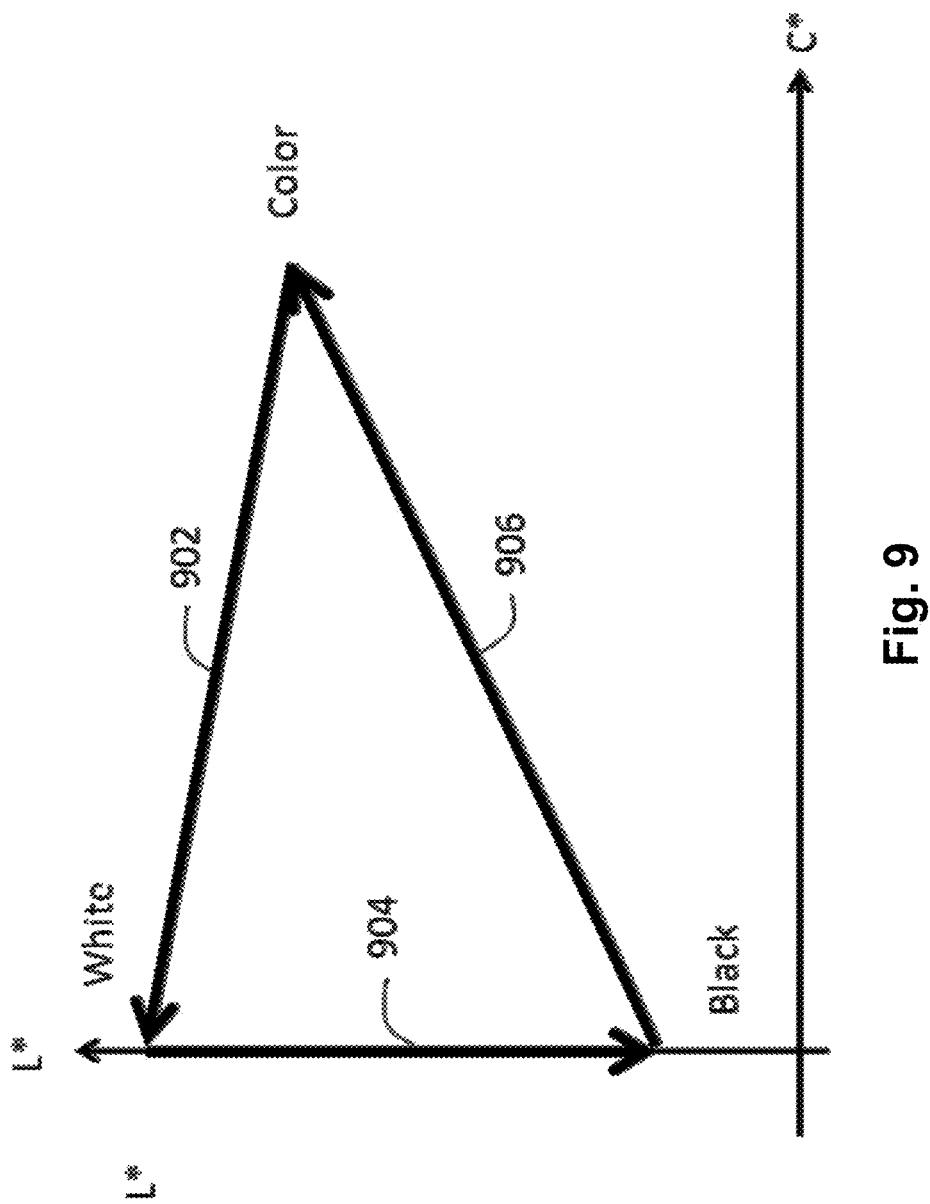
FIG. 9 is a graph showing the colors which can be produced by a CSP electrophoretic display of the present invention, such as that shown in FIGS. 8A and 8B.

FIGS. 9, 10A and 10B illustrate another embodiment of the present invention intended to provide black, white, and a single spot color. It is desirable in such displays to be able to provide intermediate gray levels between white and black, between white and the spot color, and between black and the spot color. FIGS. 10A and 10B illustrate a display in which the spot color is yellow.

FIG. 9 is a graph showing the CIE L* (lightness) and CIE C* (chroma) values obtainable from a display of this type. The display can be written to black, white, or the spot color (assumed yellow), and can attain intermediate states of gray (arrow 904), black/yellow (arrow 906) and white/yellow (arrow 902). For applications such as electronic book readers providing having a spot (highlight) color in addition to black and white, it is important for text and image rendering that these intermediate states be available.

FIGS. 10A and 10B illustrate schematically the various possible states of a display of the present invention. This display comprises a microcapsule 1000 having a grounded front electrode 1010 (the upper surface of which, as illustrated, provides the viewing surface of the display) and a rear electrode 1012. All these integers are essentially identical to the corresponding integers in FIGS. 8A and 8B. However, the fluid within the microcapsule 1000 is not dyed but has disposed therein three species of particles, namely positively-charged black particles 1008, positively-charged colored particles 1002 (illustrated as yellow) and negatively-charged white particles 1004. The yellow particles 1002 are light-transmissive and preferably substantially non-scattering. The charges are shown on the particles 1002, 1004 and 1008 are indicated as +2, −3 and +8 respectively, but these are for the purposes of illustration only and do not limit the scope of the present invention.

Black particles 1008 bear a polymeric coating (shown in FIGS. 10A and 10B as a bold outline). Yellow particles 1002 bear no polymeric coating, or a polymeric coating of lower coverage per unit area of the particles than that borne by the black particles 1008, and white particles 1004 also bear no polymeric coating, or a polymeric coating of lower coverage per unit area of the particles than that borne by the black particles 1008. The polymeric coating on the black particles 1008 ensures that a spacing is maintained between the black particles 1008 and the white particles 1004, such that any Coulombic aggregate formed between the particles 1004 and 1008 is sufficiently weak to be separated by a low addressing impulse. On the other hand, the absence or minimal amount of polymer on the yellow particles 1002 and the white particles 1004 enables much stronger aggregation between these two types of particles such that the aggregate is not separated by a low addressing impulse but can be separated by a high addressing impulse, as described in more detail below.

More generally, the Hamaker constant (which is a measure of the strength of the Van der Waals interaction between two particles, the pair potential being proportional to the Hamaker constant and inversely proportional to the sixth power of the distance between the two particles) and/or the interparticle spacing need(s) to be adjusted by judicious choice of the polymeric coating such that the particle pair interactions, both Coulombic and attractive non-Coulombic, are less between the white particles and the black particles than between the white particles and the yellow particles.

The effect of these inter-particles interactions is that, in the absence of an addressing impulse, or in the presence of a low addressing impulse, a Coulombic aggregate is formed between the yellow particles 1002 and the white particles 1004, and the two travel together as a weakly negatively-charged unit. Thus, in the absence of an electrochemical or displacement ionic current, the internal phase within the microcapsule 1000 fluid behaves as if it contained positive black and negative yellow particles. Under high-impulse driving conditions, on the other hand, the white particles 1004 and (possibly) the yellow particles 1002 are moved to a more positively charged state by the flux of electrochemically- or displacement-generated positive ions, as described above, and the strength of the Coulombic aggregate formed between the white and yellow particles is weakened. The electric field is now sufficient to separate the two types of particles, so that the yellow particles 1002 now move with the black particles 1008 towards the more negative electrode, while the white particles 1004, though more weakly negatively charged than they would be in the absence of an electric current through the internal phase, still migrate towards the more positive electrode.

The effect of these changes is shown in FIGS. 10A and 10B. The left hand side of FIG. 10A shows the microcapsule 1000 under low impulse driving conditions and with the rear electrode 1012 positive relative to the front electrode 1010. The black particles 1008 migrate to the front electrode 1010, while the white particle/yellow particle aggregates (which remain intact under the low impulse driving) migrate to the rear electrode 1012. The black particles mask the white and yellow particles, so that the microcapsule shows a black color. The right hand side of FIG. 10A shows the microcapsule 1000 under low impulse driving conditions but with the rear electrode 1012 negative relative to the front electrode 1010. The black particles 1008 migrate to the rear electrode 1010, while the white particle/yellow particle aggregates migrate to the front electrode 1010. The microcapsule 1000 thus displays a yellow color.

On the other hand, the left hand side of FIG. 10B shows the microcapsule 1000 under high impulse driving conditions and with the rear electrode 1012 positive relative to the front electrode 1010. The high impulse driving conditions disrupt the white particle/yellow particle aggregates, so that the white, yellow and black particles all move independently of one another. Accordingly, the black and yellow particles move adjacent the front electrode 1010, while the white particles move adjacent the rear electrode 1012, and the microcapsule displays a black color; the light-transmissive yellow particles do not affect the black color of this state since the light-absorbing black particles absorb all light incident on the viewing surface and also serve to mask the white particles. The right hand side of FIG. 10B shows the microcapsule 1000 under high impulse driving conditions but with the rear electrode 1012 negative relative to the front electrode 1010. The black and yellow particles move adjacent the rear electrode 1012, while the white particles move adjacent the front electrode 1010, and mask the black and yellow particles. Thus, the microcapsule displays a white color.

Thus, under low impulse driving conditions, the microcapsule 1000 can be switched between black and yellow states, while under high impulse driving conditions, the microcapsule can be switched between black and white states.

The driving sequence to display the spot color (yellow in FIG. 10A) and gray levels is as follows. Using a high impulse driving condition with the backplane positive (the left hand side of FIG. 10B), the display is driven to black. Then, using a low impulse driving condition with the backplane negative (the right hand side of FIG. 10A), the display is driven to yellow (following arrow 906 in FIG. 9. From the yellow state, high impulse driving with the backplane negative (the right hand side of FIG. 10B) produces a white state (following arrow 902 in FIG. 9). Finally, driving from white with a low impulse driving condition and the backplane positive (the left hand side of FIG. 10A) provides gray levels on the way to black (following arrow 904 in FIG. 9).

FIGS. 11A-11D of the accompanying drawings illustrate various states of a display which uses the principles of the displays shown in FIGS. 8A, 8B, 10A and 10B, and three different levels of driving impulse to provide a display in which each microcapsule is capable of displaying black and white and both the additive and subtractive primary colors (red, green, blue, cyan, magenta and yellow). In FIGS. 11A-11D, particle charges are shown for purposes of illustration only, and in no way limit the scope of the present invention.

Figure 11A:
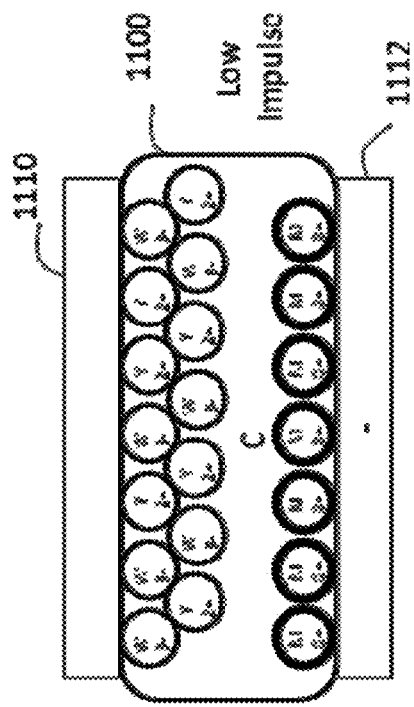
Figure 11A:
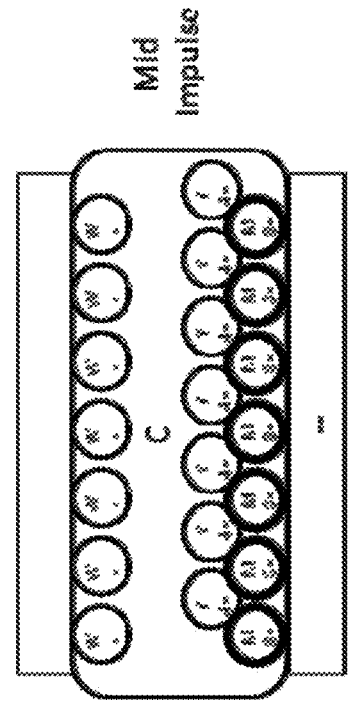

FIGS. 11A-11D show a microcapsule 1100 having a grounded front electrode 1110 (the upper surface of which, as illustrated, provides the viewing surface of the display) and a rear electrode 1112. All these integers are essentially identical to the corresponding integers in FIGS. 8A, 8B, 10A and 10B. The microcapsule 1100 contains a fluid 1108 dyed with a cyan dye. The fluid 1108 but has disposed therein three species of particles, namely positively-charged light-transmissive magenta particles 1102, positively-charged light-transmissive yellow particles 1104 and negatively-charged light-scattering white particles 1106. The magenta particles 1102 bear a polymeric coating, whereas the white and yellow particles 1104 and 1106 bear no or only a thin polymeric coating. Accordingly, under low impulse driving conditions, as shown in FIG. 11A, the microcapsule 1100 acts in a manner exactly analogous to the microcapsule 1000 shown in FIGS. 10A and 10B, with the white and yellow particles travelling together in a negatively charged aggregate, and the microcapsule 1100 can be switched between dark blue (see the left hand side of FIG. 11A) and yellow (see the right hand side of FIG. 11A) states. (The dark blue state being due to light entering from the viewing surface, passing through the cyan fluid, being reflected from the white particles and passing back through the cyan fluid and the magenta particles.) Since the white and yellow particles are aggregated together, and provide a weaker yellow than would be obtainable if the yellow particles were located between the viewer and the white particles, a very short pulse of higher impulse (insufficient to invert the positions of the magenta and white particles) may be used to separate the white from the yellow particles to enable a better yellow (or, in the state shown on the left hand side of FIG. 11A, a better blue) color. In the embodiment of the present invention shown in FIGS. 11A-11D, the weakest color is likely to be the complement to the particles having the lower positive charge (in FIGS. 11A-11D, these are the yellow particles and the weak color is therefore blue).

Under mid-impulse driving conditions (see FIG. 11B), the microcapsule also acts in a manner exactly analogous to the high impulse driving conditions of FIG. 10B; the aggregates between the white and yellow particles are broken, and all three species of particles travel independently, so that the microcapsules switches between black (see the left hand side of FIG. 11B) and white (see the right hand side of FIG. 11B) states. The only difference between FIGS. 10B and 11B is that in the latter the black state is caused by both the magenta and the yellow particles being disposed adjacent the front electrode 1110, and light passing through these particles and through the cyan fluid 1108.

When the driving impulse is increased even further (see FIG. 11C), the white particles behave as if they were positively charged, and all three pigments migrate towards the more negative electrode, such that successive magenta, yellow and white layers are formed reading outwardly from the more negative electrode cf. FIG. 8B. The resultant displayed colors are red (see the left hand side of FIG. 11C; the color is produced by light passing through the magenta and yellow particles, being reflected from the white particles and passing back through the magenta and yellow particles) and cyan (see the right hand side of FIG. 11C; the color is produced by light passing through the cyan fluid 1108, being reflected from the white particles and passing back through the cyan fluid).

The last two colors of the microcapsule 1100 are produced by the so-called polarity reversal states shown in FIG. 11D. To produce the green state shown on the left hand side of FIG. 11D, one first drives the microcapsule with a mid-level impulse with the rear electrode 1112 positive to produce the state shown on the left hand side of FIG. 11B, then reverses the rear electrode to a negative polarity and, still using a mid-level impulse, applies the negative polarity for a period sufficient to cause the highly charged magenta particles to move through the yellow and white particles until they lie adjacent the rear electrode and the microcapsule assumes the state shown on the left hand side of FIG. 11D. In this state, light entering the viewing surface passes through the cyan fluid and the yellow particles, is reflected from the white particles (which mask the magenta particles) and passes back through the yellow particles and the cyan fluid, so that the microcapsule displays a green color.

Figure 11B:
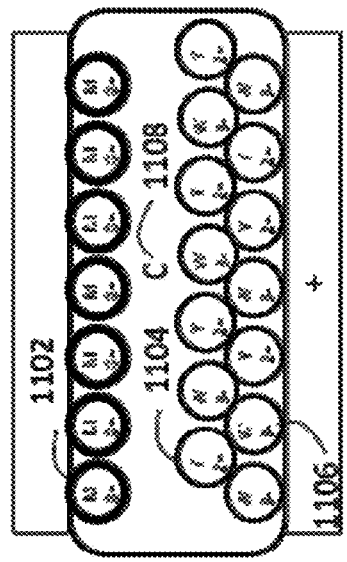
Figure 11B:
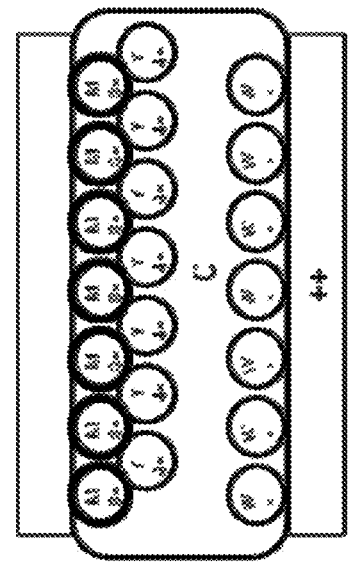

Similarly, the magenta state shown on the right hand side of FIG. 11D is produced by first driving the microcapsule with a mid-level impulse with the rear electrode 1112 negative to produce the state shown on the right hand side of FIG. 11B, then reversing the rear electrode to a positive polarity and, still using a mid-level impulse, applying the positive polarity for a period sufficient to cause the highly charged magenta particles to move through the yellow and white particles until they lie adjacent the front electrode and the microcapsule assumes the state shown on the right hand side of FIG. 11D. In this state, light entering the viewing surface passes through the magenta particles, is reflected from the white particles (which mask the yellow particles) and passes back through the magenta particles, so that the microcapsule displays a magenta color.

Electrophoretic media of the present invention comprise a fluid and at least the following additional components:
  (a) first and second particles bearing charge of opposite polarity; typically at least one, and normally both, of the particles bears a polymer surface coating, although as previously noted the possibility of controlling the particle-particle interactions in other ways is not excluded. For example, the microcapsule 1100 shown in FIGS. 11A-11D comprises is negatively charged white particles and positively charged magenta particles. The non-white particle is preferably substantially non-scattering (i.e., light-transmissive) and of one of the subtractive primary colors (yellow, magenta or cyan);
  (b) a third particle that may or may not bear a polymer surface coating (or other treatment for controlling particle-particle interactions) that has a lower mass coverage per unit area of the particle than the polymeric surface coatings of the first and second particles. More generally, the Hamaker constant and/or the interparticle spacing are adjusted by judicious choice of the polymer coating(s) such that the particle pair interactions, both Coulombic and attractive non-Coulombic, are less between the particles of the first type and the particles of the second type than between the particles of the first type and the particles of the third type. For example, the microcapsule 1100 shown in FIGS. 11A-11D comprises positively charged yellow particles. The third particle is preferably substantially non-scattering (i.e., light-transmissive) and of one of the subtractive primary colors different from that of the first or second pigments;
  (c) a dye that is soluble or dispersible in the fluid and of the third subtractive primary color; for example, the microcapsule 1100 shown in FIGS. 11A-11D comprises a cyan dye;
  (d) at least one charge-control agent;
  (e) a charging adjuvant; and
  (f) a polymeric stabilizer.

In one preferred embodiment of the present invention, the first (white) particle is a silanol-functionalized scattering material such as titanium dioxide to which a polymeric material has been attached; the second particle is a positively charged magenta material such as dimethylquinacridone that has been coated as described below, and the third pigment is, if cyan, a copper phthalocyanine material such as Heliogen (Registered Trade Mark) Blue D 7110 F, available from BASF, used uncoated, or, if yellow, an organic pigment such as Pigment Yellow 180, again used uncoated.

The dye in this preferred embodiment is a hydrocarbon (Isopar E)-soluble material that may be an azo dye such as Sudan I or Sudan II or derivatives thereof. Other hydrocarbon-soluble dyes such as azomethine (yellow and cyan are readily available) or other materials that are well-known in the art may also be used as shown in the Examples below. An especially preferred cyan dye for use in the media of the present invention is represented by the following structure:

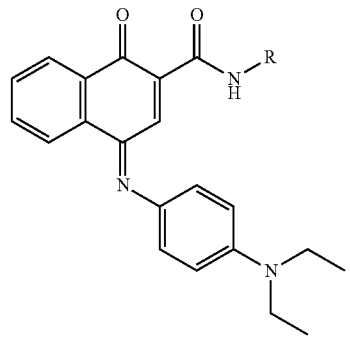

wherein R is a branched or unbranched hydrocarbon chain comprising at least six carbon atoms that may be saturated or unsaturated. It may be desirable to use a mixture of dyes, for example, mixtures of two or more dyes of the above formula having differing R groups. Use of such mixtures may afford better solubility in the hydrocarbon fluid while still allowing the individual dye molecules to be purified by recrystallization. The preparation of these dyes is described in Example 5 below.

Figure 12:
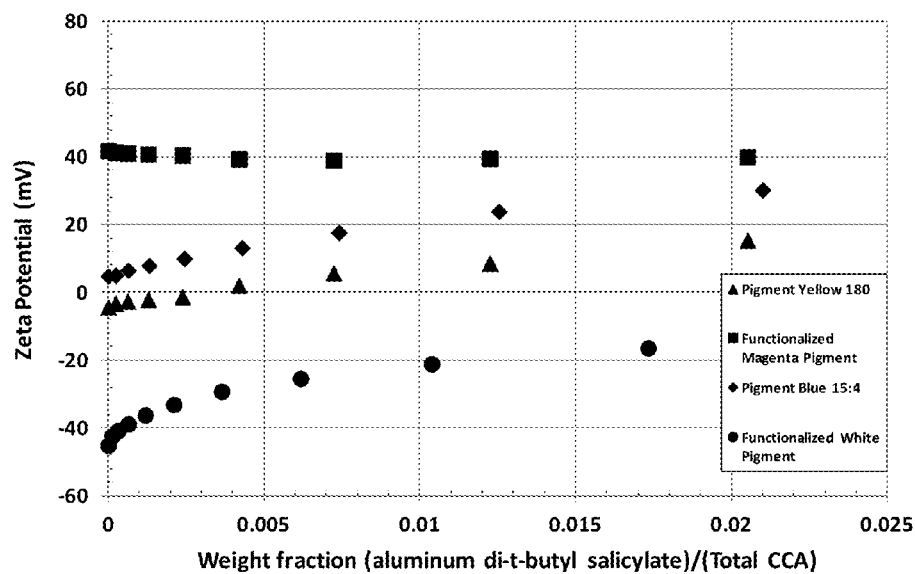
FIG. 12 is a graph illustrating the effect of adding minor proportions of aluminum di(t-butyl)salicylate as a charge control agent control of charging of pigments in electrophoretic fluids of the present invention.

The zeta potentials of the various particle in the presence of a single CCA (e.g., Solsperse 17000) may not be ideally arranged for switching as described above. A secondary (or co-) CCA can be added to the electrophoretic medium to adjust the zeta potentials of the various particles. Careful selection of the co-CCA may allow alteration of the zeta potential of one particle while leaving those of the other particles essentially unchanged, which allows close control of both the electrophoretic velocities of the various particles during switching and the inter-particle interactions. FIG. 12 is a graph showing the variation in the zeta potentials of four particles in the presence of Solsperse 17000 in Isopar E with the additions of small proportions of an acidic material (Bontron E-88, available from Orient Corporation, Kenilworth, N.J., and stated by the manufacturer to be the aluminum salt of di-t-butyl salicylic acid). Addition of the acidic material moves the zeta potential of many particles (though not all) to more positive values. It will be seen from FIG. 12 that use of 1% of the acidic material and 99% of Solsperse 17000 (based on total weight of the two materials) moves the zeta potential of Pigment Yellow 180 from about −5 mV to about +20 mV. The addition of the same proportion of acidic material changes the zeta potential of a polymer-coated white particle (prepared as described in U.S. Pat. No. 7,002,728) from about −45 mV to about −20 mV. However, the zeta potential of the magenta pigment is largely unchanged by addition of the aluminum salt. Whether or not the zeta potential of a particular particle is changed by a Lewis acidic material like the aluminum salt will depend upon the details of the surface chemistry of the particle.

The addition of a basic co-CCA (e.g., OLOA 371, available from Chevron Corporation, Sam Ramon, Calif.) will move the zeta potentials of various pigments to more negative values.

The following Examples are now given, though by way of illustration only, to shows details of particularly preferred materials, processes, conditions and techniques used to prepare the media and electrophoretic displays of the present invention.

Example 1

This Example illustrates the preparation of a two particle colored fluid electrophoretic display of the type illustrated in FIG. 8 of the accompanying drawings.

Part A: Preparation of a Magenta Pigment Dispersion

Ink Jet Magenta E 02 VP2621, available from Clariant, Basel, Switzerland, (15 g) was dispersed in toluene. The resultant dispersion was transferred to a 500 mL round-bottomed flask and the flask degassed with nitrogen. The reaction mixture was then brought to 42° C., and, upon temperature equilibration, 4-vinylbenzylchloride was added and the reaction was allowed to stir at 42° C. under nitrogen overnight. The resulting reaction mixture was allowed to cool to room temperature and then centrifuged to isolate the functionalized pigment. The centrifuge cake was washed with toluene (3×250 mL) to produce 14.76 g of a magenta pigment functionalized with a vinyl group to which a polymeric chain could be attached.

The dried pigment thus was dispersed in toluene with sonication and rolled on roll mill, and the resultant dispersion transferred to a two-neck 500 mL round-bottomed flask equipped with large magnetic stir bar and the flask was placed into a preheated silicone oil bath held at 65° C. Lauryl methacrylate was added to the flask, a Vigreux distilling column was attached for use as an air condenser, and the second neck of the flask was closed with a rubber septum. The system was purged with nitrogen for at least one hour, and then a solution of AIBN (2,2'-azobis(2-methylpropionitrile)) in toluene was syringed into the reaction flask all at once. The reaction mixture was stirred vigorously at 65° C. overnight, then poured into a 1 L plastic centrifuge bottle, diluted with toluene and centrifuged at 4500 RPM for 30 minutes. The centrifuge cake was washed once with toluene and the mixture was again centrifuged at 4500 RPM for 30 minutes. The supernatant was decanted and the resultant pigment was dried in a 70° C. vacuum oven overnight, then ground with a mortar and pestle, and dispersed in Isopar E to form a 20 weight % dispersion, which was sonicated and rolled on a roll mill for at least 24 hours (or longer if) desired. The resultant dispersion was filtered through fabric mesh to remove any large particles, a sample removed and its solids content measured.

Part B: Preparation of Internal Phase

The magenta pigment dispersion prepared in Part A above (13.92 g of a 14% w/w dispersion in Isopar E) was combined with 83.07 g of a 60% w/w Isopar E dispersion of titanium dioxide (polymer coated as described in the aforementioned U.S. Pat. No. 7,002,728), 7.76 g of a 20% w/w solution of Solsperse 17000 in Isopar E, a 15% w/w solution of poly(isobutylene) of molecular weight 1,270,000 in Isopar E (this poly(isobutylene) acts as an image stabilizer; see U.S. Pat. No. 7,170,670), 0.575 g of Sudan 1 of the formula:

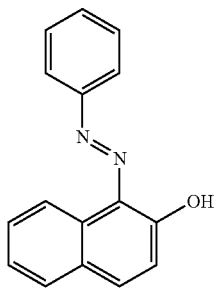 [SMILES: Oc1ccc2ccccc2c1/N=N/c1ccccc1]

(available from Acros Organics, New Jersey) and 5.82 g of Isopar E. The resultant mixture was dispersed overnight on a mechanical roller to produce an internal phase ready for encapsulation and having a conductivity of 304.7 pS/cm.

Part C: Microencapsulation

The internal phase prepared in Part B was encapsulated following the procedure described in U.S. Pat. No. 7,002,728. The resultant encapsulated material was isolated by sedimentation, washed with deionized water, and size-separated by sieving. Capsule size analysis using a Coulter Multisizer showed that the resulting capsules had a mean size of 40 μm and more than 85 percent of the total capsule volume was in capsules having the desired size of between 20 and 60 μm.

Part D: Preparation of Display

The sieved capsules produced in Part C above were adjusted to pH 9 with ammonium hydroxide solution and excess water removed. The capsules were then concentrated and the supernatant liquid discarded. The concentrated capsules were mixed with an aqueous polyurethane binder (prepared in a manner similar to that described in U.S. Patent Application Publication No. 2005/0124751) at a ratio of 1 part by weight binder to 15 parts by weight of capsules following which Triton X-100 surfactant and hydroxypropylmethylcellulose were added and mixed thoroughly to provide a slurry.

The capsule slurry thus prepared was coated onto the indium tin oxide (ITO) coated surface of a poly(ethylene terephthalate) (PET)/ITO film of 125 μm thickness using a bar coater, and the coated film dried at 60° C. Separately, a layer of polyurethane adhesive doped with tetraethylammonium hexafluorophosphate as a conductive dopant was coated onto a release sheet, and the resultant PET film/adhesive sub-assembly was laminated on top of the coated capsules as described in the above-mentioned U.S. Pat. No. 7,002,728. The release sheet was removed and the resultant multilayer structure was laminated onto a graphite rear electrode to produce an experimental single-pixel display comprising, in order from its viewing surface, the PET film, a layer of ITO, a capsule layer, a lamination adhesive layer, and the graphite rear electrode.

Part E: Electro-Optic Tests

The resulting displays were switched using a square-wave AC waveform applied to the graphite rear electrode (while the front ITO electrode was grounded) of ±30V and 50 Hz that was offset from zero as specified below (for example, a 5V offset would provide 50 Hz square wave oscillations of +35/−25V). Table 1 below shows the reflectivities (in percent) at various wavelengths obtained for the indicated color states of the display.

TABLE 1

|  | Red | Magenta | White | Yellow |
|---|---|---|---|---|
| 450 nm | 13.4 | 16.8 | 31.5 | 13.5 |
| 550 nm | 8.8 | 9.7 | 44.9 | 35.2 |
| 650 nm | 60.8 | 55.0 | 60 | 54.4 |

The DC offset for red/white switching was ±10V. In this case, the white and magenta pigments move though the yellow, dyed fluid. The red state results from viewing of the magenta (green-absorbing) pigment and the yellow (blue-absorbing) dye against the white background. The DC offset for magenta/yellow switching was ±60V. The yellow color was obtained as the white pigment moved away from the viewing side of the display towards the negatively-charged rear electrode, as described above with reference to FIG. 8.

In summary, at low applied fields the white pigment behaves as though it were negatively charged, being driven to the front electrode when the rear electrode is at a relatively low, negative voltage, and providing high reflectivity at 450 nm (a wavelength absorbed by the dye); at more negative applied rear electrode voltages, the white pigment moves towards the rear electrode, behaving as though it were positively charged, exposing the dye and reducing the reflectivity at 450 nm.

Example 2

This Example illustrates the preparation of a three particle undyed fluid electrophoretic display of the type illustrated in FIGS. 10A and 10B of the accompanying drawings.

Part A: Preparation of a Yellow Pigment Dispersion

A yellow pigment, Novoperm Yellow P-HG, available from Clariant, Basel, Switzerland was combined with Isopar E and a solution of Solsperse 17000 in Isopar E, and the mixture was dispersed by attriting vigorously using a Szegvari Attritor (Registered Trade Mark) type 01-HD, size 01 at 650 rpm with 0.4-0.6 mm glass beads for 1 hour to afford a yellow pigment dispersion.

Part B: Preparation of a White Pigment Dispersion

Titanium dioxide was treated with a silane as described in the aforementioned U.S. Pat. No. 7,002,728. The resultant silane-treated white pigment was treated with a monomer and a polymerization initiator as described in U.S. Patent Application Publication No. 2011/0012825 to produce a polymer coated white pigment, which was combined with Isopar E to yield a white pigment dispersion.

Part C: Preparation of a Black Pigment Dispersion

A black pigment (BK444 or BK20C920, available from Shepherd Color Company, Cincinnati, Ohio) was milled in water to a particle size of about 300 nm for BK444 and 500 nm for BK20C920. The milled pigment was surface-functionalized using N-[3-(trimethoxysilyl)propyl]-N'-(4-vinylbenzyl)ethylenediamine bishydrochloride (available from United Chemical Technologies) in a manner analogous to that described in U.S. Pat. No. 6,822,782. Thermogravimetric analysis (TGA) indicated the presence of 4-10% of volatile (organic) material for BK444 and 1.1-1.3% of volatile material for BK20C920. A lauryl methacrylate coating was then provided on the pigment as described in U.S. Pat. No. 6,822,782. The final pigment showed 15-25% volatile material by TGA for BK444 and 4-6% volatile material for BK20C920.

Part D: Preparation of Electrophoretic Medium

The yellow pigment dispersion prepared in Part A above (1.91 g) was combined with the black dispersion made from BK444 in Part C above (0.92 g), the white dispersion prepared in Part B above (4.95 g), aluminum 3,5-di-tert-butylsalicylate, available from Esprix Technologies, Sarasota, Fla., (0.1 g of a 1% w/w solution in Isopar E), the same poly(isobutylene) as in Example 1 above, 0.46 g of a 15% w/w solution in Isopar E) and 1.66 g of Isopar E. The resultant mixture was sonicated and warmed to 42° C. for 30 minutes to produce an electrophoretic medium comprising the three pigments in a hydrocarbon fluid having a conductivity of 240 pS/cm.

Part E: Electro-Optic Tests

Cell (a):

A parallel-plate cell was prepared consisting of two 50 mm×55 mm glass plates each coated with a transparent, conductive coating of ITO. The electrophoretic medium prepared in Part D above (15 µL) was dispensed onto the ITO-coated face of the lower glass plate and then the upper glass plate was placed over the electrophoretic medium so that the ITO coating was in contact with the fluid. Electrical connections were then made to the cell by use of conductive copper tape affixed to the ITO coated sides of both the top and bottom glass plates.

Cell (b):

Cell (b) was prepared as described above for Cell (a) except that the conductive ITO coatings on each of the glass plates were blocked by application of a polymer overcoat (a solution of poly(methyl methacrylate) (PMMA) in acetone was bar-coated using a #7 Mayer rod to give a dry coating approximately 0.5 µm in thickness).

Cells (a) and (b) were electrically driven with a waveform consisting of a square wave of 10 Hz frequency at voltages of ±30, 15, and 7.5 V applied to the lower electrode while the upper electrode was grounded, using the duty cycle sequence shown in Table 2 below, preceded by a set of shake-up pulse trains at ±30V, 10 Hz, 6×1 sec. duration, with duty cycles of 0.05, 0.1, 0.2, 0.4, 0.8 and 1.

TABLE 2

| Time (sec) | Duty Cycle |
|---|---|
| 0 | 0.05 |
| 1 | .1 |
| 2 | .2 |
| 3 | .4 |
| 4 | .8 |
| 5 | 1 |
| 6 | .8 |
| 7 | .4 |
| 8 | .2 |
| 9 | .1 |
| 10 | .05 |

Figure 13A:
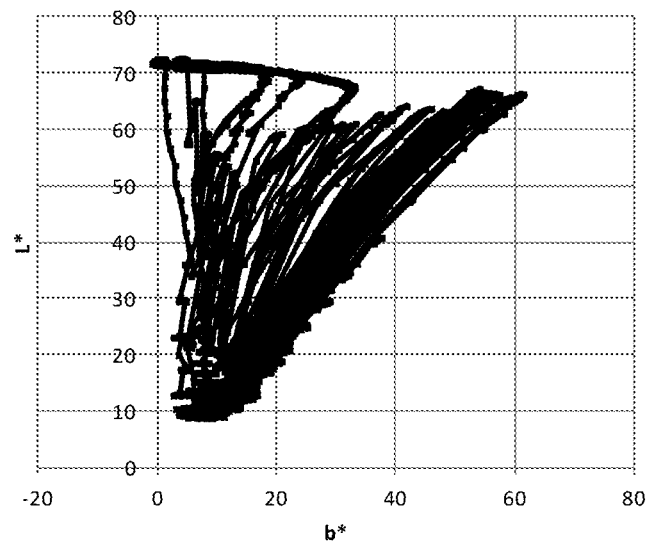
FIGS. 13A and 13B are L*b* graphs showing the colors obtained from certain displays of the present invention, as described in Example 2 below.
Figure 13B:
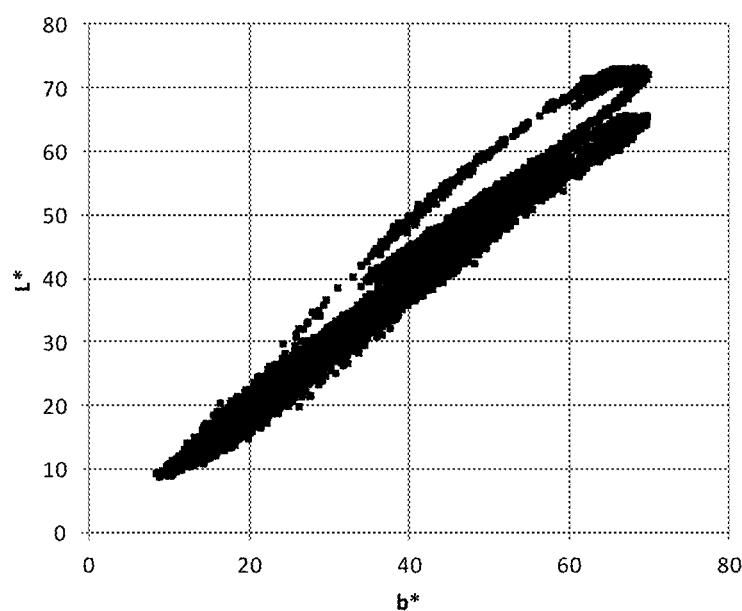

Reflection spectra were acquired as Cells (a) and (b) were electrically driven, giving the results shown in FIGS. 13A and 13B respectively. As can be seen from these Figures, in Cell (a), in which the electrodes were unblocked, the cell was capable of rendering black, white and yellow states (in FIGS. 13A and 13B, more positive values of b* indicate increasing yellow coloration, while more positive values of L* indicate increasing lightness). In Cell (b), in contrast, the electrodes were blocked and minimal current passed, so no white state was seen (there is no state with high L* and low b*); the cell switched simply between black and yellow states.

Example 3

This Example illustrates the preparation of a further three particle undyed fluid electrophoretic display of the type illustrated in FIGS. 10A and 10B of the accompanying drawings.

An internal phase was prepared from the following components (by weight):

White pigment (from Example 2, Part B): 29.7%
Black pigment (from Example 2, Part C): 6.0%
Yellow pigment (from Example 2, Part A): 3.0%
Solsperse 17000: 2.0%
Aluminum di-t-butyl salicylate: 0%
Poly(isobutylene) (as in Examples 1 and 2): 1.05%

The internal phase so prepared was then encapsulated as described in U.S. Pat. No. 7,002,728. The resultant capsules were isolated by sedimentation, washed with deionized water, and size separated by sieving. Capsule size analysis using a Coulter Multisizer showed that the resulting capsules had a mean size of 40 µm and more than 85 percent of the total capsule volume was in capsules having the desired size of between 20 and 60 µm. The capsules were then converted to single pixel experimental displays with graphite rear electrodes as described in Example 1, Part D above.

Figure 14:
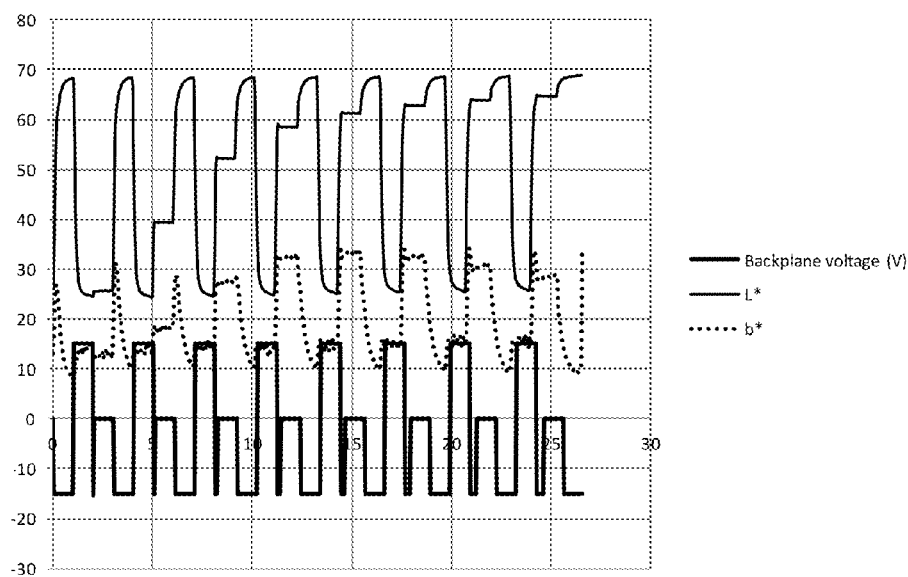
FIG. 14 is a graph showing the driving waveform applied to a display of the present invention in Example 3 below, and the resulting L* and b* values.

A display so constructed was driven using the waveform as shown in FIG. 14 (the rear electrode voltage relative to a grounded front electrode is shown). The waveform consisted of a 1 second pulse of −15V, followed by a 1 second pulse of +15V, followed by a test pulse of −15V that varied in length from 50 ms to 400 ms in increments of 50 ms. Also shown in FIG. 14 are the L* and b* values measured as the display was driven. During the test pulse the display switched from black, via yellow, to white (as indicated by arrows 906 and 902 in FIG. 9), while during the +15V pulses, the display switched from white to black (as indicated by arrow 904 in FIG. 9).

Example 4

This Example illustrates the preparation of a three particle dyed fluid electrophoretic display of the type illustrated in FIGS. 11A-11D of the accompanying drawings.

Part A: Preparation of a Cyan Pigment Dispersion

A cyan pigment, Irgalite Blue GLVO, available from BASF, Ludwigshafen, Germany was combined with Isopar E and a solution of Solsperse 17000, and the resultant mixture was dispersed by attriting vigorously at 650 rpm with 0.4-0.6 mm glass beads for 1 hour to afford a cyan pigment dispersion.

Part B: Preparation of Electrophoretic Medium

An electrophoretic medium was prepared from the following components (by weight):

White pigment (from Example 1, Part B): 29.7%
Magenta pigment (from Example 1, Part A): 1.3%
Cyan pigment (from Part A above): 0.75%
Sudan Yellow dye 0.75%
Solsperse 17000: 2.0%
Aluminum di-t-butyl salicylate: 0.02%
Poly(isobutylene) (as in Examples 1-3): 1.05%

The resultant fluid was loaded into Cell (a) described in Example 2 above, and addressed with a waveform consisting of a square wave of 30 Hz frequency at voltages of ±10, 15, 20 and 40 V applied to the rear electrode while the front electrode was grounded, using the duty cycle sequence shown above in Table 2.

The light reflected from the test cell was analyzed spectrophotometrically, and the closest approaches in CIE L*a*b* to the SNAP color standard were recorded. These values (a* and b*) are shown in Table 3 below. It can be seen that the electrophoretic fluid was able to distinguish all the primary colors (CMYRGBKW).

TABLE 3

|   | L* | a* | b* |
|---|---|---|---|
| C | 49.5 | −23.4 | −15.7 |
| G | 61.6 | −18.4 | 1.9 |
| Y | 43.9 | −5 | 20 |
| R | 27.6 | 22.9 | 12.2 |
| M | 33.6 | 30.8 | −7.9 |
| B | 38.1 | 6.5 | −21.4 |
| K | 28.1 | 1.4 | 3.3 |
| W | 63.8 | −9 | 4.3 |

Example 5

This Example illustrates the preparation of a group of cyan dyes useful in the electrophoretic media and displays of the present invention.

Part A: Preparation of a First Cyan Dye

This Part of this Example illustrates the preparation of a cyan dye by the reaction:

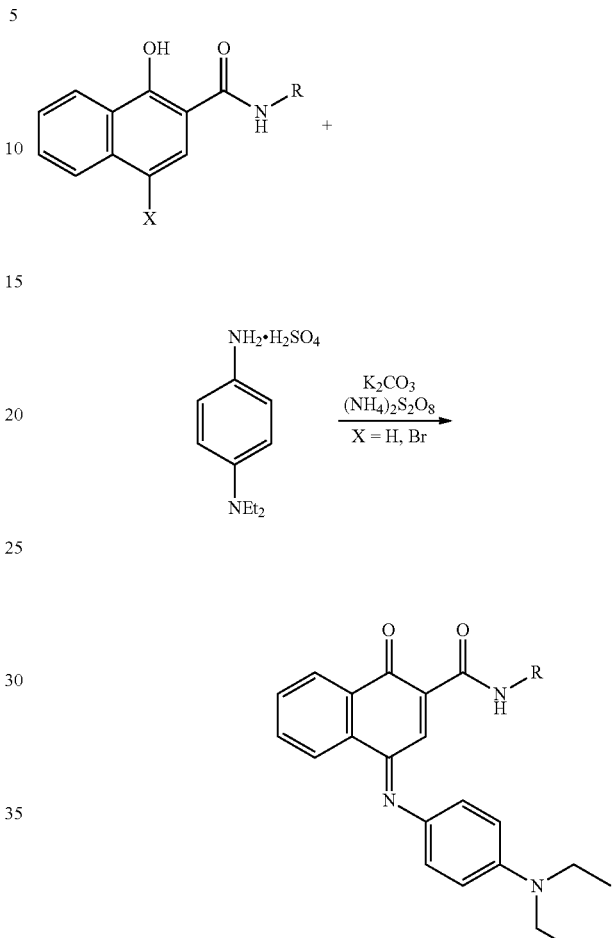

where R represents a $C_{12}H^{25}$ alkyl group. The reaction is adapted from Example 3 in U.S. Pat. No. 5,122,611.

To a two-neck 500 mL round-bottomed flask equipped with reflux condenser and magnetic stir bar were added 4-bromo-N-dodecyl-1-hydroxy-2-naphthamide, dichloromethane (DCM) and ethanol. To the resultant reaction mixture were added N,N-diethyl-p-phenylenediamine sulfate salt in deionized water, and potassium carbonate in deionized water followed by ammonium persulfate in deionized water. The reaction mixture was stirred at room temperature for 30 minutes, and then poured into a large reparatory funnel and separated. The aqueous layer was extracted with DCM, and the organic layers were washed with deionized water. The resulting organic phase was concentrated under reduced pressure, and the crude material produced was purified via recrystallization with DCM and methanol.

The dye had $\lambda_{max}$ of 648 nm in Isopar E solution, $\varepsilon$=28,100 Lmol$^{-1}$ cm$^{-1}$. The solubility of the dye in Isopar E at 4° C. was 1.2 wt %.

Part B: Preparation of a Second Cyan Dye

This Part of this Example illustrates the preparation of a cyan dye by the three-step reaction sequence:

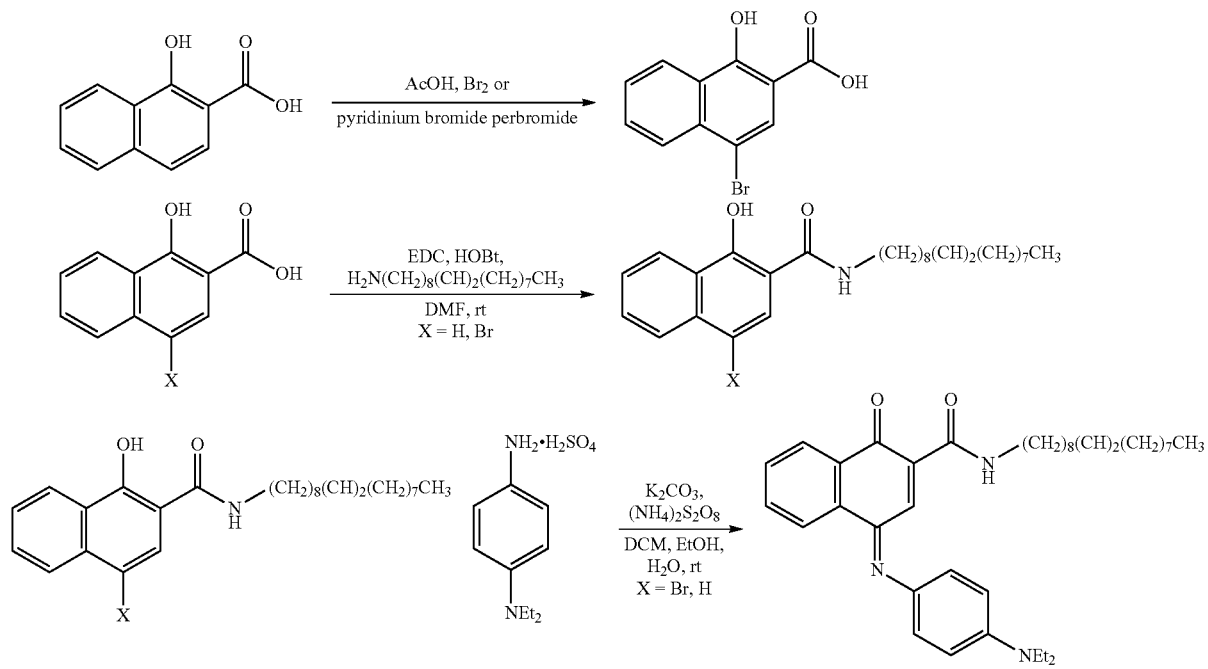

The first step of this reaction sequence is adapted from Huang, Y.; Luedtke, R. R.; Freeman, R. A.; Wu, L.; Mach, R. H. J. Med. Chem. 2001, 44, 1815-1826, and the third step from U.S. Pat. No. 5,122,611.

Step 1:

To a 1 L round-bottomed flask equipped with an overhead stirrer were added 1-hydroxy-2-naphthoic acid, pyridinium bromide perbromide and acetic acid. The resultant reaction mixture was stirred at room temperature overnight, then filtered, and the resulting solid was washed with deionized water, dried under vacuum and used without further purification.

Step 2:

To a 250 mL round-bottomed flask were added 4-bromo-1-hydroxy-2-naphthoic acid and N,N-dimethylformamide (DMF). Once the acid had dissolved, 1-hydroxybenzotriazole hydrate and N-(3-dimethylaminopropyl)-N'-ethylcarbodiimide hydrochloride were added to the flask. Finally, oleylamine was added to the flask via a syringe. The resultant reaction mixture was stirred at room temperature for 5 days, then poured into deionized water and extracted with dichloromethane (DCM, 3×100 mL aliquots). The organic phases were combined and washed with 10 wt % hydrochloric acid solution (4×100 mL). A solid formed and was filtered away from the organic layer. The organic layer was filtered through a silica plug and the product was concentrated under reduced pressure (48% yield).

Step 3:

To a two-necked 500 mL round-bottomed flask equipped with a reflux condenser and a magnetic stir bar were added 4-bromo-1-hydroxy-N-oleyl-2-naphthamide, DCM and ethanol. To the resultant reaction mixture were added N,N-diethyl-p-phenylenediamine sulfate salt in deionized water, and potassium carbonate in deionized water, followed by ammonium persulfate in deionized water. The reaction mixture was stirred at room temperature for 30 minutes, then poured into a large reparatory funnel and separated. The aqueous layer was extracted with DCM, and the combined organic layers washed with deionized water. The resulting organic phase was concentrated under reduced pressure to give a crude material, which was purified via silica gel chromatography with DCM as the eluent.

The resulting dye had $\lambda_{max}$ of 622 nm in Isopar E solution, $\in$=25,800 Lmol$^{-1}$ cm$^{-1}$. The solubility of the dye in Isopar E at 4° C. was 3.9 wt %.

Example 6

This Example illustrates the preparation of a three particle, dyed fluid electrophoretic display of the type illustrated in FIGS. 11A-11D of the accompanying drawings.

Part A: Preparation of a Yellow Pigment Dispersion

A yellow pigment, Novoperm Yellow P-HG, available from Clariant, Basel, Switzerland was combined with Isopar E and a solution of Solsperse 17000 in Isopar E, and the mixture was dispersed by attriting vigorously using a Szegvari Attritor type 01-HD, size 01 at 650 rpm with 0.4-0.6 mm glass beads for 1 hour to afford a yellow pigment dispersion.

Part B: Preparation of a Magenta Pigment Dispersion

Ink Jet Magenta E 02 VP2621, available from Clariant, Basel, Switzerland, was dispersed as a 10% w/w in toluene. The pigment dispersion was transferred to a 500 mL round-bottomed flask and the flask degassed with nitrogen, and the solution brought to 42° C. Upon reaching this temperature, 4-vinylbenzylchloride was added and the resultant reaction mixture was stirred at 42° C. under nitrogen overnight. The resulting product was allowed to cool to room temperature and centrifuged to isolate the functionalized pigment. The centrifuge cake was washed with toluene (3×250 mL) to produce the functionalized magenta pigment.

The magenta pigment thus prepared was coated with a lauryl methacrylate coating as described in the abovementioned U.S. Pat. No. 7,002,728. The final pigment was then combined with Isopar E to produce a magenta pigment dispersion, which was filtered through a 200 micrometer mesh film and its solids content was determined to be 15.9%.

Part C: Preparation of a White Pigment Dispersion

A titania dispersion was produced as in Example 2, Part B above.

Part D: Preparation of an Electrophoretic Medium and Electro-Optic Tests

The yellow pigment dispersion prepared in Part A above (0.65 g), the magenta dispersion prepared in Part B above (0.83 g), the white dispersion prepared in Part C above (3.22 g), the cyan dye prepared in Example 5, Part A above (0.10 g), aluminum 3,5-di-tert-butylsalicylate (0.07 g of a 1% w/w solution in Isopar E), poly(isobutylene) of molecular weight 600,000 (0.31 g of a 15% w/w solution in Isopar E) and 1.26 g of additional Isopar E were mixed. The resultant mixture was sonicated and warmed to 42° C. for 30 minutes to produce an electrophoretic medium having a conductivity of 74 pS/cm.

This electrophoretic medium fluid was loaded into a first test cell described in Example 2 above. Reflection spectra were obtained as the rear electrode was driven with the waveforms shown in FIGS. 15A-15J while the front electrode was grounded. FIGS. 16A-16J show the optical states (plotted as graphs of L*, a* and b* against time) achieved using the waveforms in FIGS. 15A-15J respectively. The sample rate of the spectrometer was 20 Hz, so the optical transients during the reset pulses at the beginning of each waveform were not recorded.

Figure 15A:
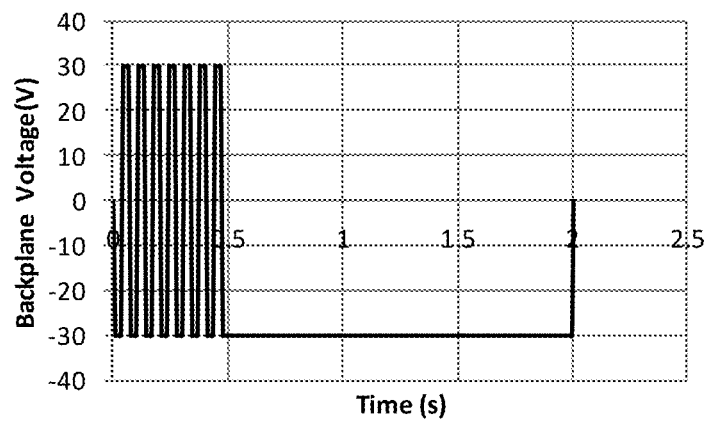
FIGS. 15A-15J are graphs showing various waveforms used in the experiments described in Example 6 below.
Figure 15B:
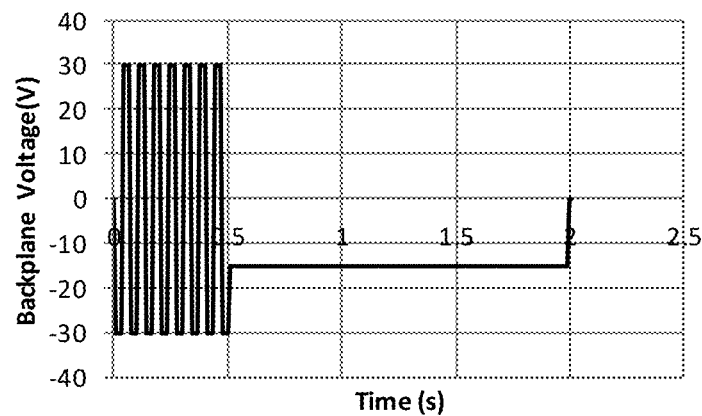
Figure 15C:
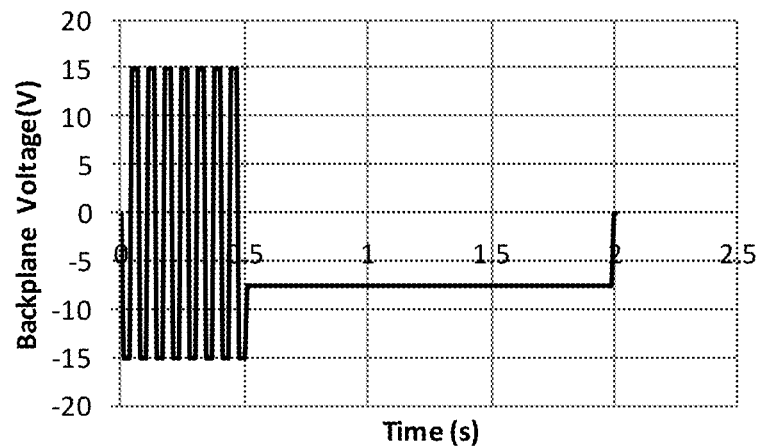
Figure 15D:
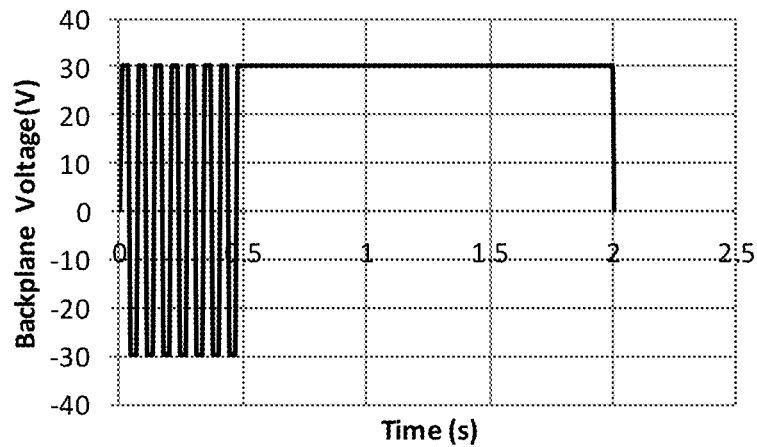
Figure 15E:
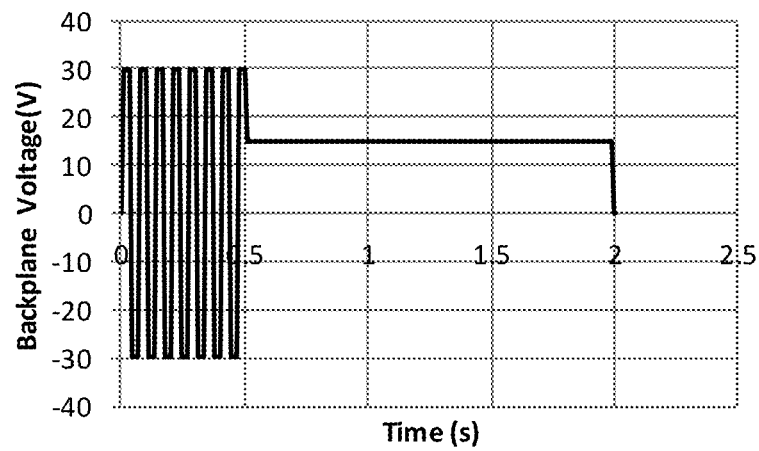
Figure 15F:
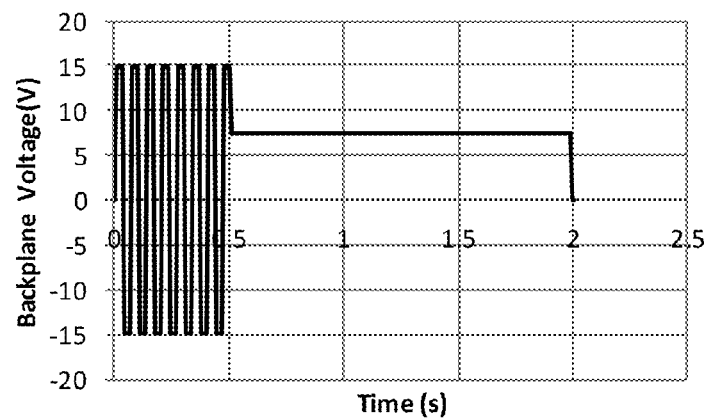
Figure 16F:
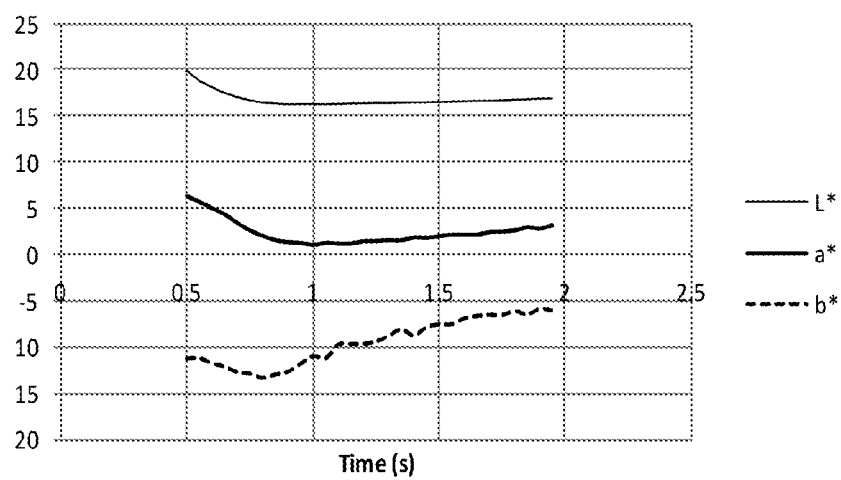

In FIGS. 15A-15F, the waveforms used consisting of a series of rapidly oscillating reset pulses of ±30V or ±15V followed by 1.5 seconds of driving with a constant rear electrode of −30V (FIG. 15A), −15V (FIG. 15B). −7.5 V (FIG. 15C), +30V (FIG. 15D), +15V (FIG. 15E) or +7.5V (FIG. 15F). The waveforms shown in FIGS. 15G-15J are of a different type comprising the same series of rapidly oscillating reset pulses of ±30V or ±15V, but using a driving portion of the waveform in which the rear electrode voltage alternates between positive and negative voltages, with rests at zero voltage between the positive and negative impulses. The pulses are ±30V (FIG. 15G) and ±15V (FIG. 15H). The waveforms in FIGS. 15I and 15J are essentially inverted forms of the waveforms in FIGS. 15G and 15H respectively, in the sense that in FIGS. 15G and 15H, the driving sequence is positive-zero-negative-zero-positive-zero-negative-zero etc., whereas in FIGS. 15I and 15J the driving sequence is negative-zero-positive-zero-negative-zero-positive-zero etc.

Figure 16A:
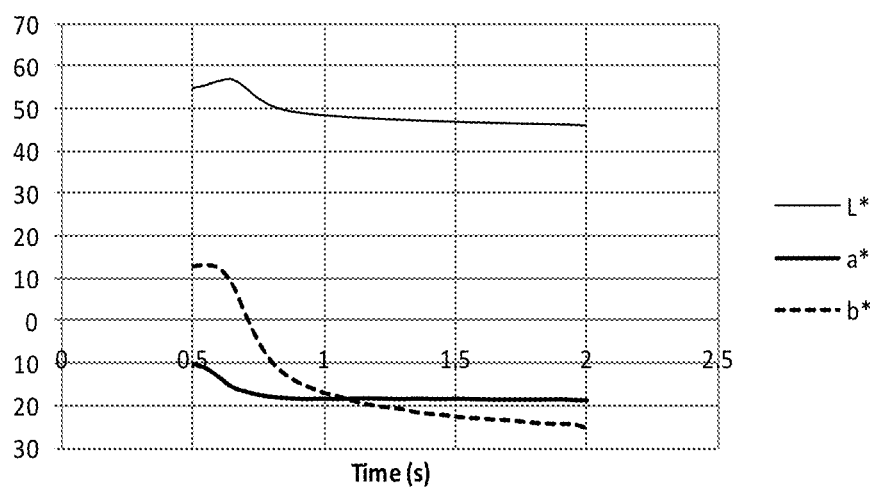
FIGS. 16A-16J are graphs showing the L*, a* and b* values as a function of time obtained using the waveforms of FIGS. 15A-15J respectively.
Figure 16B:
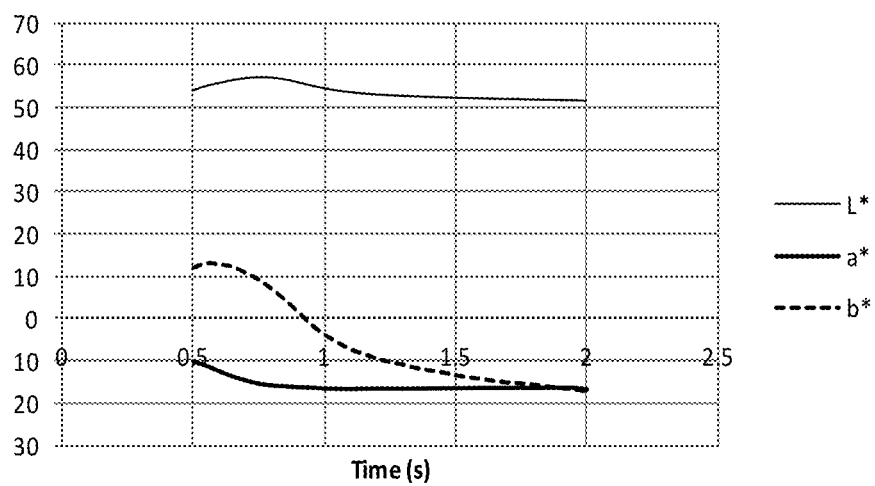
Figure 16C:
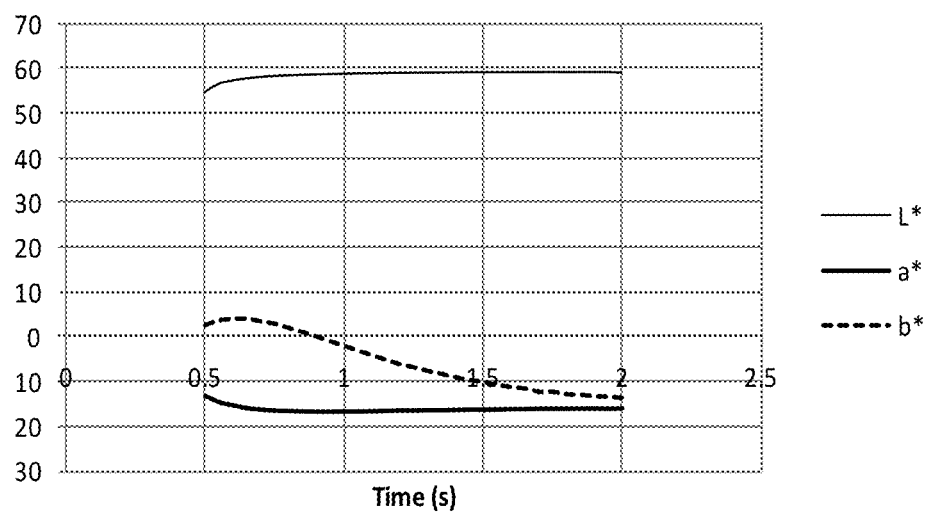
Figure 16D:
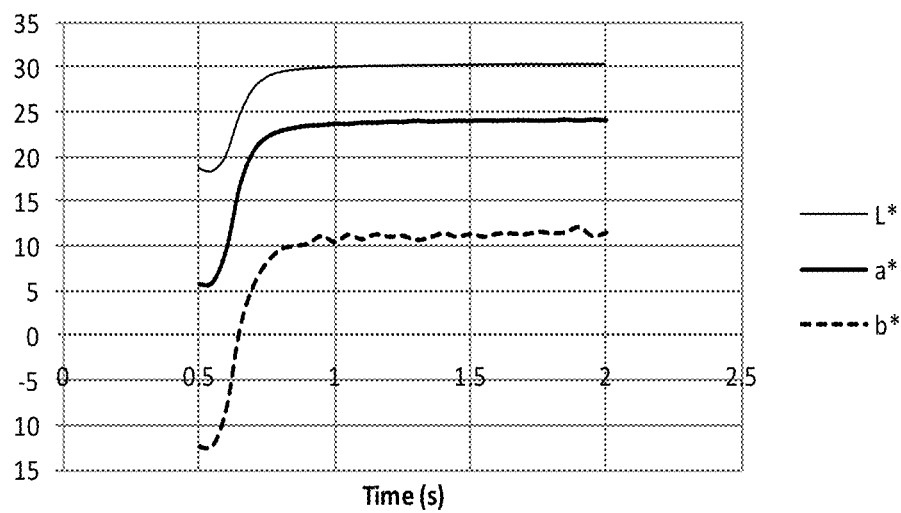
Figure 16E:
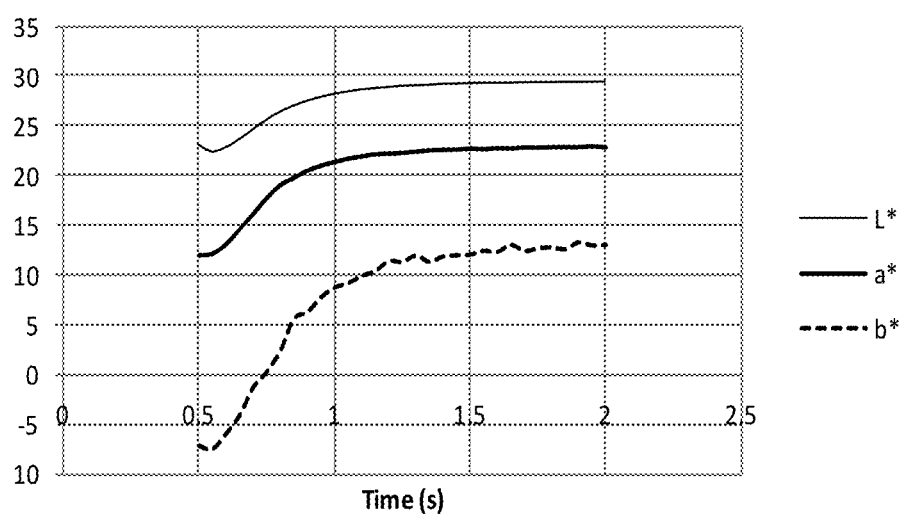

From FIGS. 16A-16C, it will be seen that the results of the waveforms of FIGS. 15A-15C is that b* starts positive in all three cases, and moves to negative values as the pulse continues, while a* remains fairly constant; thus, the display changes from a (greenish) yellow tint to a cyan tint, crossing zero at a cyan-tinted white. The waveform of FIG. 15C produces an almost white state. These results are consistent with the switching mechanism proposed above with reference to the right hand sides of FIGS. 11A-11C. In contrast, with the positive driving waveforms of FIGS. 15D-15F, FIGS. 16D-16F show display switching from a dark blue state (b* about −10) to a red state (a*+22; b* about +10), and the waveform of FIG. 15F producing an almost black state. These results are consistent with the switching mechanism proposed above with reference to the left hand sides of FIGS. 11A-11C.

Figure 15G:
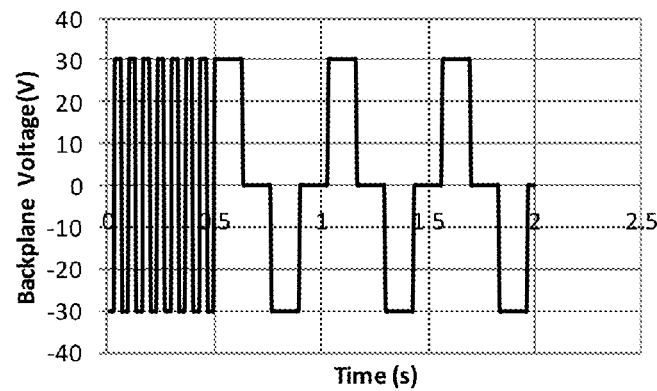
Figure 16G:
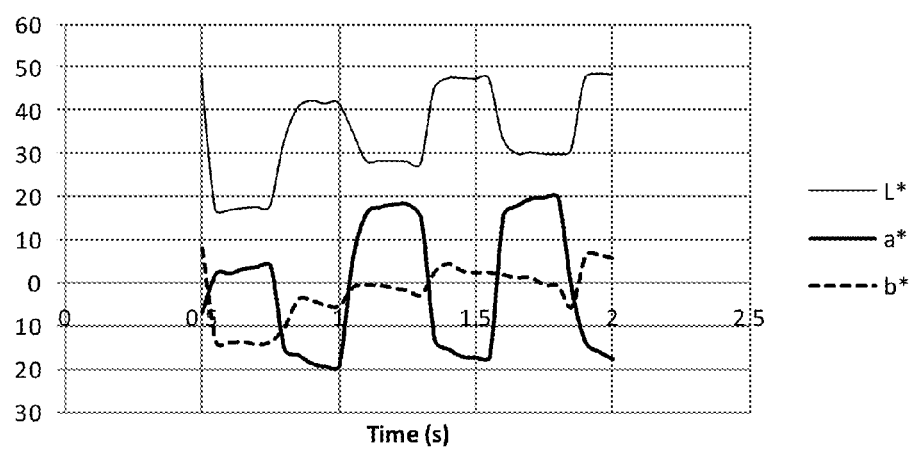
Figure 15H:
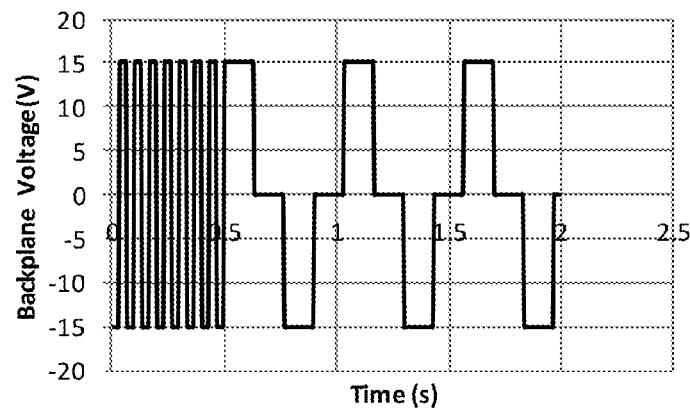
Figure 16H:
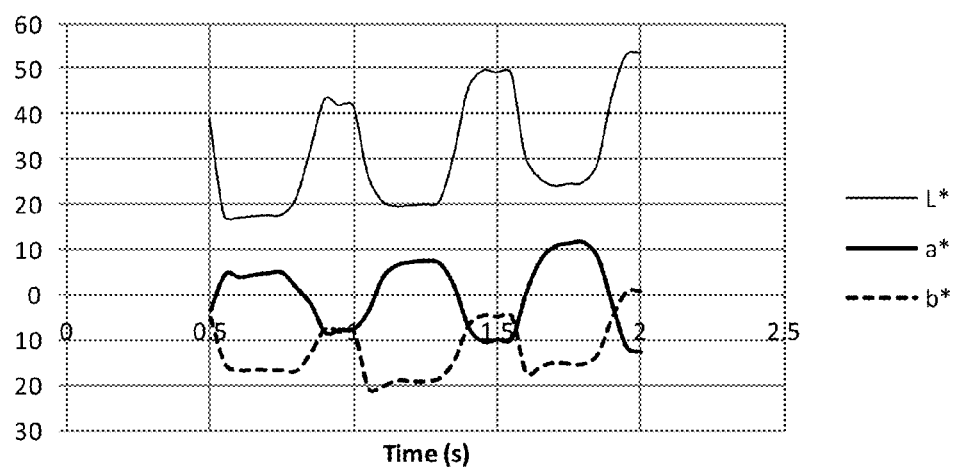
Figure 15I:
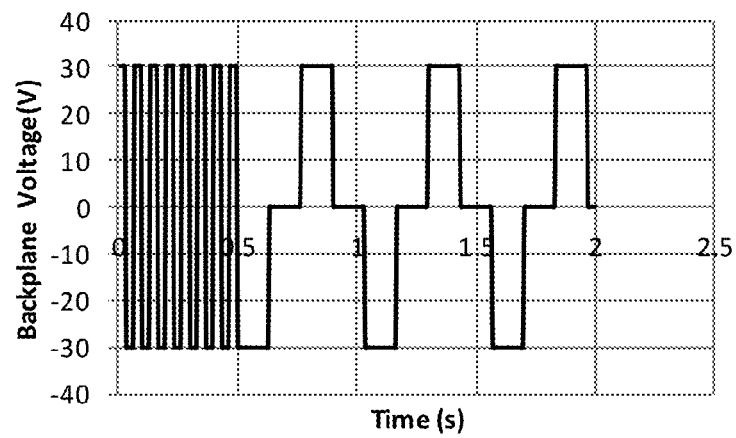
Figure 16I:
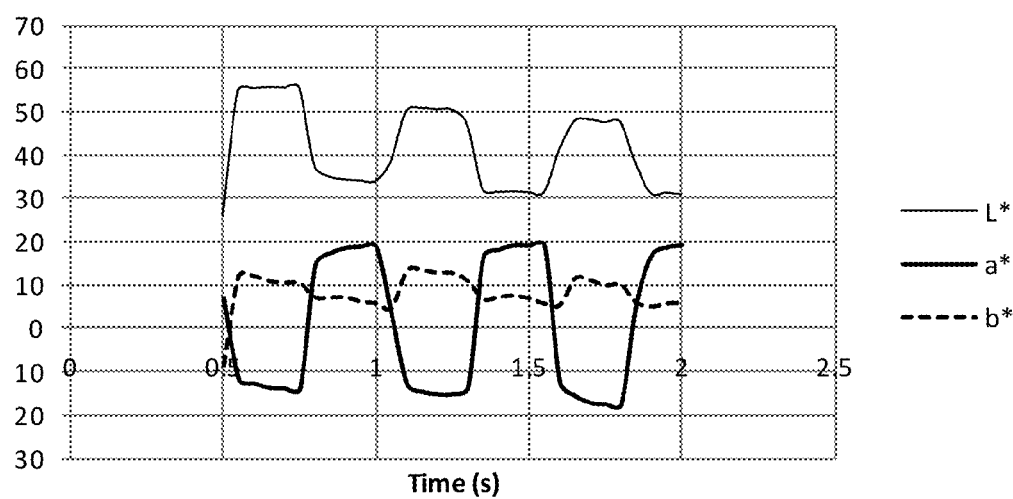
Figure 15J:
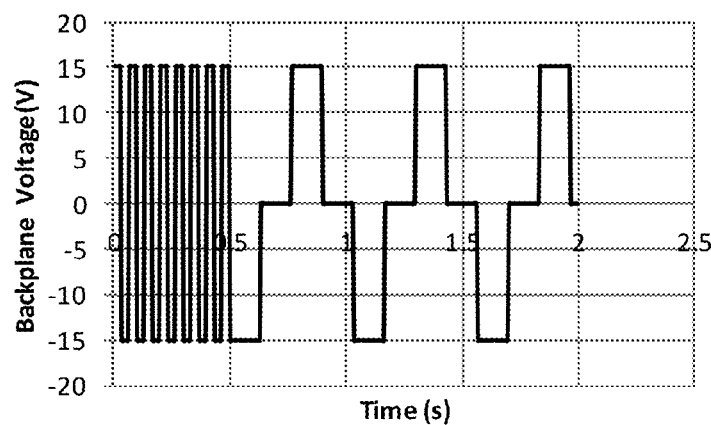
Figure 16J:
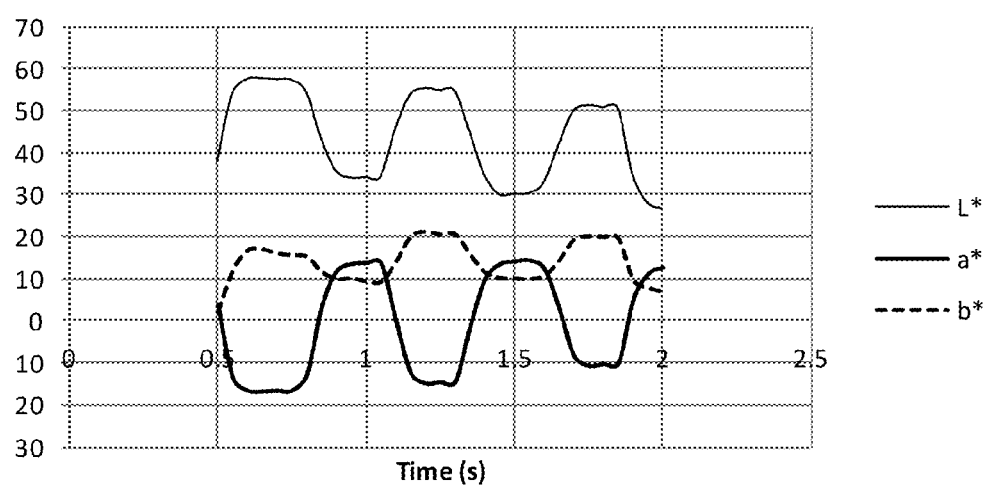

FIGS. 16G and 16H show that the reversing waveforms of FIGS. 15G and 15H cause the display to oscillate between magenta (rear electrode positive) and green states (rear electrode negative); the best magenta is obtained using the waveform of FIG. 15H. Similarly, FIGS. 16I and 16J show that the reversing waveforms of FIGS. 15I and 15J cause the display to oscillate between green (rear electrode negative) and red/magenta states (rear electrode positive); the best green is obtained using the waveform of FIG. 15J. The difference between the waveforms of FIGS. 15G/15H and those of FIGS. 15I/15J, each of which alternates between positive and negative driving impulses, is that the reset train begins and ends with negative pulses in waveforms the waveforms of FIGS. 15G/15H and with positive pulses in those of FIGS. 15I/15J. Thus, the starting point has a net negative impulse in the waveforms of FIGS. 15G/15H and a net positive impulse in those of FIGS. 15I/15J. The starting net negative impulse favors magenta over green, while the starting net positive impulse favors green over magenta.

Figure 17:
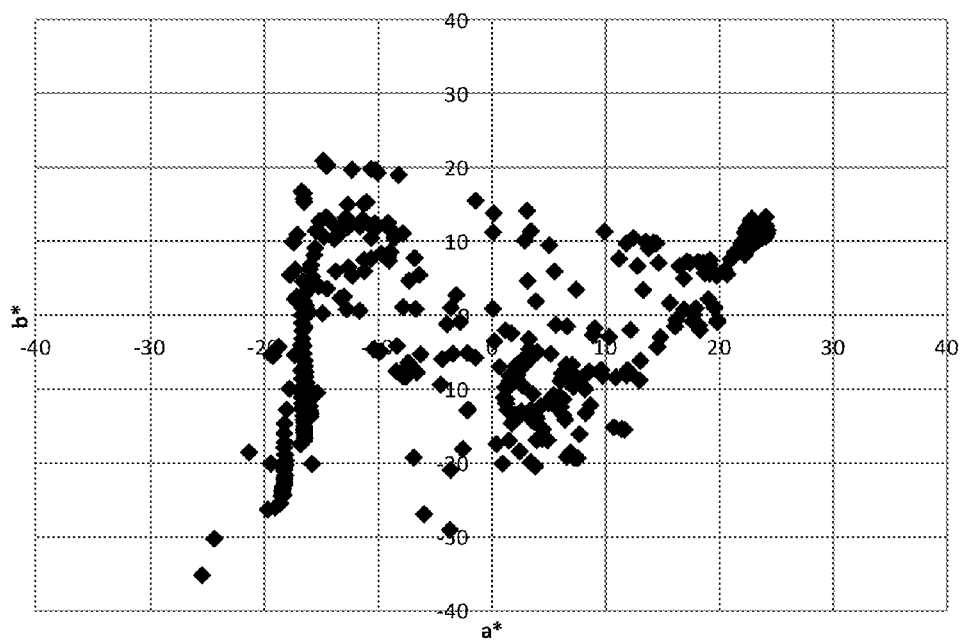
FIG. 17 is a plot of the a*b* plane of conventional L*a*b* color space showing the gamut of colors obtained in the experiments described in Example 6 below.

FIG. 17 is a plot on an a*/b* plane of all the colors obtained by the waveforms of FIGS. 15A-15J, and from the Figure it can be seen that all the primary colors are afforded by this electrophoretic display of the invention.

Example 7

This Example illustrates the preparation of a second three particle, dyed fluid electrophoretic display of the type illustrated in FIGS. 11A-11D of the accompanying drawings.

Part A: Preparation of a Cyan Pigment Dispersion

A cyan pigment, Hostaperm Blue BT-6,7-D, available from Clariant, Basel, Switzerland (26 g) was mixed with Isopar E (70 g) and a solution of Solsperse 17000 (70 g of a 20% w/w solution in Isopar E) and the resultant mixture was dispersed by attriting vigorously at 650 rpm with 0.4-0.6 mm glass beads for 1 hour to afford a cyan pigment dispersion.

Part B: Preparation of Electrophoretic Medium and Electro-Optic Tests

An electrophoretic medium was prepared from the following components (by weight):
White pigment (from Example 3, Part C): 29.7%
Magenta pigment (from Example 1, Part A): 2.1%
Magenta pigment (from Part A above): 0.75%
Automate Yellow dye (Dow Chemical) 0.75%
Solsperse 17000: 0.785%
Aluminum di-t-butyl salicylate: 0.01%
Poly(isobutylene) (as in Examples 1-3): 1.05%

Figure 18:
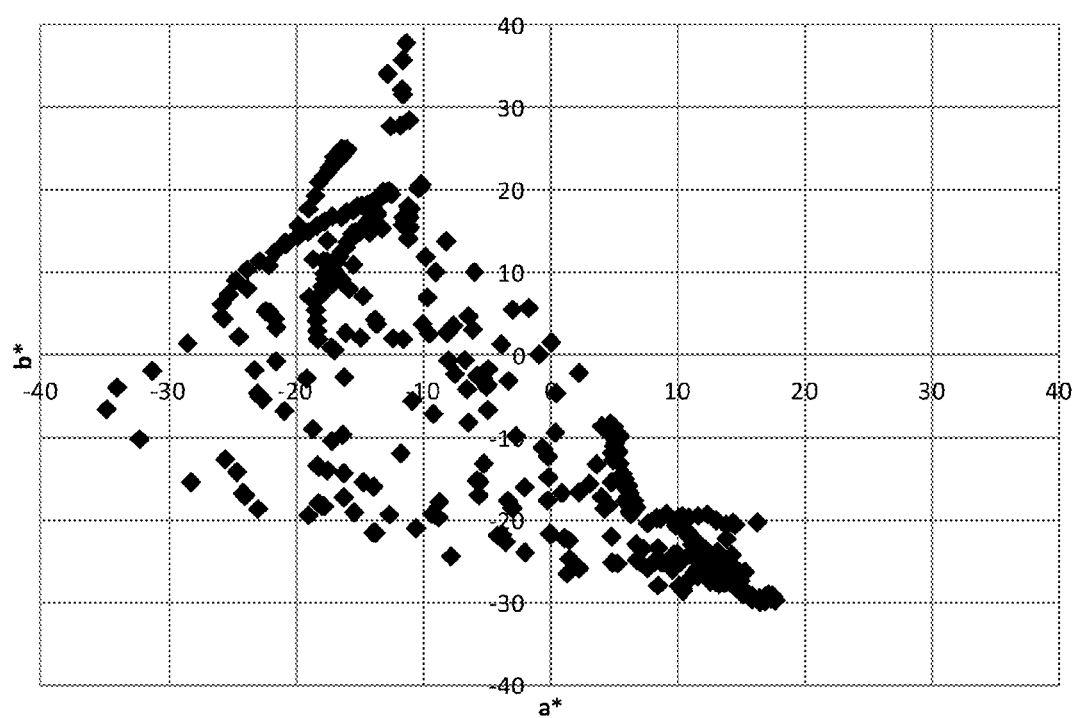
FIGS. 18 and 19 are plots of the a*b* plane similar to that of FIG. 17 but showing the gamut of colors obtained in the experiments described in Examples 7 and 8 respectively below.

The resultant fluid was placed in Cell (a) described in Example 2 above, and driven with the waveforms shown in FIGS. 15A-15J. FIG. 18 is a plot in the a*b* plane, similar to that of FIG. 17, of all the colors obtained. From FIG. 18, it will be seen that all the primary colors except red are provided by this electrophoretic medium.

Example 8

This Example illustrates the preparation of a third three particle, dyed fluid electrophoretic display of the type illustrated in FIGS. 11A-11D of the accompanying drawings.

An internal phase was prepared from the following components (by weight):
White pigment (from Example 3, Part C): 29.7%
Magenta pigment (from Example 1, Part A): 3.0%
Yellow pigment (from Example 2, Part A): 2.5%
Cyan due (from Example 6, Part A) 1.5%
Solsperse 17000: 1.24%
Aluminum di-t-butyl salicylate: 0.01%
Poly(isobutylene) (as in Examples 1-3): 1.05%

The internal phase thus prepared was encapsulated following the procedure described in U.S. Pat. No. 7,002,728. The resultant encapsulated material was isolated by sedimentation, washed with deionized water, and size-separated by sieving. Capsule size analysis using a Coulter Multisizer showed that the resulting capsules had a mean size of 74 μm and more than 85 percent of the total capsule volume was in capsules having the desired size of between 50 and 100 μm. The capsules were then converted to experimental single pixel displays in the same manner as in Example 1, Part D above.

Figure 19:
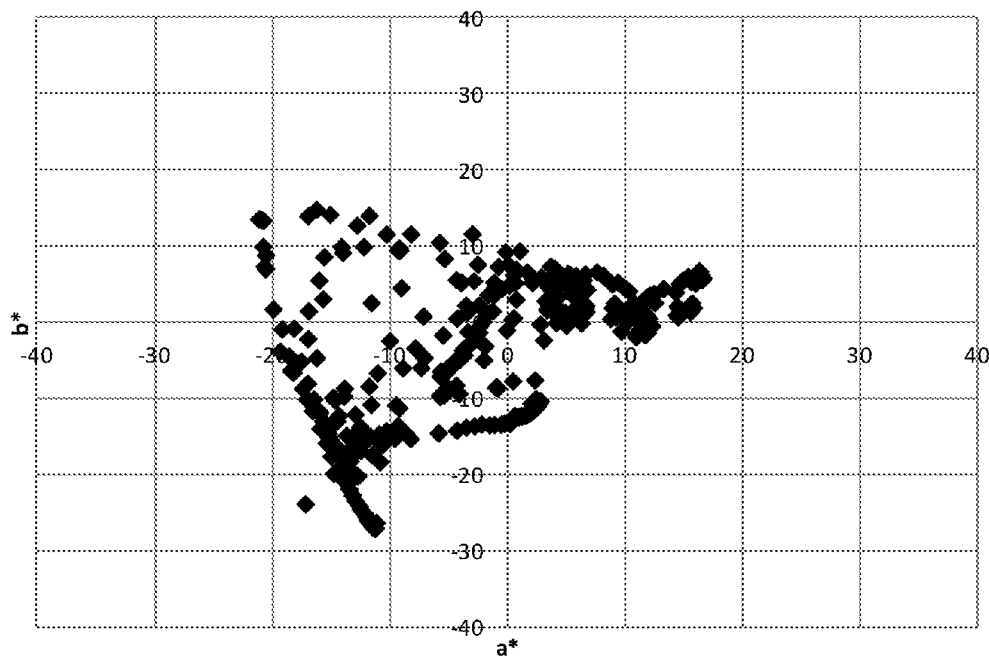

These displays were then driven with the waveforms shown in FIGS. 15A-15J. FIG. 19 is a plot in the a*b* plane, similar to those of FIGS. 17 and 18, of all the colors obtained. From FIG. 19, it will be seen that all the primary colors are provided by this electrophoretic medium.

Example 9—Waveform Optimization for Spot Color

Subsequent to the experiments described in Example 3 above, it was discovered that the type of waveform shown in FIG. 14 is not in fact the optimum waveform for obtaining good spot color in the type of three-particle black/white/spot color electrophoretic medium shown in FIGS. 10A and 10B. (The spot color is shown in FIGS. 10A and 10B as yellow, and the same spot color will be assumed in the following discussion, but this is for purposes of illustration only and any spot color other than white or black may of course be used.) It has been found that better saturation (i.e., increased b* value for yellow spot color, and increased a* value for some other spot colors) can be achieved by using a square wave with appropriately chosen frequency and duty cycle.

As illustrated in FIGS. 10A and 10B, the positively charged black pigment moves to the viewing (upper) surface of the display when the rear electrode 1012 is positive relative to the front electrode 1010 and to the back of the display when the rear electrode 1012 is negative voltage relative to the front electrode 1010. On the other hand, the negatively charged white pigment moves to the viewing surface of the display when the rear electrode is negative and to the back of the display when the rear electrode is positive. The third (yellow) pigment is initially negatively charged and under low impulse, when the rear electrode is negative, the yellow pigment at first moves to the viewing surface of the display (FIG. 10A, right side—the display looks yellow), but if the voltage is applied for a long enough time to provide a high addressing impulse, the yellow colored pigment disappears behind the white pigment and the display changes from yellow to white (FIG. 10B, right side).

These color changes are illustrated in FIG. 14. Consider the first cycle shown in FIG. 14. Initially the display is in its black state (FIG. 10A, left side). When a −15V pulse is applied, the black pigment moves to the rear surface and the white and yellow pigments move to the viewing surface (FIG. 10A, right side). Initially b* and L* increase as the display turns yellow. After some time, b* ("yellowness") reaches its maximum, and then decreases, while L* keeps increasing, as a high addressing impulse is reached and the display turns white (FIG. 10B, right side).

Figure 20:
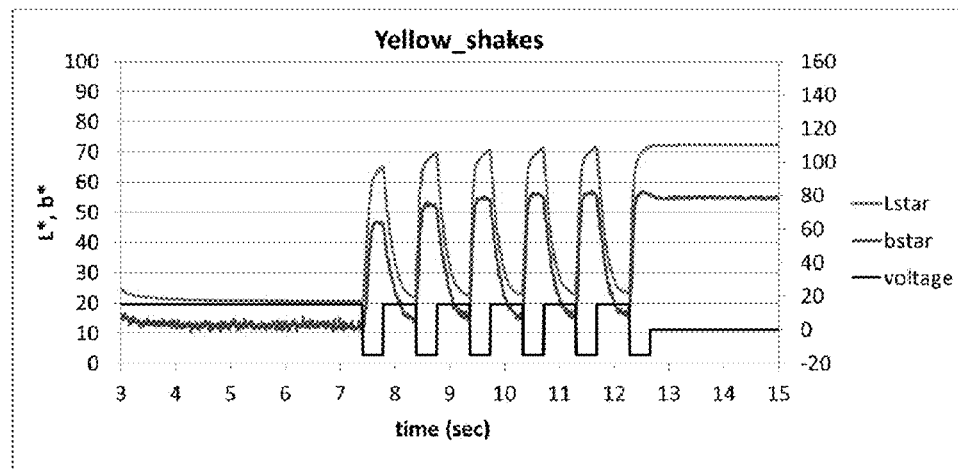
FIG. 20 is a graph similar to that of FIG. 14 but showing the results achieved with a modified waveform applied to a display of the present invention in Example 9 below.

It has found that a very simple waveform using alternating negative and positive pulses can achieve a maximum b* value higher than that achievable with a single positive-negative cycle, as shown in FIG. 14. This waveform is illustrated in FIG. 20, from which it will be seen that this waveform comprises a series of short (about 0.5 second) negative pulses separated by longer (1 second) positive pulses and terminating with one of the negative pulses. The optimum duration of the positive and negative transitions is somewhat dependent upon the composition of the electrophoretic medium and it is usually several hundred milliseconds long. The key factor in determining how long the negative pulse needs to be is how long one can apply a negative drive (from black) before the yellow color starts decreasing. The positive pulse should be longer than the negative pulse, and needs to be long enough to drive the display back to the black extreme optical state. As shown in FIG. 20, the waveform used increases b* to about 55 as compared with about 41 for the waveform shown in FIG. 14.

Figure 21:
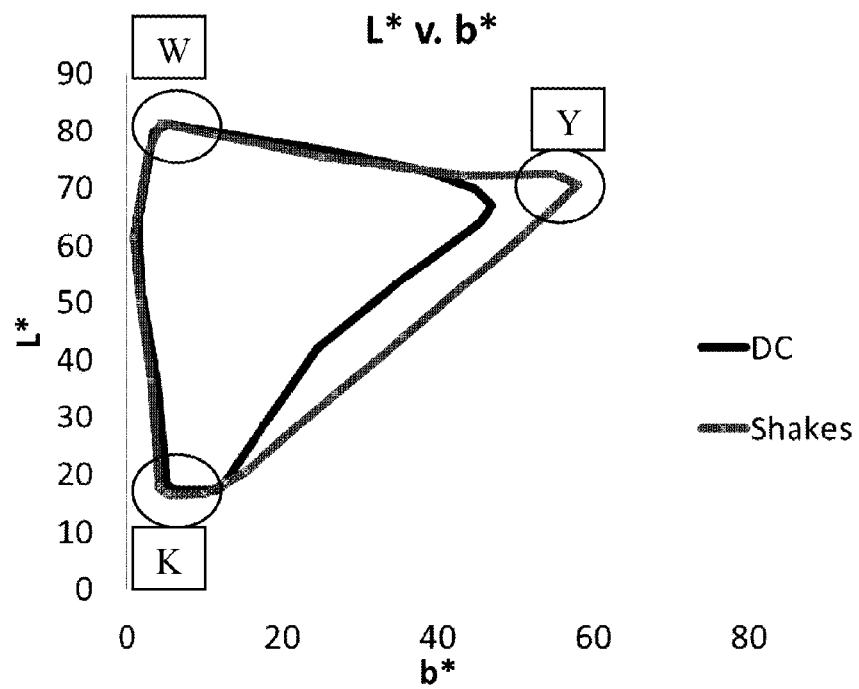
FIG. 21 is a diagram of the L*b* plane of the CIE L*a*b* color space showing the improved color achieved using the modified waveform shown in FIG. 20.

FIG. 21 shows a plot of L* against b* for the first cycle shown in FIG. 14 and for the waveform of FIG. 20. It will be seen that the extreme yellow state of the FIG. 20 waveform (indicated as "Y" in FIG. 21 has a substantially higher b* value than that of the FIG. 14 waveform. One possible explanation for this improvement in b* is that some of the yellow pigment starts "turning around" (i.e., moving away from the viewing surface of the display) before the best yellow state is achieved. By briefly reversing the polarity of the driving pulse, the charge on the yellow pigment is reset and when the voltage switches back to negative, the yellow pigment keeps traveling to the viewing surface of the display and most, if not all, reaches this surface, resulting in a better yellow state and improved maximum b*.

While the foregoing discussion has focused on an improved yellow state, the type of waveform shown in FIG. 20 has other advantages. By varying the length of the drive pulses, it has been possible to achieve improved intermediate optical states. As shown in FIG. 21, "gray" states, with variable L*, and very low b*, are obtained by moving along the W-K path in FIG. 21, while "Y-gray" states, with variable L* and variable b*, are obtained by moving along the K-Y-W path in FIG. 21.

Figure 22:
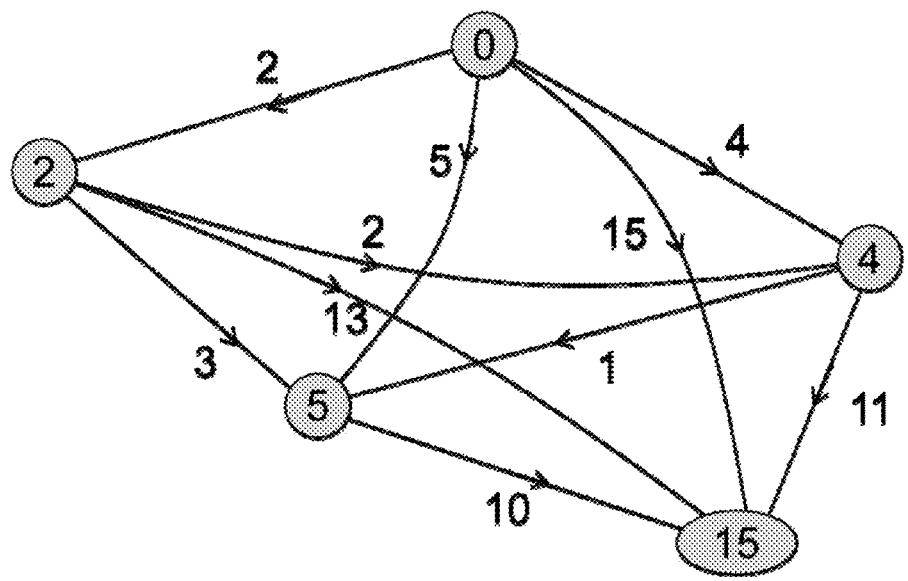
FIG. 22 is a schematic diagram of a DC balanced drive scheme as explained in Example 9 below.
Figure 23:
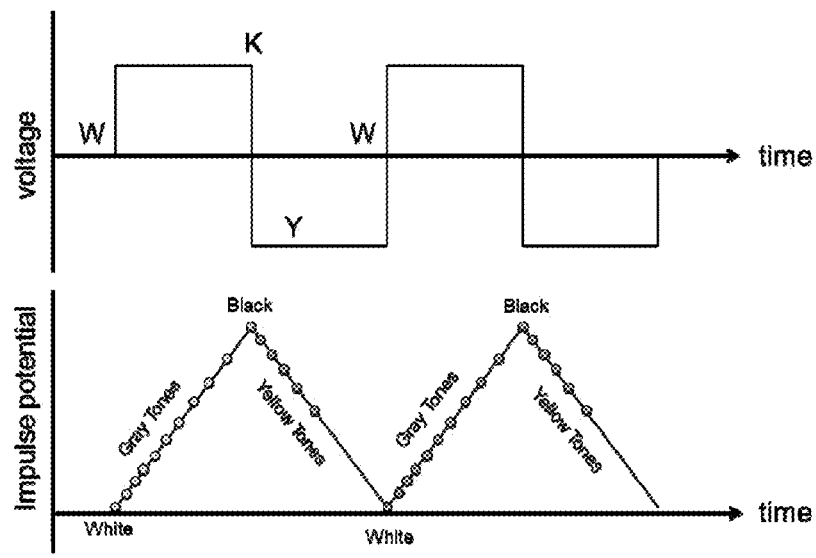
FIG. 23 is a graph showing a simple square wave waveform and resultant impulse potentials, as described in Example 9 below.
Figure 24:
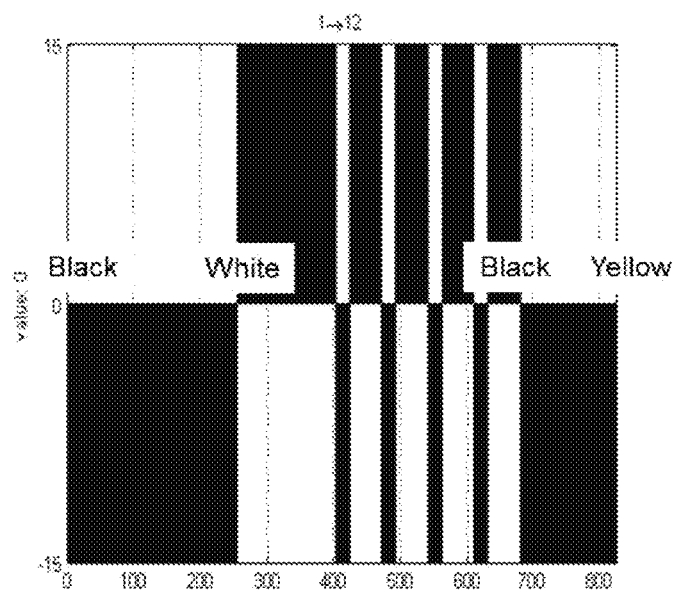
FIG. 24 is a voltage against time graph for a waveform used for a black-to-yellow transition in Example 9 below.

The type of waveform shown in FIG. 20 can be incorporated into an overall DC-balanced drive scheme (see the aforementioned MEDEOD applications for the importance of maintaining overall DC balance in a drive scheme for bistable electro-optic displays) in a variety of ways, for example:

(a) Self-balanced transitions: as described in U.S. Pat. No. 7,119,772, in such a drive scheme each waveform defining a transition between two optical states has zero net impulse. Since the optimum FIG. 20 type waveform for a transition to yellow may have a net impulse, this net impulse must be counterbalanced, for example by a pre-pulse having an opposite impulse. The waveform shown in FIG. 20 for transition to yellow has a net positive impulse so the overall transition to yellow would first have an equal negative impulse (toward white) prior to the FIG. 20 waveform; and (b) Round-trip DC balance: as described in U.S. Pat. No. 7,012,600, in many prior art drive schemes, individual waveforms are not DC balanced. Instead the entire drive scheme is designed such that every closed loop of transitions (i.e., each set of transitions beginning and ending on the same gray level) has zero net impulse. To achieve this, each optical state is assigned an "impulse potential" and the net impulse of the waveform used in any transition between two different optical states must equal the difference in impulse potentials between those two optical states. FIG. 22 illustrates such a drive scheme. The ellipses represent optical states with assigned impulse potentials. The directed arrows show the net impulse of a waveform between the two optical states represented at the end of the arrows; this impulse must be equal to the difference in impulse potentials between these two optical states. A FIG. 20 type yellow transition can be incorporated into such a drive scheme in many ways. For example, a transition to yellow can be notionally considered as a two part transition, one from the current state to black and then one from black to yellow. Since the FIG. 20 type yellow waveform has a net positive impulse, it can be considered part of the first transition to black (which also has a net positive impulse). Then the second part of the waveform is a negative set pulse to yellow which is equal to the difference of the black and chosen yellow impulse potential. FIGS. 23 and 24 illustrate this approach. FIG. 23 shows a simple square wave drive and impulse potentials. The area highlighted shows a black-to-yellow transition. The FIG. 20 type yellow part of the waveform can be considered to be a component of the white-to-black part of this of this transition as shown in FIG. 24, which shows the actual voltage pulses used in the black-to-yellow transition.

Figure 25:
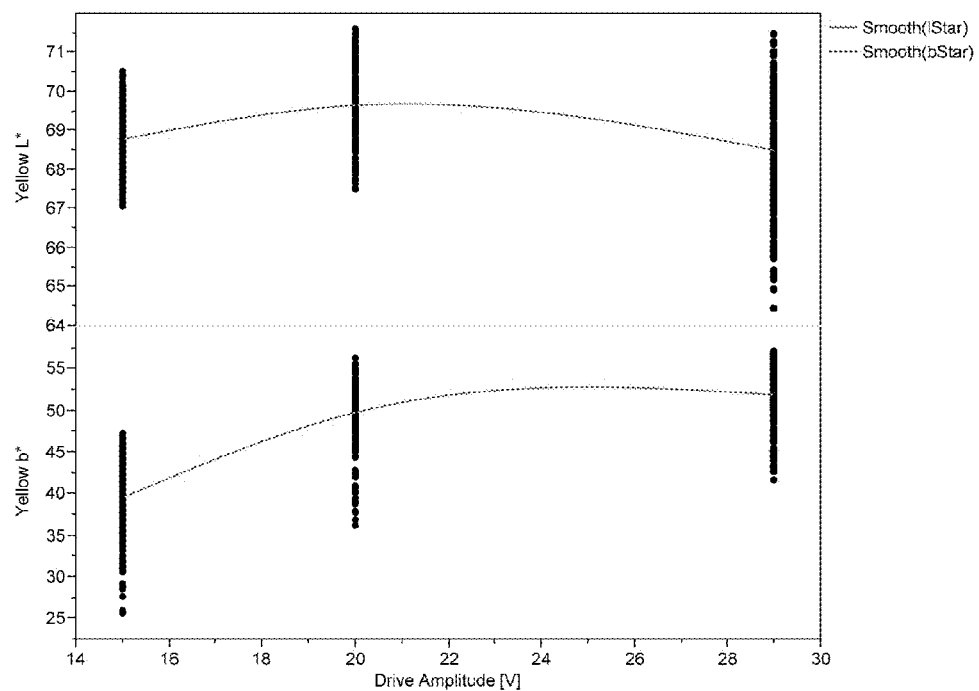
FIG. 25 is a graph showing the batch-to-batch variation of optimal drive voltage obtained in experiments described in Example 9 below.

It has been found that the optimum FIG. 20 type waveform depends upon voltage in a manner which may differ from batch to batch of electrophoretic material even though the batches have the same nominal composition. FIG. 25 shows an example of a batch in which the optimal voltage used for driving to yellow is in the range of 20-29 V, as opposed to the 15 V used above.

Figure 26:
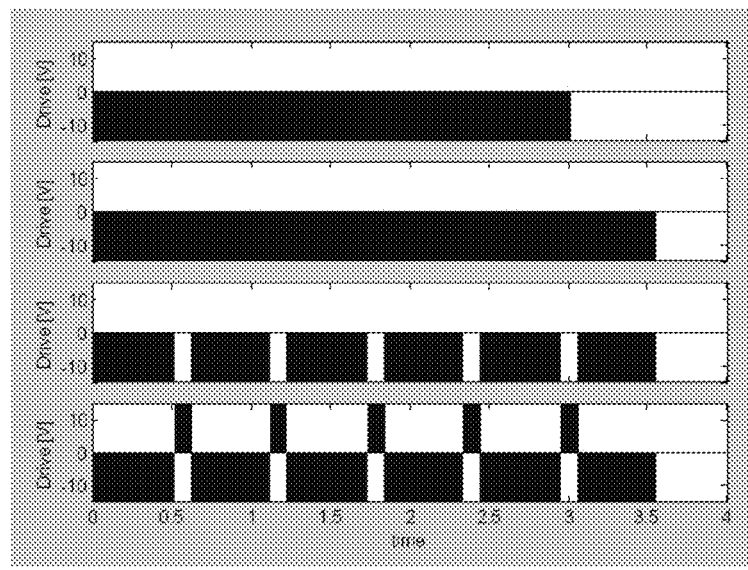
FIG. 26 shows voltage against time graphs for several picket fence waveforms used in Example 9 below.
Figure 27:
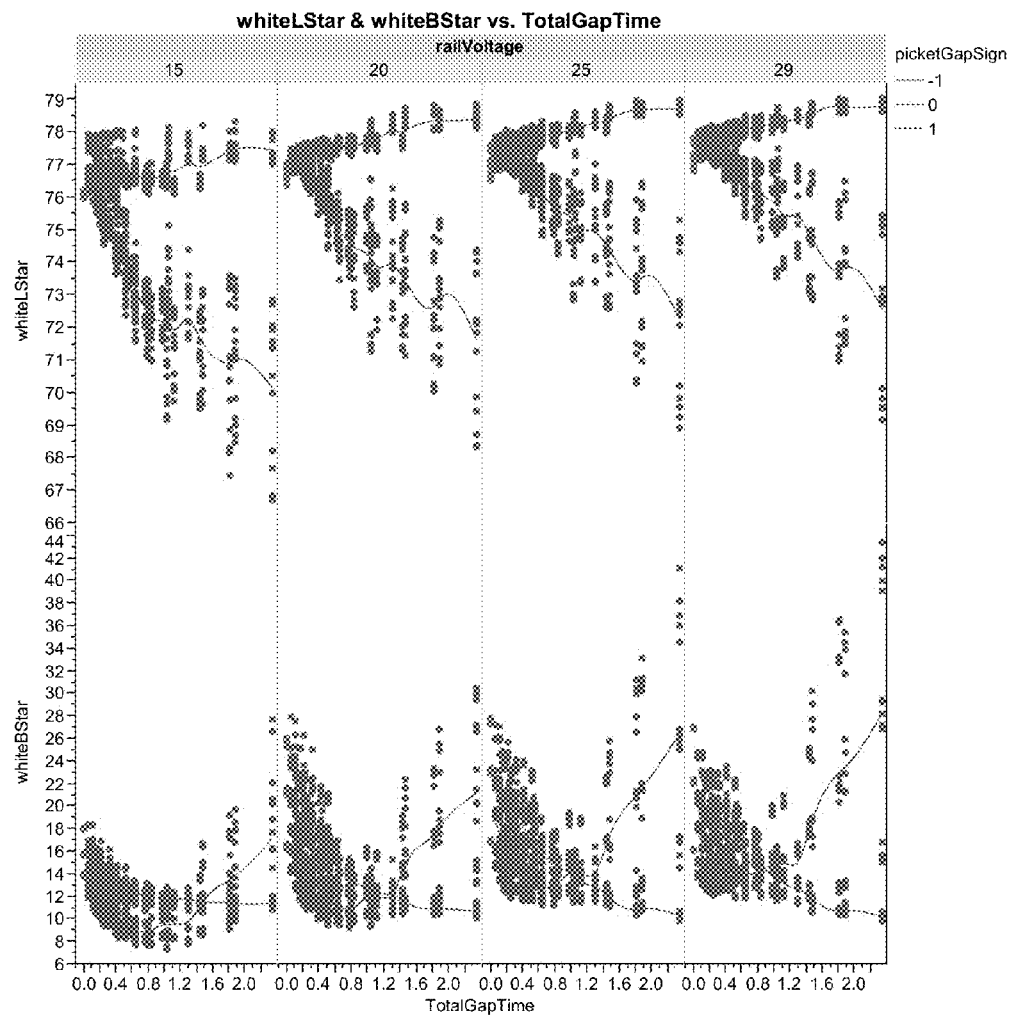
FIG. 27 is a graph showing the L* and b* values of the white states obtained using the picket fence waveforms shown in FIG. 26.

One of the factors limiting the performance of the type of display shown in FIGS. 10A and 10B is duration of the waveform required from black or yellow to white. As shown in FIG. 14, even without any reverse polarity pulses, it may take a full two seconds to transition from black to white. This is even more pronounced when the waveform includes periods of reverse polarity and/or when higher drive voltages are used. To combat these performance limitations, a "picket fence" type of waveform may be used, as shown in FIG. 26, which shows four (simplified) examples of this type of waveform. From top to bottom, FIG. 26 illustrates an original waveform, a waveform in which the negative pulse has been extended, a waveform in which periods of zero voltage have been inserted, and a waveform in which periods of reverse (positive) voltage have been added. Adding small intervals of zero, or positive, voltage to the waveform in this manner allows more rapid removal of the yellow from the white state, thus enabling shorter waveforms and/or improves the white state by reducing the amount of yellow. FIG. 27 shows the improvement in L* and b* values of the white optical state which can be achieved by use of picket fence waveforms. In FIG. 27, picketGapSign represents which type of picket fence was used; a value of 1 means extending the drive, a value of 0 means adding periods of zero voltage, and a value of −1 means adding reverse (positive) voltage. TotalGapTime represents the total amount of drive time added in this way.

It will be apparent to those skilled in the technology of electrophoretic displays that use of the waveforms discussed above may cause a significant amount of flashing to be visible during transitions. Such flashing can be reduced by using different waveforms for two or more sub-populations of pixels such that some fraction of the pixels are in a light optical state while some other fraction of pixels are in a dark optical state; the average optical state of such a display viewed from a distance will then be a slowly varying gray. This flash reduction technique is most effective when applied to a clearing signal having drive pulses of both polarities since all pixels are experiencing an equal duty cycle of a periodic drive to black and drive to white and are thus easily divided into groups using differing waveforms. These techniques have been previously disclosed (for black and white electrophoretic displays) in some of the aforementioned MEDEOD applications.

From the foregoing, it will be seen that the present invention can provide full color displays capable of rendering all the primary colors over the entire area of the display. If desired, areal modulation may be used, in addition to the color modulation provided by the present invention, to enable the display to show a full range of saturation in each color. The invention can also provide displays capable of producing spot color over the entire area of the display.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. A method of driving an electrophoretic medium comprising a fluid and at least a first species of particles disposed in the fluid, the method comprising:
    (a) applying a first addressing impulse to the medium, thereby causing the first species of particles to move in one direction relative to the electric field; and
    (b) applying a second addressing impulse, larger than the first addressing impulse but having the same polarity, to the medium, thereby causing the first species of particles to move in the opposed direction relative to the electric field;
    wherein the electrophoretic medium comprises second and third species of particles having colors different from the first species of particles and from each other, the second and third species of particles bearing charges of opposite polarities and the first species of particles bearing a charge of the same polarity as the third species of particles, the method comprising:
    (a) applying the first addressing impulse in one direction, thereby causing one surface of the electrophoretic medium displays the color of the third species of particle;
    (b) applying first addressing impulse in the opposed direction, thereby causing said one surface of the display to display a mixture of the colors of the first and second particles;
    (c) applying the second addressing impulse in said one direction, thereby causing said one surface to display a mixture of the colors of the first and third particles; and
    (d) applying the second addressing impulse in the opposed direction, thereby causing said one surface to display the color of the second particles.

2. The method according to claim 1 wherein the fluid is colored and the electrophoretic medium comprises a second species of particles having a color different from the first species of particles, and wherein the second species of particles move in the same direction relative to the electric field under both the first and second addressing impulses.

3. The method according to claim 1 further comprising applying to the medium a third addressing impulse greater than the second addressing impulse, thereby causing the first, second and third particles all to travel in the same direction relative to the electric field.

4. The method according to claim 1 wherein step (b) is effected by applying to electrophoretic medium a waveform comprising a series of short voltage pulses of one polarity, each except the last of the short voltage pulses being followed by a longer voltage pulse of the opposite polarity.

* * * * *